(12) United States Patent
Hayashi et al.

(10) Patent No.: US 9,158,424 B2
(45) Date of Patent: Oct. 13, 2015

(54) TOUCH SENSOR DEVICE, DISPLAY DEVICE AND ELECTRONIC EQUIPMENT

(71) Applicant: Japan Display Inc., Tokyo (JP)

(72) Inventors: Makoto Hayashi, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 57 days.

(21) Appl. No.: 14/175,373

(22) Filed: Feb. 7, 2014

(65) Prior Publication Data

US 2014/0285465 A1 Sep. 25, 2014

(30) Foreign Application Priority Data

Mar. 22, 2013 (JP) ................................. 2013-060907

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 2203/04107* (2013.01)

(58) Field of Classification Search
CPC ................. G06F 3/044; G06F 3/0412; G06F 2203/04107
USPC .................................................. 345/173–174
See application file for complete search history.

(56) References Cited

U.S. PATENT DOCUMENTS

| 2010/0066692 | A1 | 3/2010 | Noguchi et al. | |
|---|---|---|---|---|
| 2013/0141377 | A1 | 6/2013 | Noguchi et al. | |
| 2013/0141379 | A1 | 6/2013 | Noguchi et al. | |
| 2013/0147746 | A1 | 6/2013 | Noguchi et al. | |
| 2014/0078096 | A1* | 3/2014 | Tan et al. | 345/174 |
| 2014/0362047 | A1* | 12/2014 | Ahn et al. | 345/174 |
| 2015/0077370 | A1* | 3/2015 | Kim et al. | 345/173 |
| 2015/0103278 | A1* | 4/2015 | Inoue et al. | 349/12 |
| 2015/0130726 | A1* | 5/2015 | Min et al. | 345/173 |
| 2015/0130746 | A1* | 5/2015 | Jung et al. | 345/174 |

FOREIGN PATENT DOCUMENTS

JP 2010-072743 4/2010

* cited by examiner

*Primary Examiner* — Kumar Patel
*Assistant Examiner* — Vinh Lam
(74) *Attorney, Agent, or Firm* — K&L Gates LLP

(57) ABSTRACT

The touch sensor device and the display device include: a panel unit having a touch detection area in which a plurality of drive electrodes extend in an X-direction, a plurality of detection electrodes extend in a Y-direction, and a plurality of detection units each composed of a pair of the drive electrode and the detection electrode are formed in a matrix pattern; the drive electrodes each having a width forming two detection units in the Y-direction; and regions each formed by the intersection between one drive electrode and first to fourth detection electrodes. In this region, detection regions having a first sensitivity in which first to fourth detection units are provided and non-detection regions having a second sensitivity are alternately disposed. For example, the detection electrodes have different shapes between the detection region and the non-detection region.

17 Claims, 43 Drawing Sheets

TOUCH SENSOR DEVICE, DISPLAY DEVICE AND ELECTRONIC EQUIPMENT

CROSS REFERENCES TO RELATED APPLICATIONS

The present application claims priority to Japanese Priority Patent Application JP 2013-060907 filed in the Japan Patent Office on Mar. 22, 2013, the entire content of which is hereby incorporated by reference.

BACKGROUND

The present invention relates to techniques for a touch sensor device, a display device, an electronic equipment, and others.

Various types of electronic equipments and display devices such as smartphones have a touch sensor device (referred to also as a touch panel) mounted thereon as input means. As the touch sensor device, there is an electrostatic capacitance type touch sensor device. Examples of the touch sensor device include a touch sensor device having an exclusively-used touch sensor function, a display device with an externally attached type touch sensor or a cover integral type touch sensor, a display device with a touch sensor in which electrodes constituting a touch sensor function are incorporated in a display panel, and the like. The display device with an externally attached type touch sensor or a cover integral type touch sensor is referred to also as a display device with an on-cell type touch sensor. The display device with a touch sensor in which electrodes constituting a touch sensor function are incorporated in a display panel is referred to also as a display device with an in-cell type touch sensor. Moreover, as the display device with a touch sensor, there is a display device with a touch sensor in which an electrostatic capacitance type touch sensor device is applied to a liquid crystal display device (referred to also as a liquid crystal touch panel).

The electrostatic capacitance type touch sensor device is provided with drive electrodes (also referred to as transmission side electrodes) and detection electrodes (also referred to as reception side electrodes) as the electrodes constituting a touch sensor function. Units of touch detection are constituted by intersections in the pairs of the drive electrodes and the detection electrodes. For convenience of description, the units of touch detection are referred to as detection units. For example, on a surface serving as a touch detection area, a plurality of drive electrodes are disposed in parallel with one another in an in-plane horizontal direction, and a plurality of detection electrodes are disposed in parallel with one another in an in-plane perpendicular direction. The drive electrodes and the detection electrodes intersect with each other with a distance in a direction perpendicular to the surface of the touch detection area. A detection unit is constituted by a capacitance formed near the intersecting portion in the pair of each drive electrode and each detection electrode. On the surface of the touch detection area, a plurality of detection units are formed in a matrix pattern.

The touch sensor device has a circuit unit connected to the drive electrodes and detection electrodes. The circuit unit inputs a touch driving signal to the drive electrodes and detects a signal output from the detection electrodes through the detection units based on the signal. When the capacitance in a detection unit is changed by a touch of a conductor such as a finger to the surface of a touch detection area, the circuit unit detects the change of the capacitance as an electric signal. The touch sensor device detects the presence or absence and the position or the like of a touch to the touch detection area in the above-described manner.

The display device with an on-cell type touch sensor has, for example, a configuration in which a touch sensor device is externally connected to a front-surface side on which the display area of a liquid crystal display panel unit is formed. Alternatively, the display device with an on-cell type touch sensor has a configuration in which electrodes constituting a touch sensor function are integrally formed in a cover which is made of glass or a plastic material and attached to the front-surface side of a liquid crystal display panel unit.

The display device with an in-cell type touch sensor has, for example, a configuration in which at least either one of the drive electrodes and the detection electrodes corresponding to the electrodes constituting the touch sensor function, for example, the drive electrodes are incorporated in the liquid crystal display panel unit. The display device with an in-cell type touch sensor having this configuration is prepared by forming electrodes, in which common electrodes of the liquid crystal display device and the drive electrodes are integrated, on a TFT substrate serving as a first substrate structure and forming the detection electrodes on a color filter substrate serving as a second substrate structure.

As a driving method of the display device with an in-cell type touch sensor, for example, a method which carries out the driving while separating a display period for liquid crystal display function and a touch detection period for touch sensor function in terms of time is applied. This time-sharing driving method is advantageous in that influences of noise generated from the liquid crystal display panel unit during the display period for the liquid crystal display function are less likely to be given during the touch detection period for the touch sensor function.

As a prior-art example relating to the touch sensor device, there is Japanese Patent Application Laid-Open Publication No. 2010-72743 (Patent Document 1). In Patent Document 1, an electrostatic capacitance type touch sensor device and a display device with an in-cell type touch sensor are described. Patent Document 1 describes that a detection speed is improved without increasing the frequency at the time of touch driving for touch detection.

SUMMARY

The touch sensor device and the display device with a touch sensor have the following problems with respect to a touch driving time corresponding to the time of driving the drive electrodes for a touch sensor function and a touch detection period corresponding to a period of ensuring the touch driving time.

FIG. 42 shows comparison of driving methods and configuration examples of the driving periods in various devices as a premise. The example (a) of FIG. 42 shows a configuration of a frame period F for a display function of a display device such as a liquid crystal display device. The frame period F is a period of time with a predetermined length for displaying a frame image on a display area. The frame period F has a display period Kd and a blank period BLK. The display period Kd includes a pixel writing period for displaying one frame image on the display area. The display device ensures the display period Kd with a predetermined length within the frame period F for the display function.

The example (b) of FIG. 42 shows a configuration example of the touch detection period Ks corresponding to a driving period for the touch sensor function of the touch sensor device. This configuration example is the repetitions of the touch detection period Ks having a predetermined length on the time axis. The touch detection period Ks includes a touch driving time that is a period of time required for the touch driving carried out by the scan driving of a plurality of drive electrodes in the touch detection area. One touch detection period Ks corresponds to a period of time required for scanning all the drive electrodes in the plane of the touch detection area. Note that the example (b) of FIG. 42 shows an example in which the touch detection periods Ks are provided at a ratio of 3 to 1 to the frame period F of the example (a) of FIG. 42. In the case of a touch sensor device having an exclusively-used touch sensor function, the touch detection period Ks can be designed to have a variable length to a certain degree, but it is desirable to set the touch detection period Ks to be short for high efficiency.

The example (c) of FIG. 42 shows a configuration example in a method of individually driving the touch sensor function and the display function in a display device with an on-cell type touch sensor. This configuration example corresponds to an example in which the display period Kd of the example (a) of FIG. 42 and the touch detection period Ks of the example (b) of FIG. 42 are provided in parallel with each other on the time axis. In the case of this method, it is not necessary to synchronize the display period Kd and the touch detection period Ks. The touch detection period Ks can be designed to have a variable length to a certain degree also in this method, but it is desirable to set the touch detection period Ks to be short for high efficiency.

The example (d) of FIG. 42 shows a method which carries out the driving while separating the display period Kd and the touch detection period Ks in terms of time in the frame period F having a fixed length as the driving method and driving period of a display device with a touch sensor such as the display device with an in-cell type touch sensor. In the case of this time-sharing driving method, it is necessary to ensure the display period Kd and the touch detection period Ks within the frame period F having a limited fixed length. In the case where the display period Kd to be ensured within the frame period F becomes longer, only a short touch detection period Ks can be ensured correspondingly. In contrast, in the case where the touch detection period Ks to be ensured within the frame period F becomes longer, only a short display period Kd can be ensured correspondingly. The example (d) of FIG. 42 shows an example in which the touch detection period Ks having a predetermined length similar to that in the example (b) of FIG. 42 is ensured within the same frame period F as that of the example (a) of FIG. 42, so that only a display period Kd shorter than the display period Kd of the example (a) of FIG. 42 is ensured.

With respect to the above-mentioned problems, for example, in a display device with a touch sensor, as the size of the display area for the display function and the resolution of the pixel are increased, the required display period Kd becomes longer. Moreover, in the display device with a touch sensor, as the size of the touch detection area for the touch sensor function and the touch detection density corresponding to a density of arrangement of the detection units are increased, the number of the drive electrodes which require the touch driving by the scan driving is increased. As the number of the electrodes is increased, the overall touch driving time in the touch detection area is increased, so that the required touch detection period Ks becomes longer.

As described above, it becomes difficult to ensure the display period Kd and the touch detection period Ks within the frame period F having a limited length. In particular, in the case of a display device with an in-cell type touch sensor, since it is necessary to separately ensure the display period Kd and the touch detection period Ks, it becomes more difficult to ensure the above-mentioned periods of time. When the period of time for ensuring the display period Kd or the touch detection period Ks within the frame period F becomes insufficient, it becomes difficult to design the display device with a touch sensor.

Therefore, in the touch sensor device and the display device having the touch sensor function, it is required to shorten the touch driving time and the touch detection period. As described above, the touch driving time and the touch detection period are greatly influenced by the number of drive electrodes serving as the objects of the touch driving and the number of scans in the scan driving in the touch detection area. One means for shortening the touch driving time is to reduce the number of drive electrodes in the touch detection area. Thus, the number of scans at the time of scan driving of the plurality of drive electrodes in the touch detection area is reduced, thereby shortening the period of time required for touch driving by the scan driving.

However, in the case where the number of the electrodes and the number of scans are reduced in the touch sensor device or the like, the touch detection density corresponding to a density of arrangement of the plurality of detection units formed in the touch detection area is reduced. Due to the reduction of the touch detection density, the detection precision of touch positions or the like in the touch detection area by the circuit unit is lowered. Therefore, it is not desirable to reduce the number of electrodes and the number of scans in the touch sensor device or the like. It is necessary to maintain the touch detection density in the touch detection area at a level higher than a certain degree for the touch sensor function.

With respect to the object to shorten the touch driving time, Patent Document 1 has described a configuration in which a plurality of scans to different regions on a touch panel are executed in parallel with one another. Moreover, Patent Document 1 has also described a configuration in which detection electrodes are formed as sets each including two electrodes. In these sets of detection electrodes, one of the detection electrodes extends toward one region in the touch panel, and the other detection electrode extends toward both of the one and the other regions in the touch panel. Furthermore, Patent Document 1 has described a configuration in which different signals are applied to drive electrodes in the two regions. In the technique of Patent Document 1, in order to obtain two output signals with predetermined touch detection sensitivities from two detection electrodes disposed relative to one drive electrode, it is necessary to devise the amplitude or the like of an input signal to the drive electrode.

An object of the present invention is to provide a technique capable of shortening a touch driving time and a touch detection period, while maintaining a touch detection density in a touch detection area relating to a touch sensor function.

Typical embodiments of the present invention are a touch sensor device, a display device, an electronic equipment, and the like, and are characterized by including the following configurations.

(1) A touch sensor device of one embodiment includes: a panel unit including: a touch detection area having: a plurality of drive electrodes extending in a first direction, a plurality of detection electrodes extending in a second direction, and a plurality of detection units each composed of a pair of the drive electrode and the detection electrode, the plurality of detection units being formed in a matrix pattern, each of the plurality of drive electrodes having a width forming two detection units in the second direction; first to fourth detection electrodes of the plurality of detection electrodes; a plurality of touch detection regions which are provided in the touch detection area, formed by respective intersections between the plurality of drive electrodes and the first to fourth detection electrodes, and repeatedly disposed in the first direction and the second direction; first detection regions with a first sensitivity, which are provided in each of the plurality of touch detection regions and have first to fourth detection units; and second detection regions with a second sensitivity lower than the first sensitivity, which are provided in each of the plurality of touch detection regions, and at least either the plurality of drive electrodes or the plurality of detection electrodes have different shapes between the first detection region and the second detection region, the first detection regions and the second detection regions are alternately disposed in the first direction and the second direction, and when a first input signal is applied to each of the plurality of drive electrodes, four output signals are obtained from the first to fourth detection electrodes through the first to fourth detection units in each of the plurality of touch detection regions.

(2) Each of the plurality of drive electrodes has a first region and a second region in the second direction, the first region and the second region having a width forming one detection unit, the first detection unit is formed by an intersection between the first region of the drive electrode and the first detection electrode, the second detection unit is formed by an intersection between the second region of the drive electrode and the second detection electrode, the third detection unit is formed by an intersection between the first region of the drive electrode and the third detection electrode, and the fourth detection unit is formed by an intersection between the second region of the drive electrode and the fourth detection electrode.

(3) A touch sensor device of one embodiment includes: a panel unit including: a touch detection area having: a plurality of drive electrodes extending in a first direction, a plurality of detection electrodes extending in a second direction, and a plurality of detection units each composed of a pair of the drive electrode and the detection electrode, the plurality of the detection units being formed in a matrix pattern; a first drive electrode and a second drive electrode of the plurality of drive electrodes, each having a width forming one detection unit in the second direction; first to fourth detection electrodes of the plurality of detection electrodes; a plurality of touch detection regions which are provided in the touch detection area, formed by respective intersections among the first and second drive electrodes and the first to fourth detection electrodes, and repeatedly disposed in the first direction and the second direction; first detection regions with a first sensitivity, which are provided in each of the plurality of touch detection regions and have first to fourth detection units; and second detection regions with a second sensitivity lower than the first sensitivity, and at least either the plurality of drive electrodes or the plurality of detection electrodes have different shapes among the first detection regions and the second detection regions, the first detection regions and the second detection regions are alternately disposed in the first direction and the second direction, and when the first drive electrode and the second drive electrode are taken as one set and a first input signal is simultaneously applied to the one set, four output signals are obtained from the first to fourth detection electrodes through the first to fourth detection units in each of the plurality of touch detection regions.

(4) The first detection unit is formed by an intersection between the first drive electrode and the first detection electrode, the second detection unit is formed by an intersection between the second drive electrode and the second detection electrode, the third detection unit is formed by an intersection between the first drive electrode and the third detection electrode, and the fourth detection unit is formed by an intersection between the second drive electrode and the fourth detection electrode.

(5) The plurality of detection electrodes are disposed in the first direction at a constant pitch, and each of the plurality of detection electrodes has a thin line portion extending in the second direction and protruding electrode portions which protrude from the thin line portion toward two sides thereof in the first direction so as to correspond to a position of the first detection region.

(6) The plurality of detection electrodes are alternately disposed at a first pitch and a second pitch in the first direction, and each of the plurality of detection electrodes has a thin line portion extending in the second direction and a protruding electrode portion which protrudes from the thin line portion toward one side thereof in the first direction so as to correspond to a position of the first detection region.

(7) Each of the plurality of drive electrodes has a thin line portion extending in the first direction and a protruding electrode portion which protrudes from the thin line portion toward at least one side thereof in the second direction so as to correspond to a position of the first detection region.

(8) The protruding electrode portion of each of the plurality of detection electrodes has an opening in a plane formed by the first direction and the second direction. Alternatively, the protruding electrode portion of each of the plurality of detection electrodes has an opening, which is superposed on a plane of the protruding electrode portion of the drive electrode, in a plane formed by the first direction and the second direction.

(9) A touch sensor device of one embodiment includes: a first circuit unit which is coupled to the plurality of drive electrodes in the touch detection area and drives the plurality of drive electrodes in the touch detection area by applying an input signal thereto; and a second circuit unit which is coupled to the plurality of detection electrodes in the touch detection area and detects output signals from the plurality of detection electrodes in the touch detection area, and the first circuit unit sequentially applies the first input signal to each of the plurality of drive electrodes in the touch detection area. Alternatively, the first circuit unit sequentially applies the first input signal to each of the sets of the plurality of drive electrodes in the touch detection area.

(10) The first circuit unit selects drive electrodes adjacent in the second direction as the set of the first drive electrode and the second drive electrode. Alternatively, the first circuit unit selects drive electrodes apart from each other with at least one drive electrode interposed therebetween in the second direction, as the one set of the first drive electrode and the second drive electrode.

(11) The first circuit unit applies pulses with the same phase as the first input signal which is simultaneously applied to the one set of the first drive electrode and the second drive electrode. Alternatively, the first circuit unit applies pulses with opposite phase as the first input signal which is simultaneously applied to the one set of the first drive electrode and the second drive electrode.

(12) A display device of one embodiment includes: the touch sensor device described above; a display panel unit which includes a display area in which pixels are arranged in a matrix pattern and a display functional layer which is controlled by the pixels and is used for displaying an image on the display area, a surface of the panel unit of the touch sensor device being coupled to one surface of the display panel unit; and a display circuit unit which applies a signal for display driving to electrodes constituting the pixels in the display area. For example, the display functional layer is a liquid crystal layer.

(13) A display device of one embodiment includes: a display panel unit including: a touch detection area having: a plurality of drive electrodes used for both of display driving and touch driving and extending in a first direction, a plurality of detection electrodes extending in a second direction, and a plurality of detection units each composed of a pair of the drive electrode and the detection electrode, the plurality of detection units being formed in a matrix pattern, a display area in which pixels are formed in a matrix pattern, and a display functional layer which is controlled by the pixels and used for displaying an image on the display area; a first circuit unit which generates a signal for the display driving and an input signal for the touch driving and applies the signals to the plurality of drive electrodes; a second circuit unit which detects an output signal from the plurality of detection electrodes based on the input signal for the touch driving; a third circuit unit which applies the signal for the display driving to the pixels in the display area; the plurality of drive electrodes each having a width forming two detection units in the second direction; first to fourth detection electrodes of the plurality of detection electrodes; a plurality of touch detection regions which are provided in the touch detection area, formed by respective intersections between the plurality of drive electrodes and the first to fourth detection electrodes, and repeatedly disposed in the first direction and the second direction; first detection regions with a first sensitivity, which are provided in each of the plurality of touch detection regions and have first to fourth detection units; and second detection regions with a second sensitivity lower than the first sensitivity, which are provided in each of the plurality of touch detection regions, and at least either the plurality of drive electrodes or the plurality of detection electrodes have different shapes between the first detection region and the second detection region, the first detection regions and the second detection regions are alternately disposed in the first direction and the second direction, and when a first input signal is applied to each of the plurality of drive electrodes, four output signals are obtained from the first to fourth detection electrodes through the first to fourth detection units in each of the plurality of touch detection regions.

(14) A display device of one embodiment includes: a display panel unit including: a touch detection area having: a plurality of drive electrodes used for both of display driving and touch driving and extending in a first direction, a plurality of detection electrodes extending in a second direction, and a plurality of detection units each composed of a pair of the drive electrode and the detection electrode, each of plurality of detection units being formed in a matrix pattern, a display area in which pixels are formed in a matrix pattern, and a display functional layer which is controlled by the pixels and used for displaying an image on the display area; a first circuit unit which generates a signal for the display driving and an input signal for the touch driving and applies the signals to the plurality of drive electrodes; a second circuit unit which detects an output signal from the plurality of detection electrodes based on the input signal for the touch driving; a third circuit unit which applies a signal for the display driving to the pixels in the display area; a first drive electrode and a second drive electrode of the plurality of drive electrodes, each having a width forming one detection unit in the second direction; first to fourth detection electrodes of the plurality of detection electrodes; a plurality of touch detection regions which are provided in the touch detection area, formed by respective intersections among the first and second drive electrodes and the first to fourth detection electrodes, and repeatedly disposed in the first direction and the second direction; first detection regions with a first sensitivity, which are provided in each of the plurality of touch detection regions and have first to fourth detection units; and second detection regions with a second sensitivity lower than the first sensitivity, and at least either the plurality of drive electrodes or the plurality of detection electrodes have different shapes among the first detection regions and the second detection regions, the first detection regions and the second detection regions are alternately disposed in the first direction and the second direction, and when the first drive electrode and the second drive electrode are taken as one set and a first input signal is simultaneously applied to the one set, four output signals are obtained from the first to fourth detection electrodes through the first to fourth detection units in each of the plurality of touch detection regions.

(15) The touch detection area has a plurality of common electrodes which are disposed between the plurality of drive electrodes in the second direction, and to which a common voltage is applied.

(16) An electronic equipment of one embodiment includes: the touch sensor device described above; and a control unit which carries out control relating to a touch sensor function to the touch sensor device to acquire touch detection information from the touch sensor device.

(17) An electronic equipment of one embodiment includes: the display device described above; and a control unit which carries out control relating to a touch sensor function and control relating to a display function to the display device to acquire touch detection information from the display device.

According to typical embodiments of the present invention, it is possible to shorten a touch driving time and a touch detection period, while maintaining a touch detection density in a touch detection area relating to a touch sensor function. Moreover, according to the typical embodiments of the present invention, a plurality of output signals with predetermined touch detection sensitivities can be obtained without the necessity of altering or adjusting levels of a plurality of input signals to be applied to drive electrodes at the time of touch driving.

Additional features and advantages are described herein, and will be apparent from the following Detailed Description and the figures.

DETAILED DESCRIPTION

Figure 1:
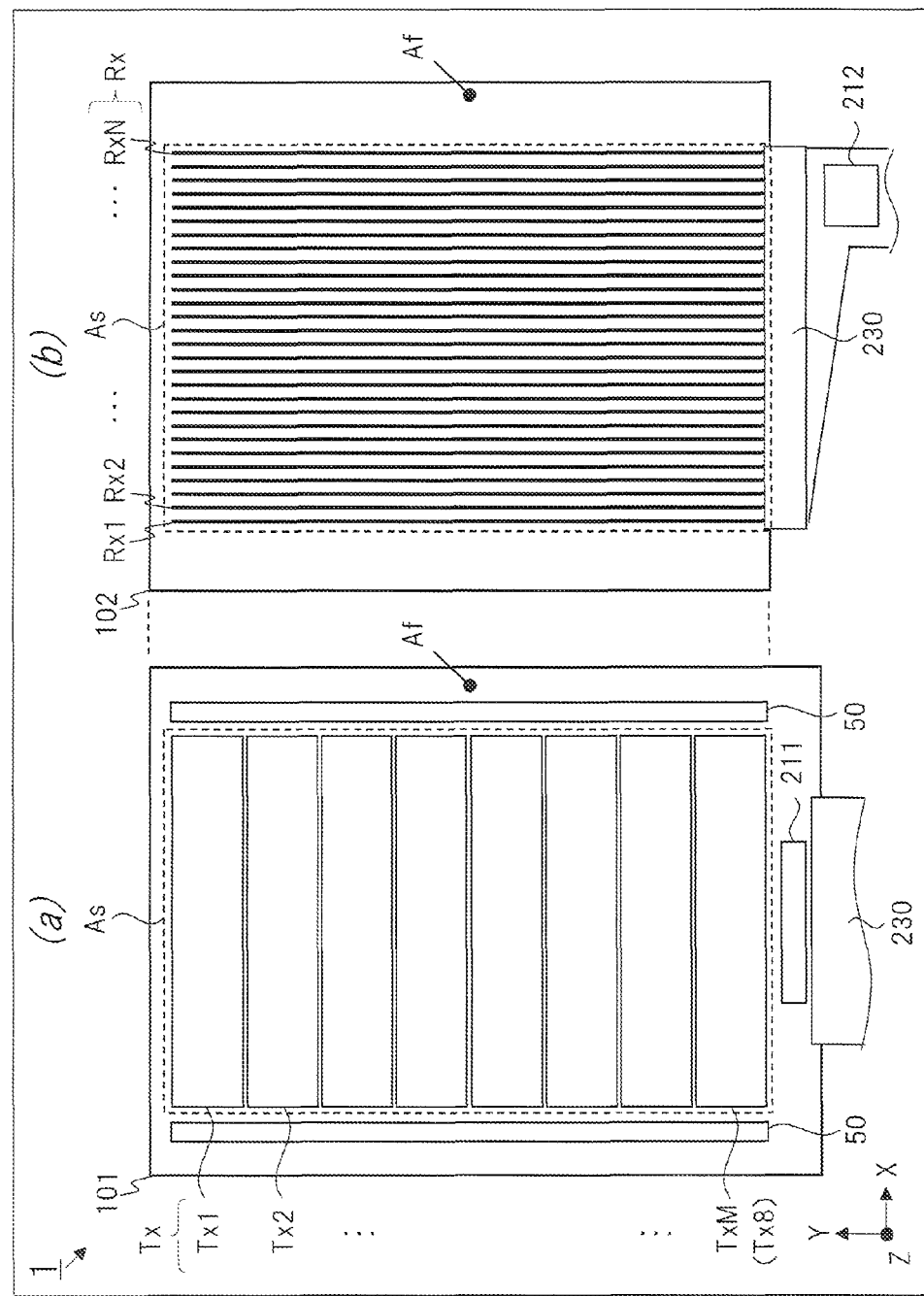
FIG. 1 includes diagrams (a) and (b) each showing a configuration on an XY plane of a panel unit of a touch sensor device in an embodiment 1A of the present invention.

Embodiments of the present invention will be described in detail with reference to drawings. Note that components having the same function are denoted by the same reference symbols throughout the drawings for describing the embodiments, and the repetitive description thereof will be omitted. Moreover, the cross-sectional hatching is omitted appropriately for easy understanding. On the description, as the directions forming a plane for a touch detection area or the like in the device, an in-plane horizontal direction is defined as an X-direction, an in-plane perpendicular direction is defined as a Y-direction, and the direction perpendicular to the plane of the touch detection area or the like formed by the X-direction and Y-direction or the thickness direction of the device is defined as a Z-direction.

<Outline>

In a touch sensor device and a display device with a touch sensor or the like according to the present embodiment, by devising the design of an electrode shape or the like of drive electrodes and detection electrodes which are the electrodes constituting the touch sensor function, a touch driving time and a touch detection period are shortened, while maintaining a touch detection density in a touch detection area relating to a touch sensor function. Based on the devising of design of the electrode shape or the like, the present embodiments provide the configuration in which a plurality of drive electrodes corresponding to those of a comparative example described later are simultaneously driven at the time of touch driving, so that a plurality of output signals with desired predetermined touch detection sensibilities can be obtained from the plurality of detection electrodes through the plurality of detection units without the necessity of alternating a plurality of input signals to be applied to the drive electrodes.

In the present embodiments, as first means for simultaneously driving the plurality of drive electrodes, an electrode shape in which a plurality of drive electrodes of a comparative example to be described later are integrally formed into one set is adopted. Moreover, in the present embodiments, in accordance with the configuration of the drive electrodes, the detection electrodes several times as many as those of the comparative example are arranged. In this manner, in the regions of intersections between the drive electrode and the plurality of detection electrodes, a plurality of detection units with a predetermined ratio of touch detection sensitivities are formed. The embodiment 1A or the like to be described later shows the case corresponding to the above-mentioned first means.

In the present embodiments, as second means for simultaneously driving the plurality of drive electrodes, a plurality of drive electrodes of a comparative example to be described later remain separated as they are, and the plurality of drive electrodes are simultaneously driven by using the same input signals from a circuit unit. Moreover, in the present embodiments, in accordance with the configuration of the drive electrodes, the detection electrodes several times as many as those of the comparative example are arranged. In this manner, in the regions of intersections between the plurality of drive electrodes and the plurality of detection electrodes, a plurality of detection units with a predetermined ratio of touch detection sensitivities are formed. The embodiment 2A or the like to be described later shows the case corresponding to the above-mentioned second means.

Comparative Example

Figure 43:
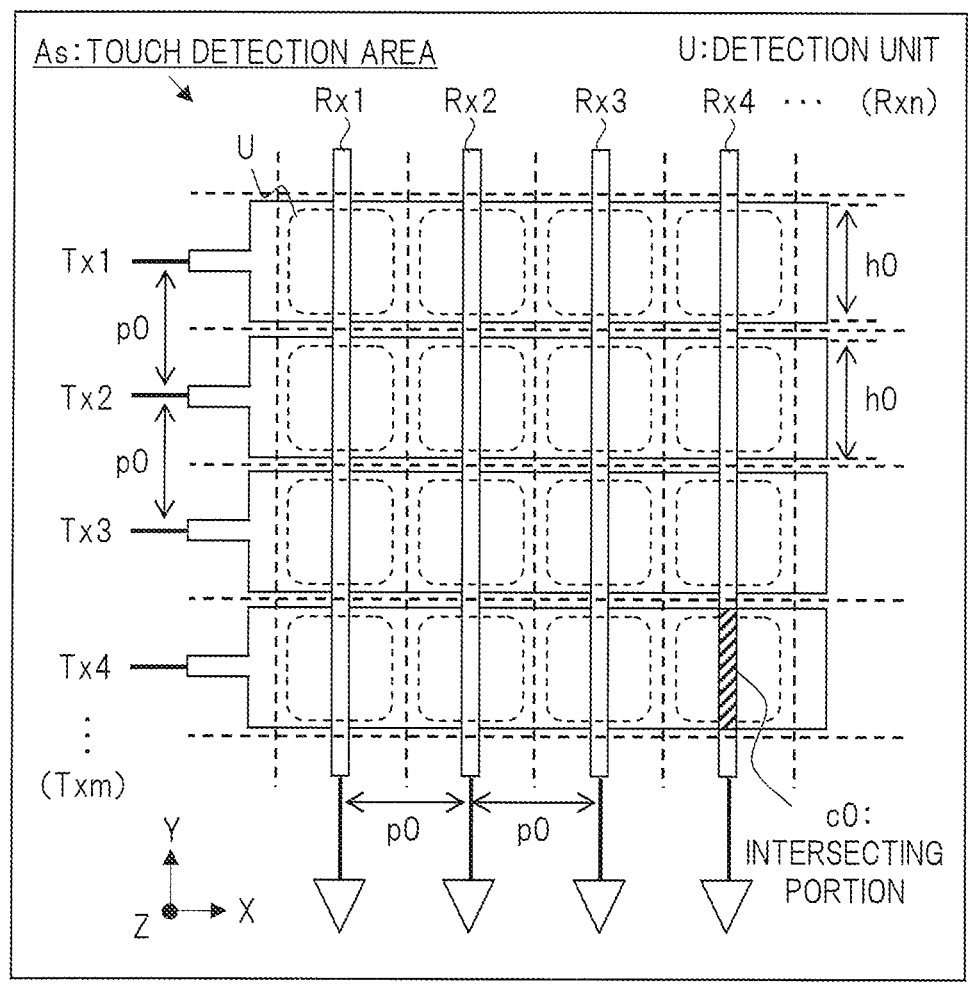
FIG. 43 is a diagram showing a configuration of electrodes and the like in a touch detection area of a comparative example of the present embodiment.

FIG. 43 shows a configuration example of an XY plane of electrodes and the like constituting detection units U in a touch detection area As of a touch sensor device as a comparative example relative to the present embodiment. The comparative example shows a configuration example of a simple touch detection area As as a presupposed technique. The touch detection area As has a plurality of drive electrodes Tx arranged in parallel with one another in the X-direction and a plurality of detection electrodes Rx arranged in parallel with one another in the Y-direction, and the drive electrodes Tx and the detection electrodes Rx intersect with each other. The pitch of the arrangement of the drive electrodes Tx in the Y-direction and the pitch of the arrangement of the detection electrodes Rx in the X-direction are set to the same pitch of p0.

On the XY plane, the drive electrodes Tx have rectangular block shapes formed by dividing the length (defined as HY) of the touch detection area As in the Y-direction into a plural number (defined as m) of portions. The width of each of the blocks of the m drive electrodes Tx in the Y-direction is defined as h0. The width h0 of each of the drive electrodes Tx is larger than the width of each of the detection electrodes Rx in the X-direction. The blocks of the plurality of drive electrodes Tx are arranged in parallel with one another at short intervals in the Y-direction. Each of the detection electrodes Rx is formed into a thin line shape that extends in the Y-direction. In the length (defined as HX) of the touch detection area As in the X-direction, the detection electrodes Rx are arranged at the predetermined pitch p0, so that a plurality (defined as n) of the detection electrodes Rx are provided.

A capacitance and touch detectable region formed so as to correspond to the vicinity of the intersecting portion c0 in the pair of the drive electrode Tx and the detection electrode Rx are defined as a detection unit U. The intersecting portion c0 represents a region on which the drive electrode Tx and the detection electrode Rx are superposed when seen on an XY plane. The region in the vicinity of the intersecting portion c0 is a region where an electric field is formed between the drive electrode Tx and the detection electrode Rx and the touch detection can be performed. For example, when seen on an XY plane, the electric field is formed between the region of the drive electrode Tx on the lower side in the Z-direction adjacent to the intersecting portion c0 and the thin line of the detection electrode Rx at the intersecting portion c0 on the upper side in the Z-direction.

Figure 44:
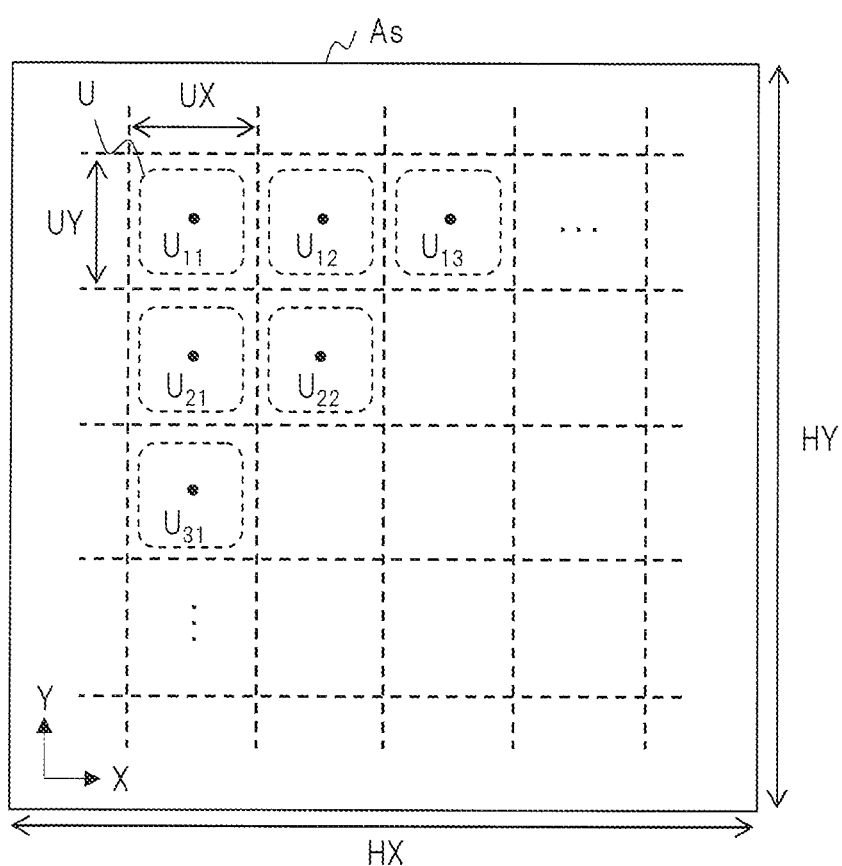
FIG. 44 is a diagram showing a matrix configuration of detection units in a touch detection area relating to the configuration of the comparative example.

FIG. 44 shows a matrix configuration of the plurality of detection units U in the touch detection area As corresponding to the configuration of FIG. 43. In this configuration, on the XY plane, each of the detection units U is formed to have an approximately square shape, and the detection units U are arranged to form a square lattice shape. Supposing that the width of the square of the detection unit U in the X-direction is UX and the width thereof in the Y-direction is UY, UX=UY is satisfied. The number m of the drive electrodes Tx is determined by HX/p0 or the like. The number n of the detection electrodes Rx is determined by HY/p0 or the like.

In the matrix of the detection units U of FIG. 44, the plurality of detection units U have a predetermined arrangement density. The arrangement density of the detection units U is referred to also as a touch detection density for convenience of description. In general, as the touch detection density in the touch detection area As becomes higher, calculations of the touch positions or the like by the circuit unit can be carried out with higher precision. However, since the number of electrodes and the number of scans for the touch driving in the touch detection area As are correspondingly increased, long touch driving time and touch detection period are required.

Figure 45:
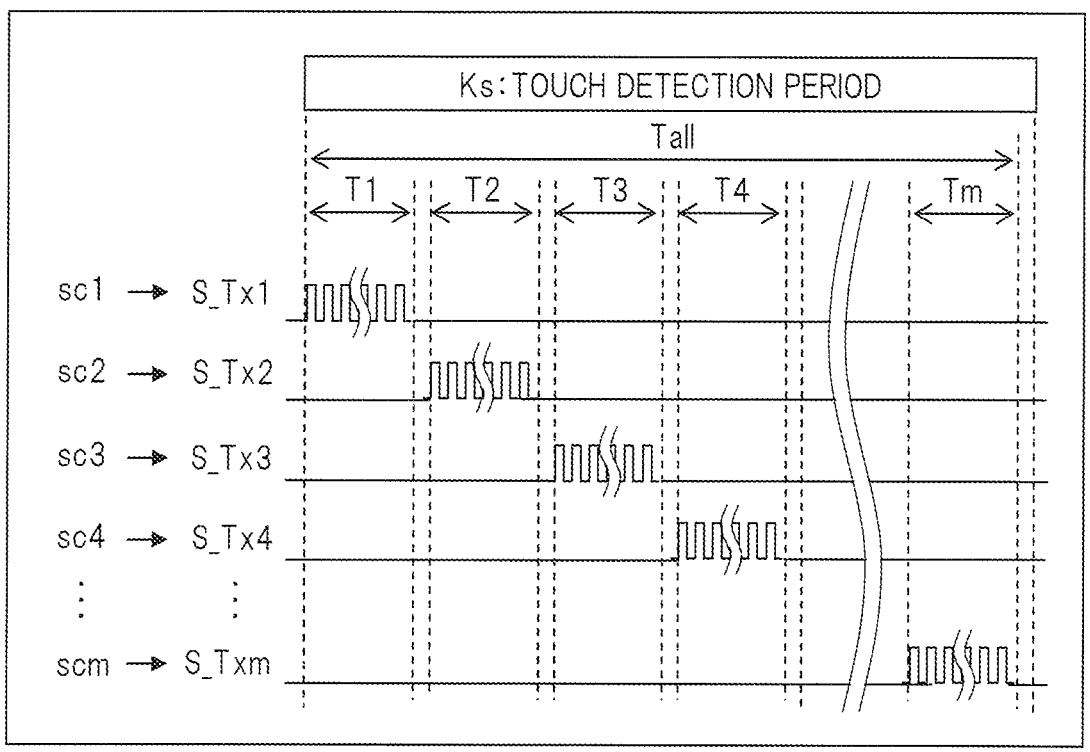
FIG. 45 is a diagram showing an example of a touch driving sequence during a touch detection period relating to the configuration of the comparative example.

FIG. 45 is a diagram showing an example of a touch driving sequence during a touch detection period Ks corresponding to the configuration of the comparative example of FIG. 43. In the configuration of the comparative example, as a touch driving in the touch detection period Ks, the circuit unit carries out the scan driving in which a touch driving signal is sequentially applied to the m drive electrodes Tx in the touch detection area As one by one. For example, the order of scans at the time of the scan driving sequentially starts from the drive electrode Tx on the upper side in the Y-direction, that is, from the drive electrode Tx1 to the drive electrode Txm. A reference symbol sc1 denotes a first scan, and a reference symbol S_Tx1 denotes a touch driving signal which is an input signal to the drive electrode Tx1 at that time. Similarly, a reference symbol scm denotes an m-th scan, and a reference symbol S_Txm denotes a touch driving signal which is an input signal to the drive electrode Txm at that time. The scans of the m drive electrodes Tx of FIG. 45 are carried out by touch driving signals with the pulses having the same predetermined frequency.

The touch driving time T represents a period of time for the touch driving per one scan. For example, the touch driving time T1 is a period of time required for the scan sc1 of the drive electrode Tx1. Touch driving time T1 to touch driving time Tm corresponding to the touch driving times T of the drive electrodes Tx have the same length. A reference symbol Tall represents an overall touch driving time required for the scan driving of the plurality of drive electrodes Tx in the entire touch detection area As. The touch driving time Tall is schematically obtained by a multiplication between the number m of the drive electrodes Tx, that is, the number of the scans and the touch driving time T per scan, which is given by Tall≈m× T. The length of the touch detection period Ks is schematically the same as the length of the touch driving time Tall. As the number m corresponding to the number of the drive electrodes Tx and the number of scans of the drive electrodes Tx is increased, the touch driving time Tall and the touch detection period Ks become longer.

Embodiment 1A

Based on the above-mentioned description, a touch sensor device 1 of the embodiment 1A of the present invention will be described with reference to FIG. 1 to FIG. 12. As shown in FIG. 4 and the like to be described later, the embodiment 1A is provided with a configuration in which the width of the drive electrode Tx in the Y-direction is increased, in other words, a configuration in which the adjacent two drive electrodes Tx are integrated to one set, a configuration in which the pitch of the arrangement of the detection electrodes Rx is narrowed to increase the number of the detection electrodes Rx, and a configuration in which the shape of the detection electrode Rx is devised to achieve a predetermined touch detection sensitivity.

[Plane of Touch Sensor Device and Panel Unit]

FIG. 1 shows a configuration on the XY plane in a touch sensor device 1 of the embodiment 1A. The diagram (a) of FIG. 1 shows a configuration including drive electrodes Tx on a back substrate 101 side of the panel unit of the touch sensor device 1. The diagram (b) of FIG. 1 shows a configuration including detection electrodes Rx on a front substrate 102 side of the panel unit of the touch sensor device 1. The panel unit of the touch sensor device 1 is a plate-like part on which main electrodes, circuit units and the like constituting the touch sensor device 1 are formed. In this example, the panel unit has a rectangular flat plate-like shape extending in the Y-direction on the XY plane. The panel unit of the touch sensor device 1 is schematically constituted by a back substrate 101 and a front substrate 102 which are two substrate structures superposed in the Z-direction.

On the XY plane, the panel unit has a touch detection area As and a peripheral area Af outside the touch detection area As. In the touch detection area As, M drive electrodes Tx are formed in parallel with one another in the X-direction on the back substrate 101 side, and N detection electrodes Rx are formed in parallel with one another in the Y-direction on the front substrate 102 side. Note that the example of FIG. 1 shows a case in which the number M of the drive electrodes Tx is 8 (M=8). On the peripheral area Af, circuit units and the like that are connected to the drive electrodes Tx and the detection electrodes Rx are formed. In the configuration example of FIG. 1, touch driving units 50 which are circuit units each mounted in areas on both sides of the peripheral area Af in the X-direction and a first IC chip 211 which is mounted in an area on the lower side of the peripheral area Af in the Y-direction are provided on the back substrate 101 side.

The touch driving unit 50 is a circuit unit for the touch driving of the plurality of drive electrodes Tx. On the first IC chip 211, a control unit and the like of the touch sensor device 1 are mounted. Alternatively, the touch driving unit 50 and the like may be mounted on the first IC chip 211. The first IC chip 211 is connected to the touch driving unit 50 and a flexible printed board 230. The flexible printed board 230 on the back substrate 101 side is integrally connected to a flexible printed board 230 on the front substrate 102 side. One end portion (not shown) of the flexible printed board 230 is connected to an external electronic equipment or the like.

On the front substrate 102 side, the flexible printed board 230 connected to end portions of the detection electrodes Rx is provided on the lower side of the peripheral area Af in the Y-direction. The flexible printed board 230 on the front substrate 102 side has a second IC chip 212 mounted thereon. On the second IC chip 212, a touch detection unit 60 to be described later for carrying out the touch detection from the detection electrodes Rx is mounted as a circuit unit. The first IC chip 211 and the second IC chip 212 are connected to each other through the flexible printed board 230. The touch sensor device 1 synchronously controls the first IC chip 211 and the second IC chip 212.

In the present embodiment, the plurality of drive electrodes Tx are arranged in the Y-direction side by side so as to extend in parallel with one another in the X-direction, and the plurality of detection electrodes Rx are arranged in the X-direction side by side so as to extend in parallel with one another in the Y direction. The drive electrodes Tx and the detection electrodes Rx intersect with each other with a predetermined distance therebetween in the Z-direction, and are made orthogonal to each other particularly in the X-direction and the Y-direction.

[Panel Unit Cross Section]

Figure 2:
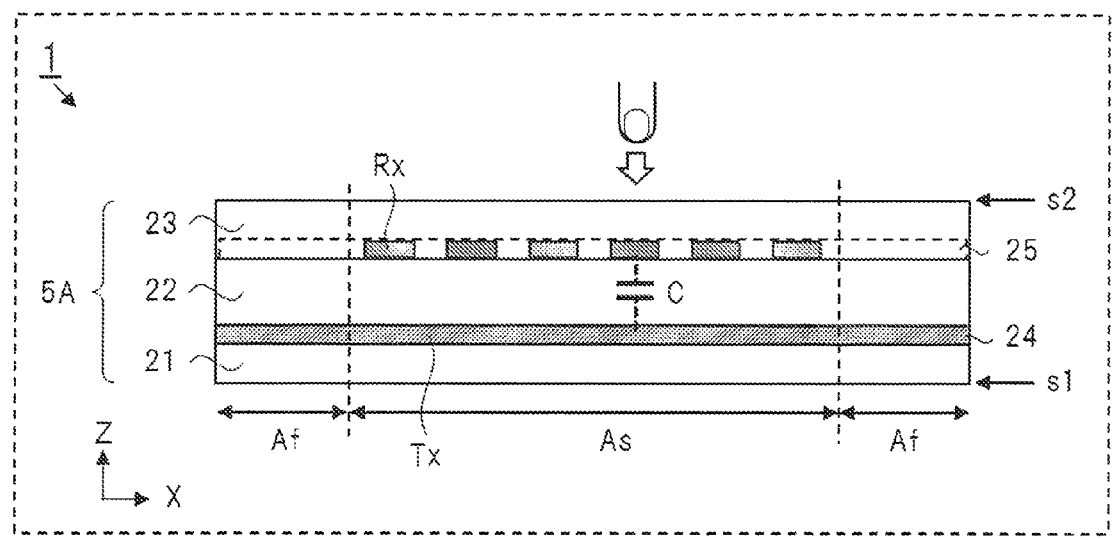
FIG. 2 is a diagram showing a configuration of an XZ cross section of the panel unit of the embodiment 1A.

FIG. 2 shows a schematic configuration of an XZ cross section of a panel unit 5A constituting the touch sensor device 1 of the embodiment 1A. The panel unit 5A has a configuration in which a substrate layer 21, a drive electrode layer 24, a dielectric layer 22, a detection electrode layer 25 and a protective layer 23 are stacked in this order from the lower side in the Z-direction. A reference symbol C denotes a capacitance correspondingly formed in the vicinity of the intersecting portion between the drive electrode Tx and the detection electrode Rx. A reference symbol s1 denotes a back surface of the panel unit 5A and s2 denotes a surface of the panel unit 5A to be touched.

The back substrate 101 of FIG. 1 is configured to include the substrate layer 21, the drive electrode layer 24, the dielectric layer 22 and other members of FIG. 2. The front substrate 102 of FIG. 1 is configured to include the dielectric layer 22, the detection electrode layer 25, the protective layer 23 and other members of FIG. 2.

As the substrate layer 21, the dielectric layer 22 and the protective layer 23, for example, various insulating materials such as glass and plastic materials may be applied. In particular, in the case of a touch sensor device for a display device, the substrate layer 21, the dielectric layer 22 and the protective layer 23 are mainly made of a visible light transparent material.

The drive electrode layer 24 is a layer on which the drive electrodes Tx are formed. The detection electrode layer 25 is a layer on which the detection electrodes Rx are formed. The drive electrode layer 24 and the detection electrode layer 25 can be made of various conductive materials. In particular, in the case of a touch sensor device for a display device, the drive electrode layer 24 and the detection electrode layer 25 are mainly made of a visible light transparent material such as indium tin oxide (ITO) and the like. The material of the drive electrodes Tx and the detection electrodes Rx is not limited to ITO, and they may be made of, for example, a metal material having a resistance lower than that of the ITO or a combined material of ITO and a metal material having a low resistance. Note that the drive electrode layer 24 includes a portion where the wire formed in the peripheral area Af and the end portion of each drive electrode Tx are connected. The detection electrode layer 25 includes a portion where the wire formed in the peripheral area Af and the end portion of each detection electrode Rx are connected.

[Touch Sensor Device and Electronic Equipment]

Figure 3:
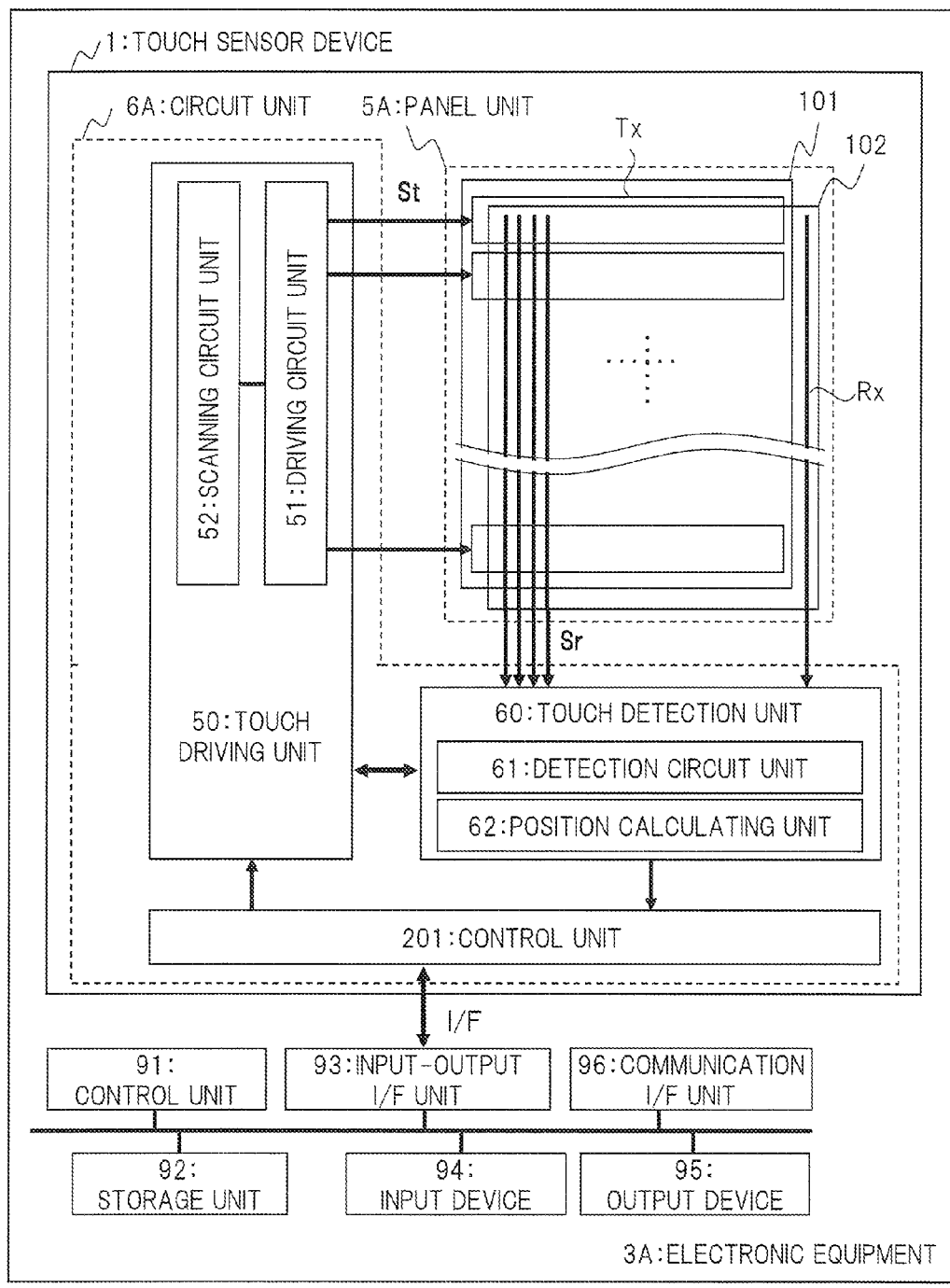
FIG. 3 is a diagram showing a functional block configuration of the touch sensor device of the embodiment 1A and a configuration of an electronic equipment provided with the touch sensor device of the embodiment 1A.
Figure 4:
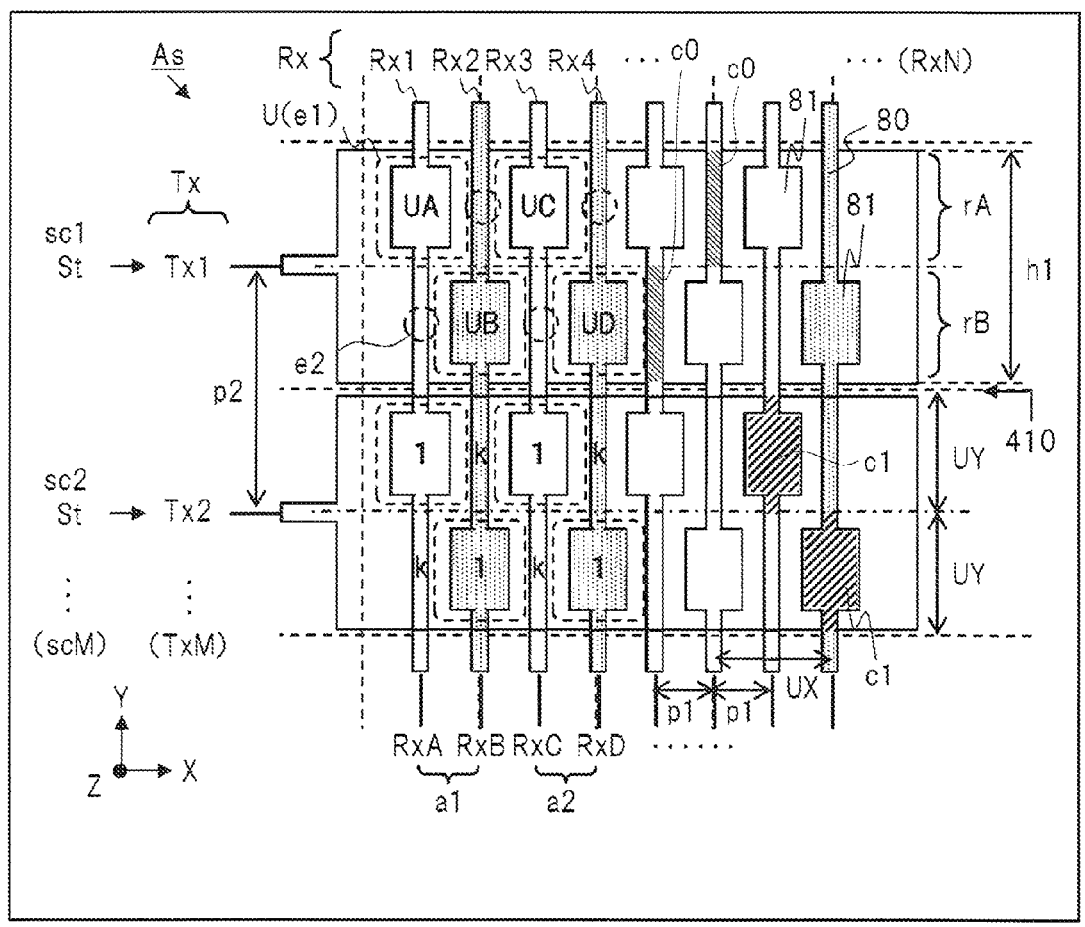
FIG. 4 is a diagram showing a configuration of an XY plane of electrodes and the like in a touch detection area as an outline of the touch sensor device of the embodiment 1A.

FIG. 3 shows a functional block configuration of the touch sensor device 1 of the embodiment 1A and a configuration of an electronic equipment 3A provided with the touch sensor device 1 of the embodiment 1A. The touch sensor device 1 has a panel unit 5A and a circuit unit 6A. The circuit unit 6A has a touch driving unit 50, a touch detection unit 60 and a control unit 201. The touch driving unit 50 includes a driving circuit unit 51 and a scanning circuit unit 52. The touch detection unit 60 includes a detection circuit unit 61 and a position calculating unit 62.

The control unit 201 is a control unit of the touch sensor device 1, and controls the touch sensor function based on an instruction from a control unit 91 in cooperation with the control unit 91 of the electronic equipment 3A serving as a high-order device through an input-output I/F unit 93. Note that the I/F is an abbreviation of an interface. The control unit 201 gives a control instruction of a touch driving to the touch driving unit 50, and receives touch detection information such as the presence or absence of a touch and a position thereof from the touch detection unit 60. Moreover, the control unit 201 transmits the touch detection information as a report to the control unit 91 of the electronic equipment 3A. Note that the touch driving unit 50 may be incorporated in the control unit 201 or the touch detection unit 60 may be incorporated in the control unit 201. Moreover, the touch driving unit 50 and the touch detection unit 60 may be designed to perform the control in synchronization with each other by omitting the control unit 201.

Based on the control instruction from the control unit 201, the touch driving unit 50 generates a touch driving signal St to be an input signal for driving the drive electrodes Tx of the touch detection area As. Then, the touch driving unit 50 carries out a touch driving to apply the touch driving signal St to the drive electrodes Tx in the touch detection period Ks by using a driving circuit unit 51 and a scanning circuit unit 52. The driving circuit unit 51 is connected to the end portions of the respective drive electrodes Tx through wires. In the touch driving, the scanning circuit unit 52 carries out a scan driving to sequentially apply the touch driving signal St to each of the plurality of drive electrodes Tx of the touch detection area As. The touch driving unit 50 can arbitrarily select the drive electrode Tx to be scanned and control the order of scan in the scan driving and the like by using the scanning circuit unit 52.

In accordance with the above-mentioned touch driving, the touch detection unit 60 receives an output signal from the detection electrodes Rx to detect it as a touch detection signal Sr, and carries out the process of acquiring touch detection information. The detection circuit unit 61 includes, for example, an amplifier, a rectifier, an analog-digital converter, and the like. The detection circuit unit 61 receives the output signal from the detection electrodes Rx and amplifies, rectifies, and then analog-digital converts the signal, thereby acquiring the signal as the touch detection signal Sr. The position calculating unit 62 calculates the presence or absence of a touch, the detailed position thereof and the like in the touch detection area As by using a plurality of touch detection signals Sr corresponding to the plurality of detection units U of the touch detection area As obtained by the detection circuit 61, and acquires and outputs the results as the touch detection information. Note that, by the calculations using the plurality of touch detection signals Sr in the plurality of detection units U, the touch detection unit 60 can detect the position of a touch with precision higher than that of the matrix configuration of the detection units U.

The electronic equipment 3A includes the touch sensor device 1, a control unit 91, a storage unit 92, an input-output I/F unit 93, an input device 94, an output device 95, a communication I/F unit 96, a bus, other power supply unit (not shown) and the like. The control unit 91 is configured by, for example, a CPU, a ROM, a RAM, and programs or the like operated thereon. For example, the CPU carries out a computing process in accordance with the program loaded from the ROM to the RAM, thereby controlling the electronic equipment 3A. The storage unit 92 is constituted by a primary memory, a secondary memory and data information or the like that are stored therein. The input-output I/F unit 93 to which the touch sensor device 1 is connected carries out interface processes with the touch sensor device 1. The input device 94 is constituted by key buttons and an interface processing unit thereof or the like, but this can be omitted. The output device 95 is constituted by a display device and an interface processing unit thereof or the like, but this can be omitted. The communication I/F unit 96 is constituted by a board or the like for carrying out a communication interface process, but this can be omitted.

[Touch Detection Area]

FIG. 4 shows a configuration of the drive electrodes Tx, the detection electrode Rx and the like of the touch detection area As in the embodiment 1A. The present embodiment 1A has a configuration in which the width in the electrode shape of each drive electrode Tx in the Y-direction in the touch detection area As is made larger than that of the comparative example. The width h1 of the drive electrode Tx of the embodiment 1A is about twice as large as the width h0 of the comparative example, and $h1 \approx 2 \times h0$ and $h1 \approx 2 \times UY$ are satisfied. Moreover, the number M of the drive electrodes Tx in the touch detection area As becomes ½ of the number m of the comparative example. In other words, the embodiment 1A has a configuration in which the two drive electrodes Tx adjacent in the Y-direction of the comparative example are integrally formed into one drive electrode Tx. The pitch of the arrangement of the drive electrodes Tx in the Y-direction is a constant pitch p2 that is twice as large as the pitch p0 of the comparative example.

The M drive electrodes Tx in the touch detection area As are sequentially represented as drive electrode Tx1 to drive electrode TxM from the upper side in the Y-direction. In the drive electrodes Tx, the upper half region in the Y-direction is defined as a first region rA, and the lower half region in the Y-direction is defined as a second region rB. The plurality of drive electrodes Tx are arranged in parallel with one another at a short interval in the Y-direction. A slit corresponding to the short interval is disposed at a linear portion indicated by a reference numeral 410 between the drive electrodes Tx adjacent in the Y-direction, for example, between the drive electrode Tx1 and the drive electrode Tx2. Thus, the drive electrodes Tx adjacent in the Y-direction are electrically separated from each other.

Each drive electrode Tx has a width h1 capable of forming two detection units U in the Y-direction. The upper half region having a width capable of forming one of the detection units U in the width h1 of the drive electrode Tx in the Y-direction corresponds to the first region rA and the lower half region having a width capable of forming the other detection unit U corresponds to the second region rB.

As means for shortening the touch driving time Tall of the drive electrodes Tx in the touch detection area As and the touch detection period Ks including it, the embodiment 1A has a configuration in which the scan driving is carried out in units of the above-mentioned drive electrode Tx integrally formed to have the large width h1. For example, the touch driving unit 50 of the circuit unit 6A applies the touch driving signal St to the drive electrode Tx1 as an input signal at the time of the first scan sc1, and applies the touch driving signal St to the drive electrode Tx2 as an input signal at the time of the second scan sc2.

In association with the configuration of the drive electrodes Tx described above, a number N of detection electrodes Rx which are twice as large as a number n of detection electrodes Rx of the comparative example are provided in the embodiment 1A. The detection electrodes Rx are formed at a constant pitch p1 which is ½ of the pitch p0 of the detection electrodes Rx of the comparative example. The detection electrodes Rx are provided at such a ratio that two detection electrodes Rx intersect with an approximately square-shaped region of one drive electrode Tx with the width h0 of the comparative example. The detection electrodes Rx are provided at such a ratio that four detection electrodes Rx intersect with an approximately square-shaped region of one drive electrode Tx with the width h1 of FIG. 4. The number N of the detection electrodes Rx is four times as large as the number M of the drive electrodes Tx. The pitch p1 of the detection electrodes Rx is ¼ of the pitch p2 of the drive electrodes Tx.

In the touch detection area As, four detection electrodes Rx, that is, detection electrode RxA to detection electrode RxD are arranged so as to intersect for each drive electrode Tx with the width h1 in the Y-direction. For example, in a set a1, the detection electrode RxA corresponds to the detection electrode Rx1, and the detection electrode RxB corresponds to the detection electrode Rx2. In a set a2, the detection electrode RxC corresponds to the detection electrode Rx3, and the detection electrode RxD corresponds to the detection electrode Rx4. With respect to an approximately square-shaped region in the X-direction and the Y-direction in one drive electrode Tx, four detection electrodes Rx, that is, detection electrodes RxA to RxD are provided on one drive electrode Tx, so that four detection units U, that is, detection units UA to UD are formed. In the embodiment 1A, the detection units UA to UD are considered as one set.

The detection unit UA is formed by an intersection between the first region rA of the drive electrode Tx1 and the detection electrode RxA. The detection unit UB is formed by an intersection between the second region rB of the drive electrode Tx1 and the detection electrode RxB. The detection unit UC is formed by an intersection between the first region rA of the drive electrode Tx1 and the detection electrode RxC. The detection unit UD is formed by an intersection between the second region rB of the drive electrode Tx1 and the detection electrode RxD.

In the touch detection area As, a detection region e1 serving as a first detection region with a first touch detection sensitivity and a non-detection region e2 serving as a second detection region with a second touch detection sensitivity, which are configured by the difference in shape of the detection electrodes Rx, are formed. The region denoted by e1 with a broken line frame is a region which is mainly subjected to touch detection and forms the detection unit U, and this region is referred to as a first detection region or the detection region e1 for convenience of description. In the touch detection area As, the detection regions e1 and the non-detection regions e2 are alternately disposed in the X-direction and in the Y-direction.

Meanwhile, the region denoted by e2 with a round sign is a region where no touch detection is required, and this region is referred to as a second detection region or the non-detection region e2 for convenience of description. The non-detection region e2 is provided as a region located between the detection units U adjacent in the X-direction. Examples of the non-detection region e2 are a region in the vicinity of the intersecting portion c0 between the first region rA of the drive electrode Tx1 and the detection electrode RxB, which is located between the detection unit UA and the detection unit UC, and a region in the vicinity of the intersecting portion c0 between the second region rB of the drive electrode Tx1 and the detection electrode RxC, which is located between the detection unit UB and the detection unit UD. In the same manner, examples of the non-detection region e2 are a region in the vicinity of the intersecting portion c0 between the first region rA of the drive electrode Tx1 and the detection electrode RxD, which is located on the right side of the detection unit UC in the X-direction, and a region in the vicinity of the intersecting portion c0 between the second region rB of the drive electrode Tx1 and the detection electrode RxA, which is located on the left side of the detection unit UB in the X-direction.

In the embodiment 1A, in order to ensure a touch detection sensitivity for each detection unit U relative to the comparative example, the size of the detection units UA to UD forming the detection regions e1 is ensured so as to have approximately the same size as that of the detection unit U of the comparative example.

In the touch detection area As, the detection units UA to UD serving as four detection units U are formed so as to correspond to the detection regions e1. An approximately square-shaped region in which the detection units UA to UD are formed as one set is referred to as a touch detection region for convenience of description. The touch detection regions are repeatedly disposed in the touch detection area As in the X-direction and in the Y-direction. The approximately square-shaped touch detection region is indicated as a touch detection region 600 in FIG. 5, FIG. 6, and others to be described later.

The detection electrode RxA is disposed on a center line in the X-direction of the approximately square shape corresponding to the detection unit UA. In other words, the detection unit UA is formed in the vicinity of an intersecting portion c1 between a thin line of the detection electrode RxA extending in the Y-direction serving as the center line and the first region rA of the drive electrode Tx1. In the same manner, the detection electrode RxB is disposed on a center line in the X-direction of the approximately square shape corresponding to the detection unit UB. In other words, the detection unit UB is formed in the vicinity of the intersecting portion c1 between a thin line of the detection electrode RxB extending in the Y-direction serving as the center line and the second region rB of the drive electrode Tx1. On the other hand, no detection unit U is formed in the vicinity of the intersecting portion c1 between the detection electrode RxA and the second region rB of the drive electrode Tx and in the vicinity of the intersecting portion c1 between the detection electrode RxB and the first region rA of the drive electrode Tx1. In the embodiment 1A, the region in which no detection unit U is formed is considered as a border portion between the detection units U adjacent in the X-direction.

In the embodiment 1A, with the above-mentioned configuration, the touch detection density corresponding to a density of the arrangement of the detection units U in the touch detection area As can be maintained to be approximately the same as the touch detection density of the comparative example. In addition, since the embodiment 1A has a configuration in which the scan driving is carried out in units of the drive electrode Tx obtained by integrally forming two drive electrodes Tx adjacent in the Y-direction of the comparative example into one electrode, the touch driving time and the touch detection period in the touch detection area As can be shortened. The scan driving of one drive electrode Tx of the embodiment 1A corresponds to the driving in which the two drive electrodes Tx adjacent in the Y-direction of the comparative example are simultaneously driven.

The touch driving unit 50 of the circuit unit 6A applies a touch driving signal St serving as an input signal to one drive electrode Tx in one scan. At the time of this one scan, in the touch detection region having the approximately square shape, for example, a first output signal is obtained from the detection unit UA of the first region rA of the drive electrode Tx1 through the detection electrode Rx1 serving as the detection electrode RxA, and a second output signal is obtained from the detection unit UB of the second region rB of the drive electrode Tx1 through the detection electrode Rx2 serving as the detection electrode RxB. In the same manner, at the time of this one scan, a third output signal is obtained from the detection unit UC of the first region rA of the drive electrode Tx1 through the detection electrode Rx3 serving as the detection electrode RxC, and a fourth output signal is obtained from the detection unit UD of the second region rB of the drive electrode Tx1 through the detection electrode Rx4 serving as the detection electrode RxD. More specifically, by scanning one drive electrode Tx, the above-mentioned first to fourth output signals are obtained from the respective touch detection regions having an approximately square shape including the detection units UA to UD.

Figure 5:
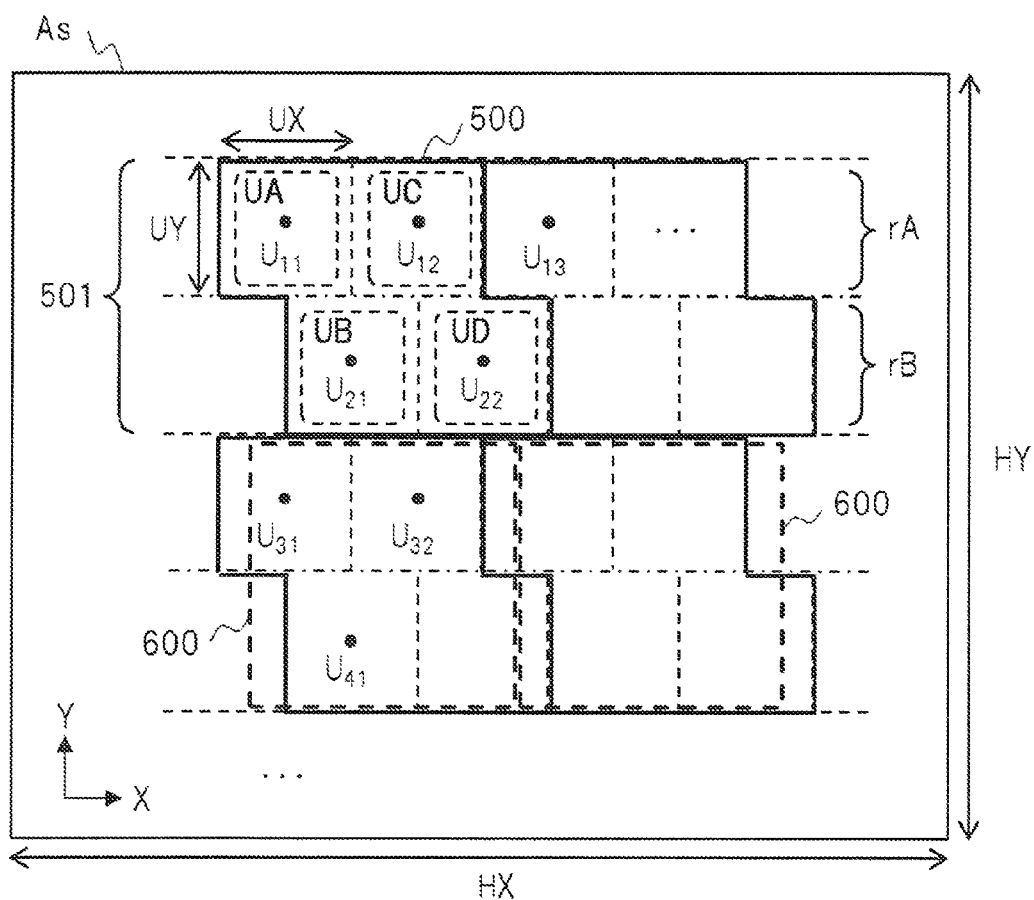
FIG. 5 is a diagram showing a matrix configuration of detection units in the touch detection area of the embodiment 1A.

FIG. 5 shows a matrix configuration of the detection units U in the touch detection area As corresponding to the configuration of FIG. 4. A reference numeral 501 denotes a region corresponding to the drive electrode Tx1. A reference numeral 500 denotes an example of the touch detection region corresponding to the touch detection region 600 having an approximately square shape in which the detection units UA to UD are formed, in the region 501 corresponding to the drive electrode Tx1. As shown by the touch detection region 500, the touch detection region 600 having an approximately square shape strictly has a shape in which a rectangular shape including the detection unit UB and the detection unit UD of the second region rB is disposed so as to be shifted relative to a rectangular shape including the detection unit UA and the detection unit UC of the first region rA in the X-direction by a distance of about the pitch p1 (see FIG. 4). The shape of the touch detection region 500 corresponds to the configuration in which the detection region e1 and the non-detection region e2 are alternately disposed in the X-direction and in the Y-direction.

When the center points of the approximately square shapes of the respective detection units U shown in FIG. 5 are connected to one another, a lattice having an approximately triangular shape is formed. When the center points of the respective touch detection regions 500 are connected to one another or when the center points of the respective touch detection regions 600 are connected to one another, a lattice having an approximately square shape is formed. Note that, in FIG. 5, each of the detection units U is formed to have a square shape, and the respective detection units U are indicated in such a manner that the detection unit UA is U11, the detection unit UB is U21, and the like by using row numbers and column numbers. The first region rA and the second region rB respectively correspond to one row, and one set of two detection electrodes Rx corresponds to one column.

As shown in FIG. 5, the touch detection density corresponding to a density of the arrangement of the detection units U in the touch detection area As of the embodiment 1A is maintained so as to be approximately the same as the touch detection density in the touch detection area As of the comparative example. Note that the shape of the detection units U is not limited to the above-mentioned square shape, and various configurations may be used. Moreover, the arrangement of the detection units U is not limited to the above-mentioned arrangement in which a triangular lattice shape is formed when center points are connected to one another, and various configurations may be used. Furthermore, the arrangement of the touch detection regions 500 or the touch detection regions 600 is not limited to the above-mentioned arrangement in which an approximately square lattice shape is formed when the center points of the respective touch detection regions 500 are connected to one another or when the center points of the respective touch detection regions 600 are connected to one another, and various configurations may be used.

In FIG. 4, in the detection units UA to UD serving as the detection regions e1, a first touch detection sensitivity thereof is preferably as high as possible, that is, an output signal from the detection electrode Rx is preferably as large as possible. In contrast, in the non-detection regions e2, a second touch detection sensitivity thereof is preferably as low as possible, that is, an output signal from the detection electrode Rx is preferably as small as possible.

Therefore, in the embodiment 1A, in order to obtain an output signal with a predetermined desirable touch detection sensitivity as a plurality of output signals from the touch detection regions including the detection units UA to UD corresponding to the plurality of detection units U, a configuration in which the shape of the detection electrodes Rx is devised is provided. In this configuration, the electrode shape of the detection region e1 and the electrode shape of the non-detection region e2 are different from each other.

In the configuration of FIG. 4, a protruding electrode portion 81 is provided at a portion of the detection electrode Rx corresponding to the position of each of the detection units UA to UD serving as the detection region e1, and no protruding electrode portion 81 is formed for the non-detection region e2 so as to remain as a thin line. By using the configuration in which the protruding electrode portion 81 is formed on the detection electrodes Rx so as to correspond to the detection units U, the first touch detection sensitivity in the detection unit U of the detection region e1 is made relatively higher than the second touch detection sensitivity of the non-detection region e2. Thus, a predetermined ratio of the touch detection sensitivities is given between the detection region e1 and the non-detection region e2. In this manner, four output signals with predetermined touch detection sensitivities are obtained from the approximately square-shaped touch detection region including the detection units UA to UD of the drive electrode Tx.

[Electrode Configuration and Touch Detection Sensitivity]

Figure 6:
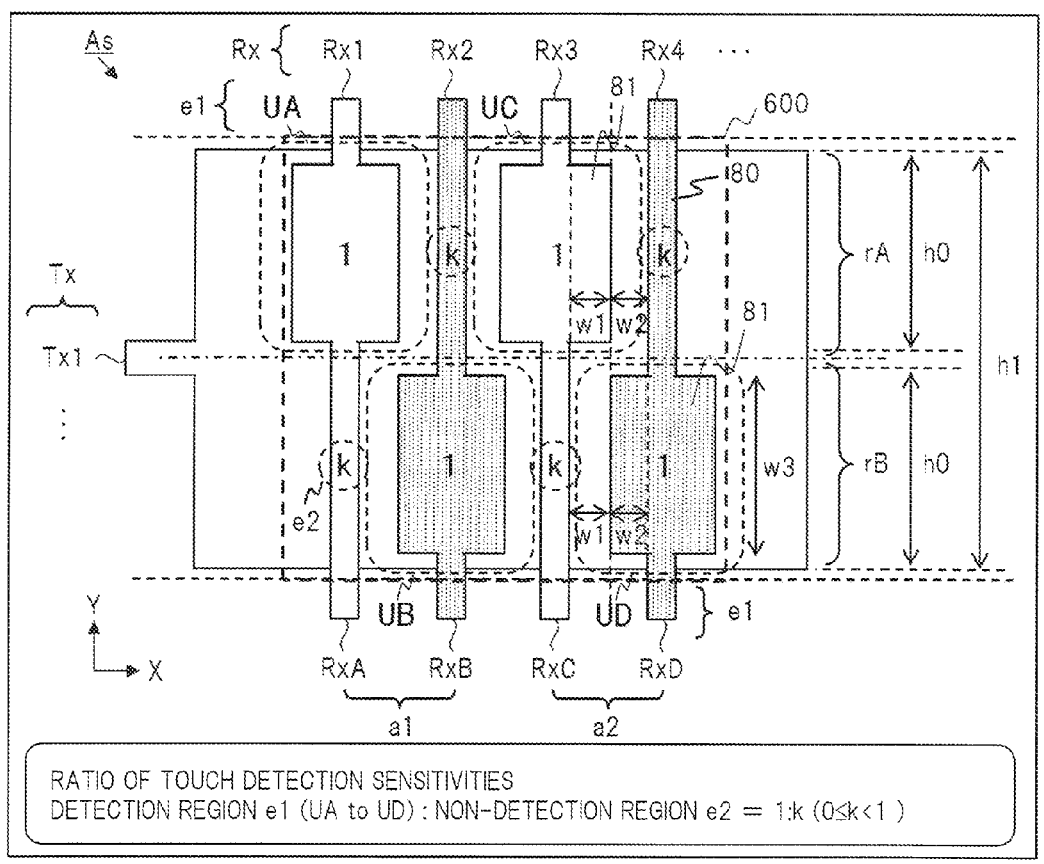
FIG. 6 is an enlarged view showing the electrodes and the like in the touch detection area of the embodiment 1A.

FIG. 6 shows the touch detection region 600 including the detection units UA to UD as a partially enlarged view of the configuration of FIG. 4. The detailed electrode shape and the configuration relating to the ratio of the touch detection sensitivities will be described with reference to FIG. 6. The width of the first region rA and the second region rB of the drive electrode Tx in the Y-direction is schematically the same as the width h0.

Suppose that the ratio of touch detection sensitivities between the detection region e1 and the non-detection region e2 is 1:k. Suppose that the first touch detection sensitivity in the detection unit U corresponding to the detection region e1 is 1 as a reference and the second touch detection sensitivity at a portion corresponding to the non-detection region e2 is defined as k that is smaller than 1. Here, with respect to k, $0 \leq k < 1$ is satisfied. As described above, k is preferably set to a value as close to 0 as possible.

As means for forming the ratio of the touch detection sensitivities, the embodiment 1A provides the protruding electrode portion 81 as the shape of the detection electrodes Rx in the following manner. At a portion where the detection unit U is formed, the detection electrode Rx has the protruding electrode portion 81 corresponding to an electrode portion that protrudes laterally toward both sides in the X-direction from the thin line portion 80 with a fixed width serving as a reference. In each of the detection units UA to UD, the shape of the protruding electrode portion 81 is the same.

In the configuration shown in FIG. 6, the presence or absence and the shape or the like of the protruding electrode portion 81 of the detection electrode Rx are designed so that the predetermined ratio of touch detection sensitivities between the detection region e1 and the non-detection region e2, that is, 1:k is provided. In this configuration, a protruding width w1 of the protruding electrode portion 81 in the X-direction and a width w2 of a gap to the thin line portion 80 of the adjacent detection electrode Rx are adjusted. Moreover, in this configuration, a width w3 of the protruding electrode portion 81 in the Y-direction, an area of the protruding electrode portion 81, an area of a region between the protruding electrode portion 81 and the adjacent thin line portion 80 and others are adjusted. Note that, in the configuration example of FIG. 6, the case where the width w1 and the width w2 are the same and the width w1 that protrudes in the X-direction is the same on the lateral two sides is shown. The protruding electrode portion 81 is not limited to a simple rectangular shape on the XY plane, and various shapes may be used.

[Electrode Configuration Example]

Figure 7:
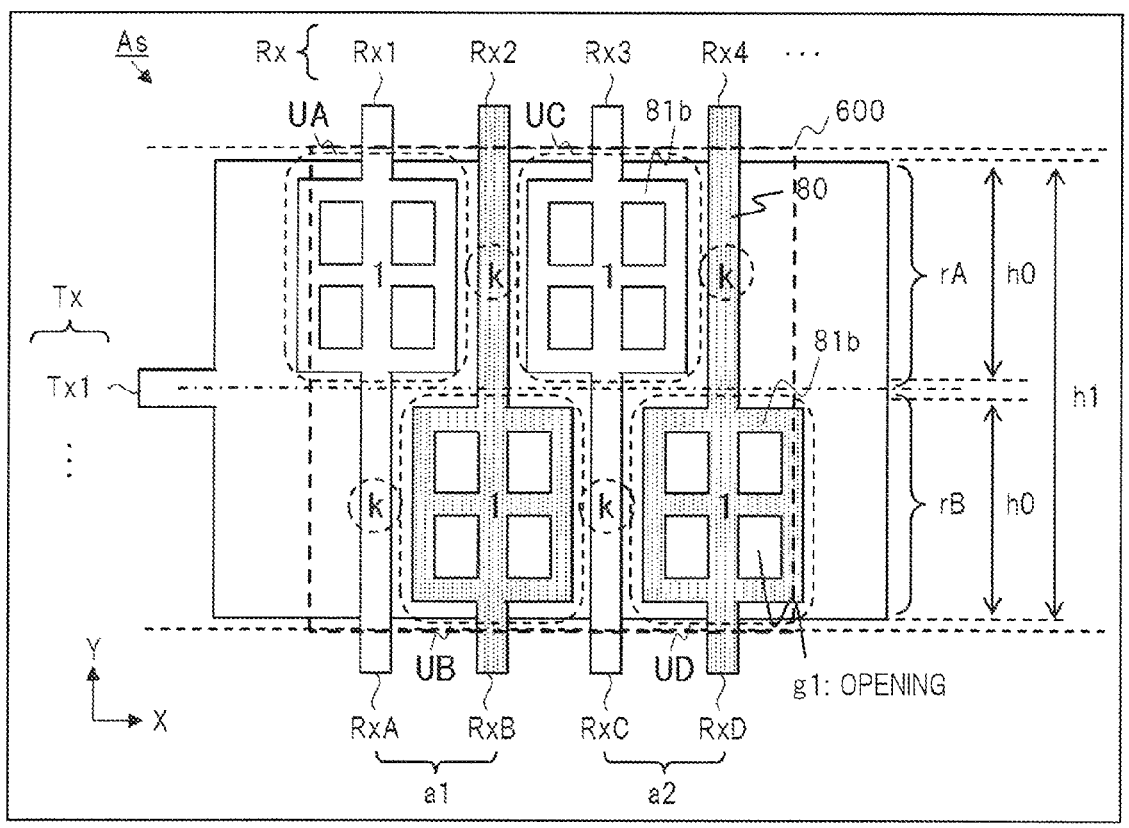
FIG. 7 is an enlarged view showing a configuration example of the electrodes and the like in the touch detection area of the embodiment 1A.

As a configuration example of the embodiment 1A, FIG. 7 shows a configuration example of the touch detection region 600 having a more detailed electrode shape than the configuration of FIG. 6. The configuration example of the electrodes of the touch detection area As of FIG. 7 differs from the configuration of FIG. 6 in that the protruding electrode portion 81 of the detection electrode Rx corresponding to the portion of the detection unit U has a different shape. In the configuration example of FIG. 7, the presence or absence and the shape or the like of the protruding electrode portion 81b including an opening g1 of the detection electrode Rx are designed so that the predetermined ratio of touch detection sensitivities between the detection region e1 and the non-detection region e2, that is, 1:k is provided.

In the configuration example of FIG. 7, the protruding electrode portion 81b is an electrode portion that protrudes toward each of the lateral two sides in the X-direction from the thin line portion 80 of the detection electrode Rx extending in the Y-direction so as to include the openings g1. The opening g1 is a region in which no detection electrode Rx is formed, and it is a region in which no detection electrode Rx is superposed on the surface of the drive electrode Tx. Note that, in FIG. 7, when seen on the XY plane, a region from which the drive electrode Tx located under the detection electrode Rx in the Z-direction is exposed corresponds to the opening g1. The protruding electrode portion 81b has a peripheral portion of the rectangular shape closed by a thin line portion, and one or more openings g1 are formed inside the peripheral portion.

In the configuration example of FIG. 7, the protruding electrode portion 81b is provided with a total of four openings g1, that is, two by two in the X-direction and the Y-direction inside the peripheral portion. Moreover, in this configuration example, the protruding electrode portion 81b including the openings g1 is constituted by thin line portions each having the same width as that of the thin line portion 80 of the detection electrode Rx. Each of the openings g1 has the same rectangular shape, and the peripheral portion of the rectangular shape is constituted by thin line portions. In the protruding electrode portion 81b on the lateral two sides in the X-direction relative to the thin line portion 80 of the detection electrode Rx, the four openings g1 inside the peripheral portion of the rectangular shape are separated from one another by the thin line portion 80 extending in the Y-direction and a thin line portion extending in the X-direction. In the protruding electrode portion 81b of a portion on one of the lateral sides in the X-direction relative to the thin line portion 80 of the detection electrode Rx, the two openings g1 disposed parallelly in the Y-direction inside the peripheral portion of the rectangular shape are separated from each other by the thin line portion extending in the X-direction. The position of the thin line portion extending in the X-direction inside the protruding electrode portion 81b corresponds to the center position of the protruding electrode portion 81b in the Y-direction. Moreover, in the present embodiment, the width between the protruding electrode portion 81b and the thin line portion 80 of the detection electrode Rx adjacent in the X-direction is made as small as possible so that the area of the protruding electrode portion 81b is enlarged as much as possible. Note that the shape of the opening g1 is not limited to the rectangular shape, and different shapes may be used. The number of the openings g1 is not limited to four, and different numbers may be used.

In the configuration example of FIG. 7, owing to the shape of the protruding electrode portion 81b including the openings g1, the regions in which an electric field is formed between the drive electrode Tx on the lower side in the Z-direction and the detection electrode Rz on the upper side in the Z-direction through the opening g1 are increased. Thus, in comparison with a configuration of the flat plate-shaped protruding electrode portion 81 of FIG. 6 without the openings g1, the number of regions in which an electric field is formed between the drive electrode Tx and the detection electrode in the detection unit U is increased in the configuration example of FIG. 7, so that the touch detection sensitivity becomes higher. As a result, in the configuration example of FIG. 7, 1/k which is the ratio of the touch detection sensitivities can be made higher, in other words, it is possible to make k closer to 0.

[Electric Field]

Figure 8:
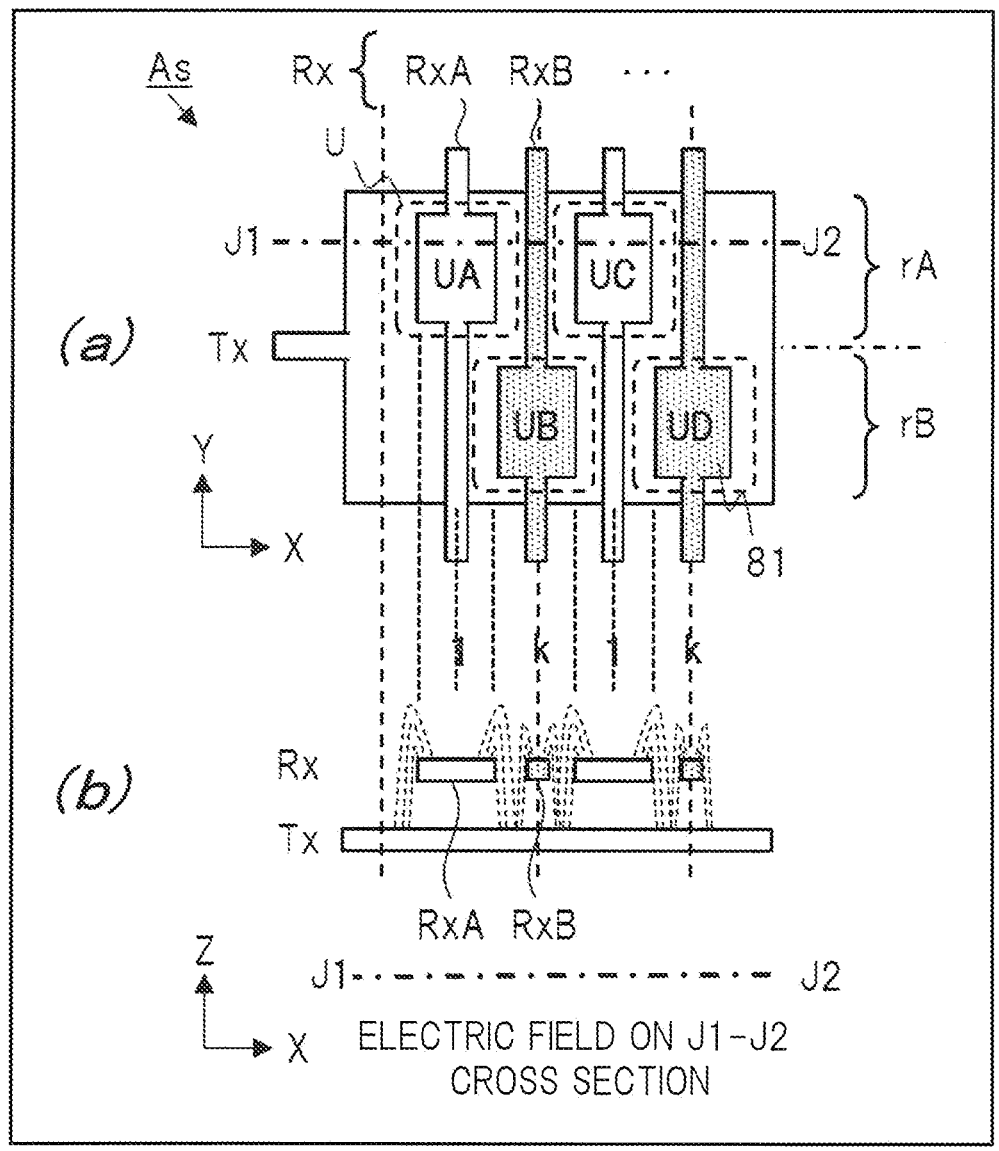
FIG. 8 includes diagrams (a) and (b) each showing a state of an electric field generated in the configuration of FIG. 6.

FIG. 8 shows a state of an electric field generated in the vicinity of the detection unit U, which corresponds to the configuration of FIG. 6 of the embodiment 1A. A diagram (a) of FIG. 8 shows an XY plane of the touch detection region 600 including the detection units UA to UD of FIG. 6. A diagram (b) of FIG. 8 schematically shows the state of the generation of an electric field on an XZ cross section corresponding to a J1-J2 line of the first region rA of the diagram (a) of FIG. 8. An electric field is generated between the upper surface of the drive electrode Tx on the lower side in the Z-direction and the upper surface of the protruding electrode portion 81 of the detection electrode RxA on the upper side in the Z-direction through the detection electrodes Rx. Moreover, an electric field is generated between the upper surface of the drive electrode Tx on the lower side in the Z-direction and the upper surface of the thin line portion 80 of the detection electrode RxB on the upper side in the Z-direction. Supposing that the touch detection sensitivity relative to the electric field generated between the upper surface of the drive electrode Tx and the upper surface of the protruding electrode portion 81 of the detection electrode RxA is 1, the touch detection sensitivity relative to the electric field generated between the upper surface of the drive electrode Tx and the upper surface of the thin line portion 80 of the detection electrode RxB is k.

Figure 9:
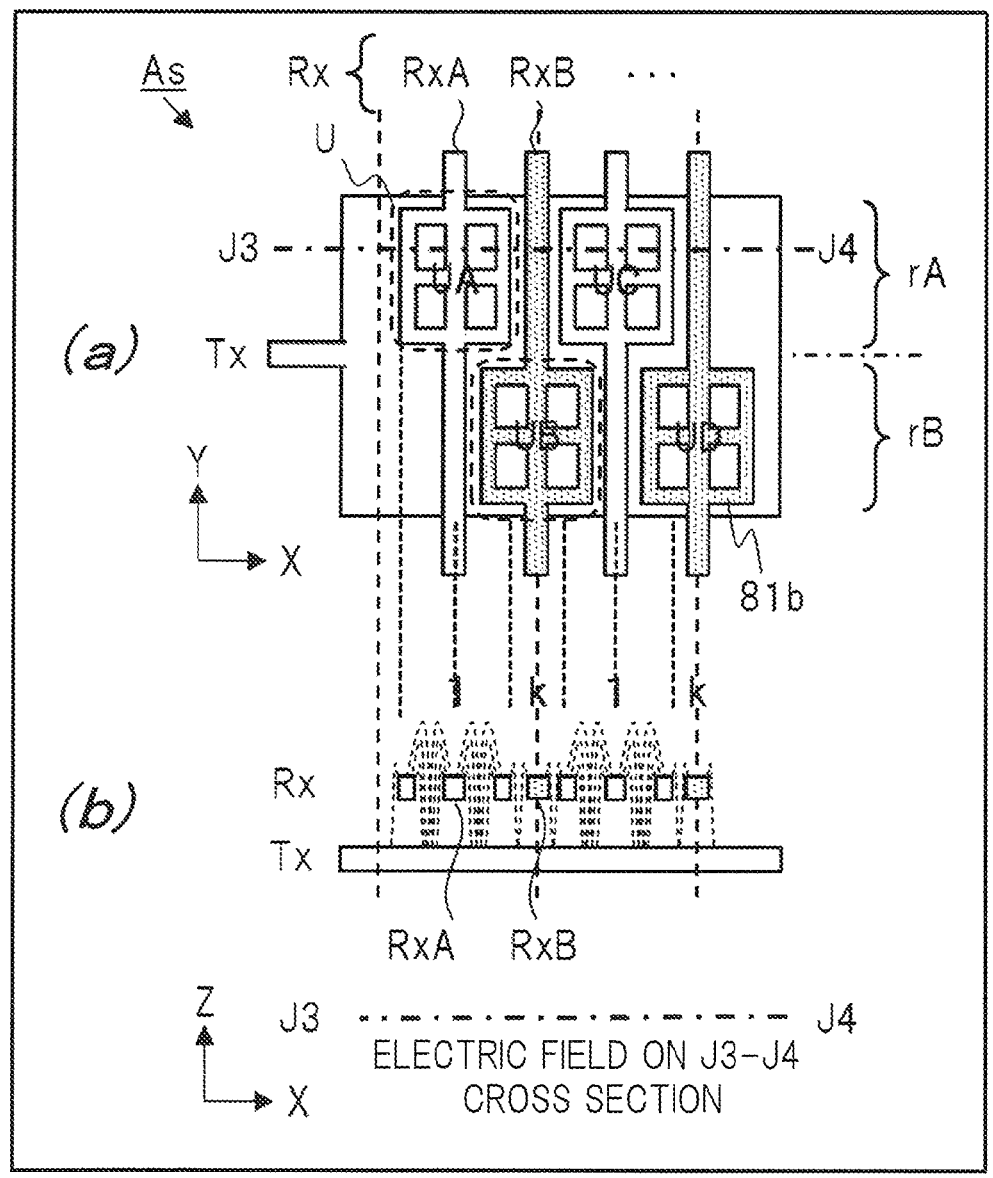
FIG. 9 includes diagrams (a) and (b) each showing a state of an electric field generated in the configuration of FIG. 7.

FIG. 9 shows a state of an electric field generated in the vicinity of the detection unit U, which corresponds to the configuration example of FIG. 7 of the embodiment 1A. A diagram (a) of FIG. 9 shows an XY plane of the touch detection region 600 including the detection units UA to UD of FIG. 7. A diagram (b) of FIG. 9 schematically shows the state of the generation of an electric field on an XZ cross section corresponding to a J3-J4 line of the first region rA of the diagram (a) of FIG. 9. An electric field is generated between the upper surface of the drive electrode Tx on the lower side in the Z-direction and the upper surface of the protruding electrode portion 81b of the detection electrode RxA on the upper side in the Z-direction through the openings g1. Moreover, an electric field is generated between the upper surface of the drive electrode Tx on the lower side in the Z-direction and the upper surface of the thin line portion 80 of the detection electrode RxB on the upper side in the Z-direction. Supposing that the touch detection sensitivity relative to the electric field generated between the upper surface of the drive electrode Tx and the upper surface of the protruding electrode portion 81b of the detection electrode RxA is 1, the touch detection sensitivity relative to the electric field generated between the upper surface of the drive electrode Tx and the upper surface of the thin line portion 80 of the detection electrode RxB is k.

[Touch Driving Method and Signal]

Figure 10:
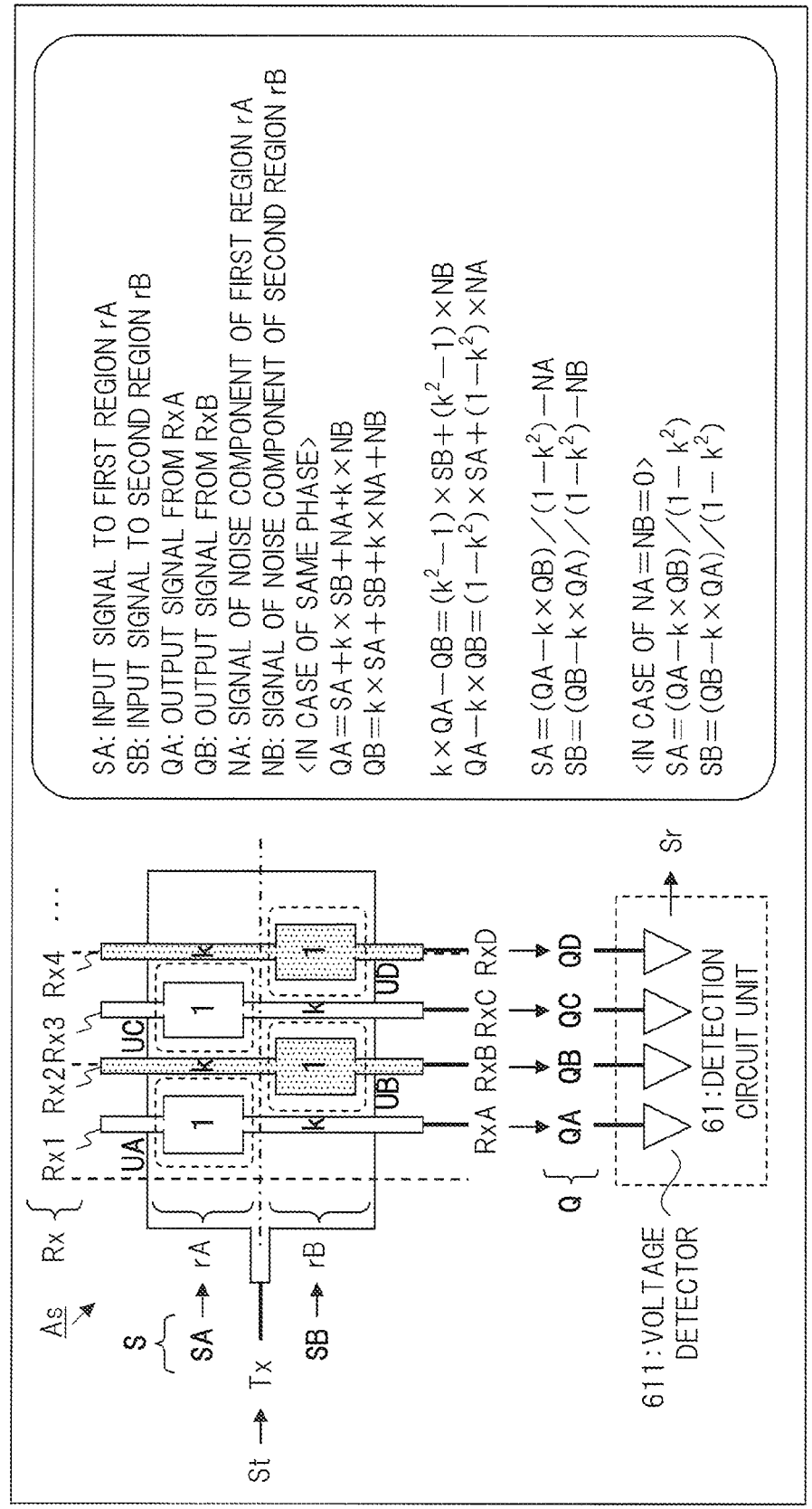
FIG. 10 is a diagram showing an input signal and an output signal in the embodiment 1A.

A touch driving method in the touch sensor device 1 of the embodiment 1A and the designing of an input signal to the detection units U, an output signal and a ratio of touch detection sensitivities corresponding to the method will be described with reference to FIG. 10. As the touch driving method, as described earlier, the scan driving of the M drive electrodes Tx of the touch detection area As is carried out one by one by using a touch driving signal St from the touch driving unit 50 of the circuit unit 6A. At the time of this one scan, the touch driving signal St is applied to the aforementioned integrally formed drive electrode Tx as an input signal S. In this manner, the same input signal S is applied and transmitted in the first region rA and the second region rB of the drive electrode Tx. Here, the input signal S corresponding to the first region rA and the input signal S corresponding to the second region rB are separately considered as SA and SB, respectively. Note that the input signal SA and the input signal SB are the same signals, and their pulse phases are the same.

Signals are transmitted to the detection electrode RxA to the detection electrode RxD through the capacitance in the detection units UA to UD of the detection region e1 in response to the input signal S, so that four output signals Q, that is, output signals QA to QD are obtained. The touch detection unit 60 receives these output signals Q and detects these signals as the touch detection signals Sr described above. For example, the detection circuit unit 61 has a voltage detector 611 connected to each of the detection electrodes Rx, and the voltage detector 611 receives the output signal Q to obtain the touch detection signals Sr.

In the embodiment 1A, based on predetermined calculations using the input signal SA and the input signal SB which are input signals S in the drive electrode Tx per one scan and the output signal QA and the output signal QB which are output signals Q from the detection region e1, 1:k which is a ratio of touch detection sensitivities between the detection region e1 and the non-detection region e2 is designed. The electrode shape and the like of the detection electrodes Rx are designed in association with the ratio of the touch detection sensitivities.

The input signal SA to the first region rA of the drive electrode Tx is output as an output signal QA from the detection electrode RxA through, for example, the capacitance of the detection unit UA formed by the intersection with the detection electrode RxA. Moreover, the input signal SB to the second region rB of the drive electrode Tx is output as one portion of the output signal QA from the detection electrode RxA through, for example, the non-detection region e2 formed by the intersection with the detection electrode RxA.

Similarly, the input signal SB to the second region rB of the drive electrode Tx is output as an output signal QB from the detection electrode RxB through, for example, the capacitance of the detection unit UB formed by the intersection with the detection electrode RxB. Moreover, the input signal SA to the first region rA of the drive electrode Tx is obtained as one portion of the output signal QB from the detection electrode RxB through, for example, the non-detection region e2 formed by the intersection with the detection electrode RxB.

An output signal QC and an output signal QD are also obtained as the signals similar to the output signal QA and the output signal QB. Moreover, as signals of noise components, a signal of a noise component associated with the input signal SA to the first region rA is defined as NA, and a signal of a noise component associated with the input signal SB to the second region rB is defined as NB. To the output signal QA and the output signal QB, these signals NA and NB of noise components are added. For example, relationships among the input signal SA, the input signal SB, the output signal QA, the output signal QB, the signal NA and the signal NB of noise components are represented by the following equations. Note that "×" represents a multiplication and "/" represents a division.

The output signal QA is represented by: $QA=SA+k\times SB+NA+k\times NB$. The output signal QB is represented by: $QB=k\times SA+SB+k\times NA+NB$. When these are transformed, $k\times QA-QB=(k^2-1)\times SB+(k^2-1)\times NB$ and $QA-k\times QB=(1-k^2)\times SA+(1-k^2)\times NA$ are obtained. The input signal SA is represented by: $SA=(QA-k\times QB)/(1-k^2)-NA$. The input signal SB is represented by: $SB=(QB-k\times QA)/(1-k^2)-NB$. Moreover, if $NA=NB=0$ holds, that is, no noise is generated, the input signal SA is represented by: $SA=(QA-k\times QB)/(1-k^2)$ and the input signal SB is represented by: $SB=(QB-k\times QA)/(1-k^2)$.

When the input signal SA and the input signal SB are set to the same value, the relationships among the output signal QA, the output signal QB and 1:k which is the ratio of touch detection sensitivities are determined. Based on the relationships, the ratio of 1:k which is the ratio of the touch detection sensitivities by which desired output signal QA and output signal QB are obtained is designed. By making 1/k which is the ratio of the touch detection sensitivities between the output signal QA and the output signal QB relative to the drive electrode Rx higher, that is, by making k closer to 0, the noise components can be reduced, and an output signal with a desired touch detection sensitivity can be obtained from the detection unit UA and the detection unit UB serving as the detection region e1.

Note that, in the configuration of FIG. 10 and others, for example, an output signal in accordance with the presence or absence of a touch of a conductor on the surface of the touch detection area As is given in the following manner. In the touch detection region having an approximately square shape including the detection units UA to UD, for example, when a conductor is brought in contact with or comes close to the vicinity of the detection unit UA of the first region rA, a first level signal corresponding to the state of contact or approach is obtained from the detection electrode RxA through the detection unit UA as one portion of the output signal QA. Moreover, at this time, a second level signal is obtained from the non-detection region e2 located adjacent to the detection unit UA in the Y-direction as another portion of the output signal QA. The touch detection unit 60 receives the output signal QA and determines the presence or absence of contact or approach of the conductor by comparing the voltage thereof with a threshold voltage. At that time, the first level signal of the output signal QA is detected as indicating the state of contact or approach of the conductor, and the second level signal is detected as indicating the state of neither contact nor approach of the conductor. Note that the principle of the electrostatic capacitance type touch sensor device will be described later.

[Touch Detection Period]

Figure 11:
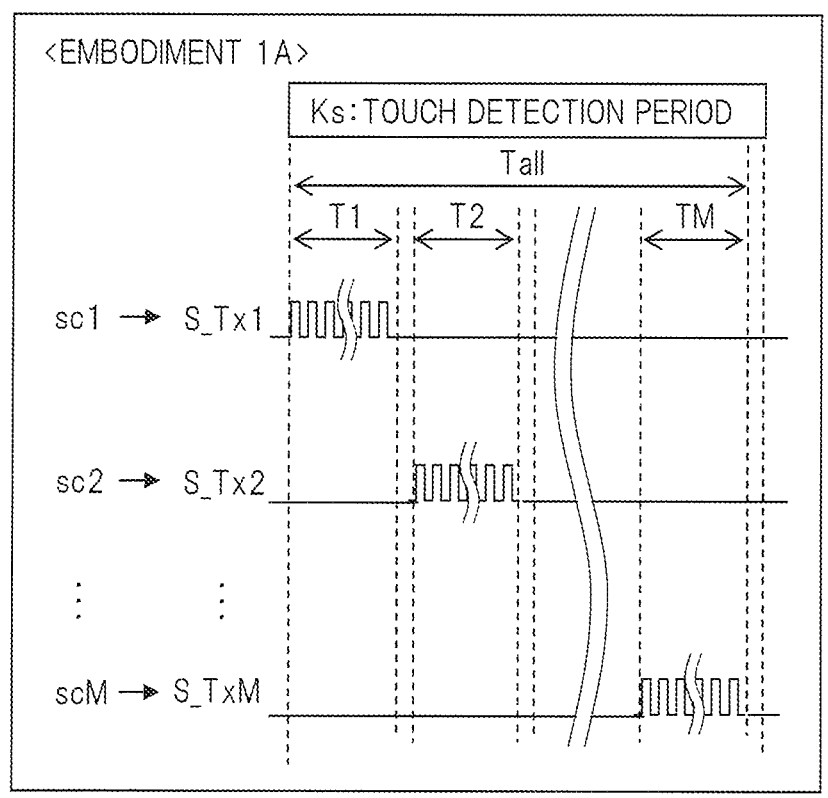
FIG. 11 is a diagram showing an example of a driving method and a touch driving sequence during a touch detection period of the embodiment 1A.

FIG. 11 shows an example of a sequence of the touch driving carried out by the scan driving during the touch detection period Ks in the configuration of the embodiment 1A. During the touch detection period Ks, the touch driving unit 50 carries out the scan driving for sequentially applying a touch driving signal to each one of the selected drive electrodes Tx among the M drive electrodes Tx of the touch detection area As. The order of scans at the time of the scan driving sequentially starts from the upper side in the Y-direction, that is, from the drive electrode Tx1, the drive electrode Tx2, to the drive electrode TxM. In the embodiment 1A, the number M of the drive electrodes Tx and the number M of the scans are the same, which are ½ of the number m of the electrodes of the comparative example.

In the example of the driving method of FIG. 11, the M drive electrodes Tx are driven by pulses having a predetermined frequency of touch driving signals St serving as the same input signals. The touch driving times T1 to TM corresponding to the touch driving time T per scan of each of the drive electrodes Tx have the same length. The total touch driving time Tall of the entire touch detection area As is obtained by the multiplication between the number M of the drive electrodes Tx and the scans of the drive electrodes Tx and the touch driving time T per scan, and it is represented by: Tall≈M×T (½)×m×T. The length of the touch detection period Ks is schematically the same as the length of the touch driving time Tall. Note that the touch detection period Ks is a period including the touch driving time Tall, and in the case of FIG. 11, a short period of time is ensured between the respective touch driving times T. For this reason, the touch detection period Ks is longer than the touch driving time Tall. As described above, the touch driving time Tall and the touch detection period Ks in the embodiment 1A can be shortened to about ½ of that of the configuration of the comparative example.

[Electrostatic Capacitance Type Touch Sensor Device]

Figure 12A:
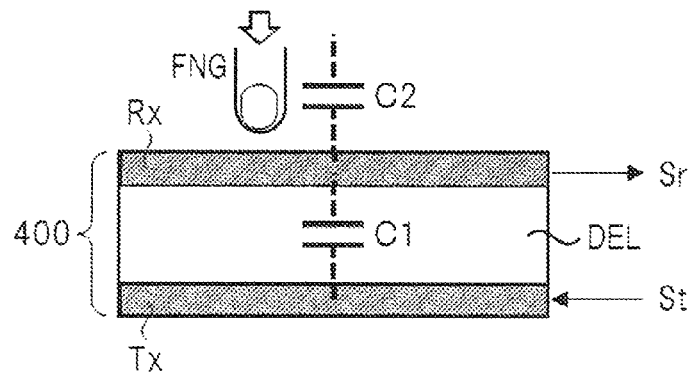
FIG. 12A is a diagram showing a principle of an electrostatic capacitance type touch sensor device.
Figure 12B:
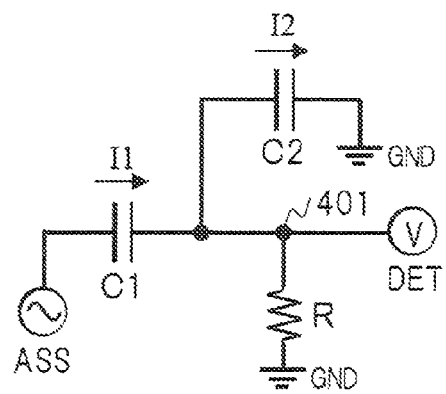
FIG. 12B is a diagram showing a principle of an electrostatic capacitance type touch sensor device.
Figure 12C:
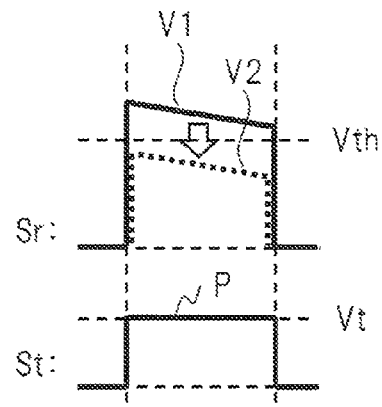
FIG. 12C is a diagram showing a principle of an electrostatic capacitance type touch sensor device.

FIG. 12 schematically shows a principle of the electrostatic capacitance type touch sensor device as a supplement. FIG. 12A shows a basic structure of an electrostatic capacitance type touch sensor device 400. FIG. 12B shows an equivalent circuit of FIG. 12A. FIG. 12C shows an example of a signal and a voltage at the time of the touch driving and the touch detection in the touch sensor device 400 shown in FIG. 12A and FIG. 12B. As shown in FIG. 12A, in the touch sensor device 400, a capacitance C1 corresponding to the aforementioned detection unit U is formed between the paired electrodes of the drive electrode Tx and the detection electrode Rx disposed with a dielectric member DEL interposed therebetween. The touch sensor device 400 detects a state of the presence or absence of a touch by utilizing the change in the capacitance C1 caused by the contact or approach of a conductor such as a finger FNG or the like to the surface on the detection electrode Rx side.

The drive electrode Tx corresponding to one end of the capacitance C1 of FIG. 12B is connected to an AC signal source ASS. A node 401 connected to the detection electrode Rx corresponding to the other end of the capacitance C1 is grounded through a resistor R and is connected to a voltage detector DET. At the time of the touch driving, a touch driving signal St serving as an input signal is applied to the drive electrode Tx from the AC signal source ASS. In response to the touch driving signal St serving as the input signal, an electric current I1 flows through the capacitance C1 of the touch sensor device 400. Then, based on the electric current I1, a touch detection signal Sr serving as an output signal is detected by the voltage detector DET located on the detection electrode Rx side.

In FIG. 12C, the touch driving signal St serving as an input signal is a signal with an AC pulse having predetermined frequency and voltage Vt. At the time of no touch, that is, in the case where any conductor is neither made in contact with nor comes close to the detection electrode Rx on the front surface side of the touch sensor device 400, the voltage of the touch detection signal Sr serving as an output signal is represented by a voltage V1. At the time of occurrence of a touch, that is, in the case where any conductor is made in contact with or comes close to the detection electrode Rx on the front surface side of the touch sensor device 400, the voltage of the touch detection signal Sr serving as an output signal is represented by a voltage V2.

At the time of no touch, as shown in FIG. 12B, in conjunction with the charging or discharging to or from the capacitance C1, an electric current I1 corresponding to the electrostatic capacitance value of the capacitance C1 flows. Thus, the voltage detected by the voltage detector DET is the voltage V1 of FIG. 12C. Moreover, at the time of occurrence of a touch, the capacitance C2 of the conductor is additionally connected in series to the capacitance C1 as shown in FIG. 12B, so that the electric field is correspondingly reduced at the corresponding region. In this state, in conjunction with the charging and discharging to and from the capacitance C1 and the capacitance C2, an electric current I1 and an electric current I2 corresponding to the respective electrostatic capacitance values of the capacitance C1 and the capacitance C2 flow. Thus, the voltage of the node 401 on the detection electrode Rx side becomes a partial voltage determined by the values of the electric current I1 and the electric current I2 in accordance with the respective electrostatic capacitance values of the capacitance C1 and the capacitance C2. At this time, the voltage detected by the voltage detector DET is lower than the voltage V1 at the time of no touch as indicated by the voltage V2 of FIG. 12C.

For example, the circuit unit including the voltage detector DET amplifies the voltage of an output signal which is input from the detection electrode Rx side, and detects the signal as the touch detection signal Sr. For example, the circuit unit including the voltage detector DET compares the voltage of the touch detection signal Sr with a threshold voltage Vth, and when the voltage is smaller than the threshold voltage Vth like the voltage V2, detects the voltage as indicating a state of occurrence of the touch.

[Effects and Others]

As described above, in the embodiment 1A, the touch driving time Tall and the touch detection period Ks can be shortened, while maintaining the touch detection density in the touch detection area As relating to the touch sensor function. Moreover, in the embodiment 1A, without the necessity of altering the level of an input signal applied to a plurality of drive electrodes Tx at the time of the touch driving, a plurality of output signals with predetermined touch detection sensitivities can be automatically obtained from the plurality of detection units U by driving the integrally formed drive electrode Tx with the width h1.

In the embodiment 1A, the width h1 of the drive electrode Tx is set to be twice as large as the width h0 of the comparative example, the number M of the drive electrodes Tx is set to ½ of the number m of the comparative example, the pitch p1 of the detection electrodes Rx is set to ½ of the pitch p0 of the comparative example, and the number N of the detection electrodes Rx is set to be twice as large as the number n of the comparative example. The multiple of the width of the drive electrode Tx relative to the comparative example is not limited to twice and may be set to three times or four times, and a multiple of natural number can be applied. In other words, any number of the drive electrodes Tx may be integrally formed as long as the number is a natural number.

Embodiment 1B

Figure 13:
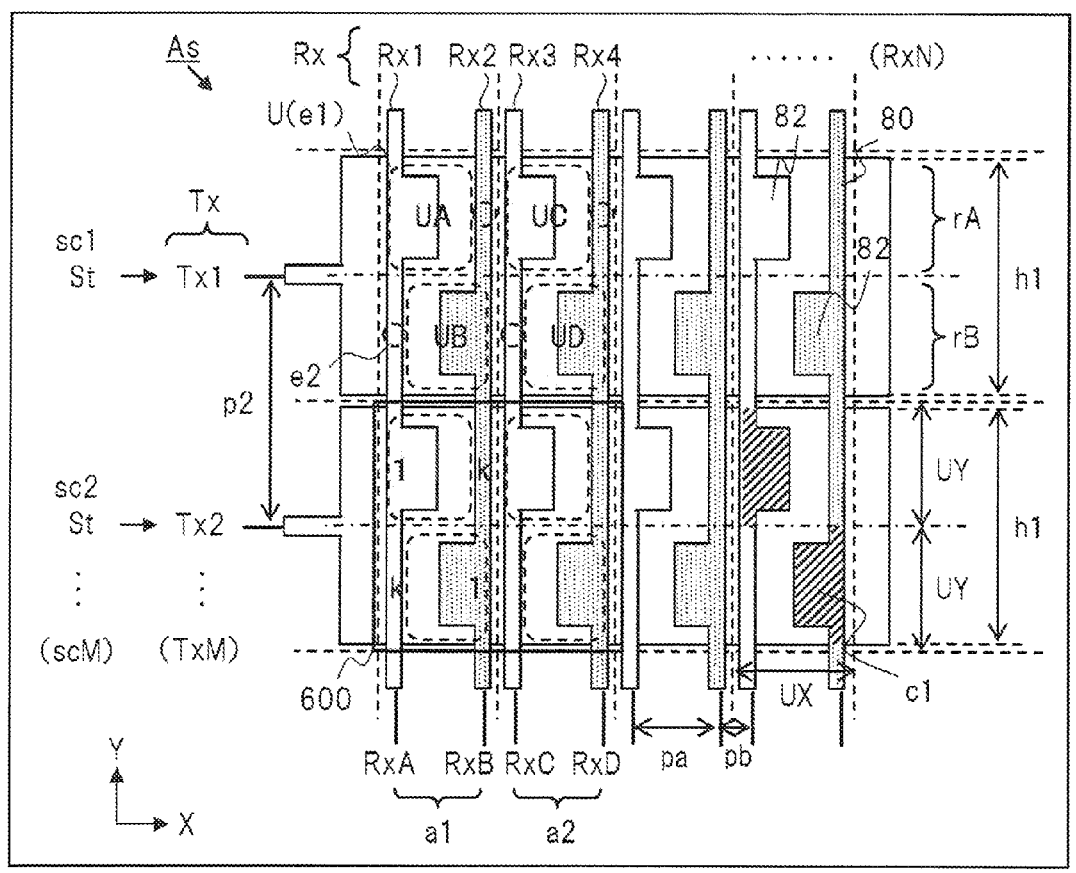
FIG. 13 is a diagram showing a configuration of an XY plane of electrodes and the like in a touch detection area as an outline of a touch sensor device of an embodiment 1B.

A touch sensor device in the embodiment 1B of the present invention will be described with reference to FIG. 13 to FIG. 16. As shown in FIG. 13 and the like, as the configurations different from that of the embodiment 1A, the embodiment 1B has the configuration in which the pitch of the arrangement of the detection electrodes Rx is changed to have two kinds of pitch and the configuration in which the shape of the protruding electrode portion of the detection electrode Rx is changed. Note that the outside appearance of the panel unit of the touch sensor device of the embodiment 1B is approximately the same as that of FIG. 1 described above.

[Touch Detection Area]

FIG. 13 shows the configuration of the drive electrodes Tx and the detection electrodes Rx in the touch detection area As in the embodiment 1B. In the embodiment 1B, the pitch of the arrangement of the detection electrodes Rx in the X-direction is not the aforementioned constant pitch p1, but there are pitches pa and pb having different lengths. In a region having an approximately square shape in which one detection unit U is formed, a detection electrode RxA is disposed near a border line on the left side in the X-direction, and a detection electrode RxB is disposed near a border line on the right side. The pitch between the detection electrode RxA and the detection electrode RxB is pa. In the same manner, the pitch between the detection electrode RxC and the detection electrode RxD is pa. The pitch between, for example, the detection electrode RxB and the detection electrode RxC corresponding to the border line of the detection units U is pb. The two kinds of pitches pa and pb have a relationship represented by pa>pb.

In the embodiment 1B, a protruding electrode portion 82 is provided as the shape of the detection electrode Rx. The protruding electrode portion 82 of the detection electrode Rx corresponds to an electrode portion that protrudes with a predetermined width toward only one side laterally in the X-direction from a thin line portion 80 with a constant width serving as a reference. For example, the protruding electrode portion 82 has a rectangular region that protrudes from the thin line portion 80 of the detection electrode RxA rightward in the X-direction in the detection unit UA formed by the intersection between the first area rA of the drive electrode Tx1 and the detection electrode RxA. Moreover, the protruding electrode portion 82 has a rectangular region that protrudes from the thin line portion 80 of the detection electrode RxB leftward in the X-direction in the detection unit UB formed by the intersection between the second area rB of the drive electrode Tx1 and the detection electrode RxB.

A gap between the detection electrode Rx including the protruding electrode portion 82 and the thin line portion 80 of the detection electrode Rx adjacent in the X-direction forms a region where an electric field is generated as described above. In the embodiment 1B, by designing the presence or absence, the shape or the like of the protruding electrode portion 82, the ratio of touch detection sensitivities between the detection region e1 and the non-detection region e2 is determined. A matrix of the plurality of detection units U in the touch detection area As in the embodiment 1B is approximately the same as the aforementioned matrix of FIG. 5. The touch detection region 600 including the detection units UA to UD of the embodiment 1B has an approximately square shape. More specifically, the touch detection region 600 has a shape in which the detection unit UB and the detection unit UD of the second region rB are disposed so as to be shifted relative to the detection unit UA and the detection unit UC of the first region rA by a distance equivalent to the non-detection region e2 in the X-direction.

Configuration Example of Electrodes

Figure 14:
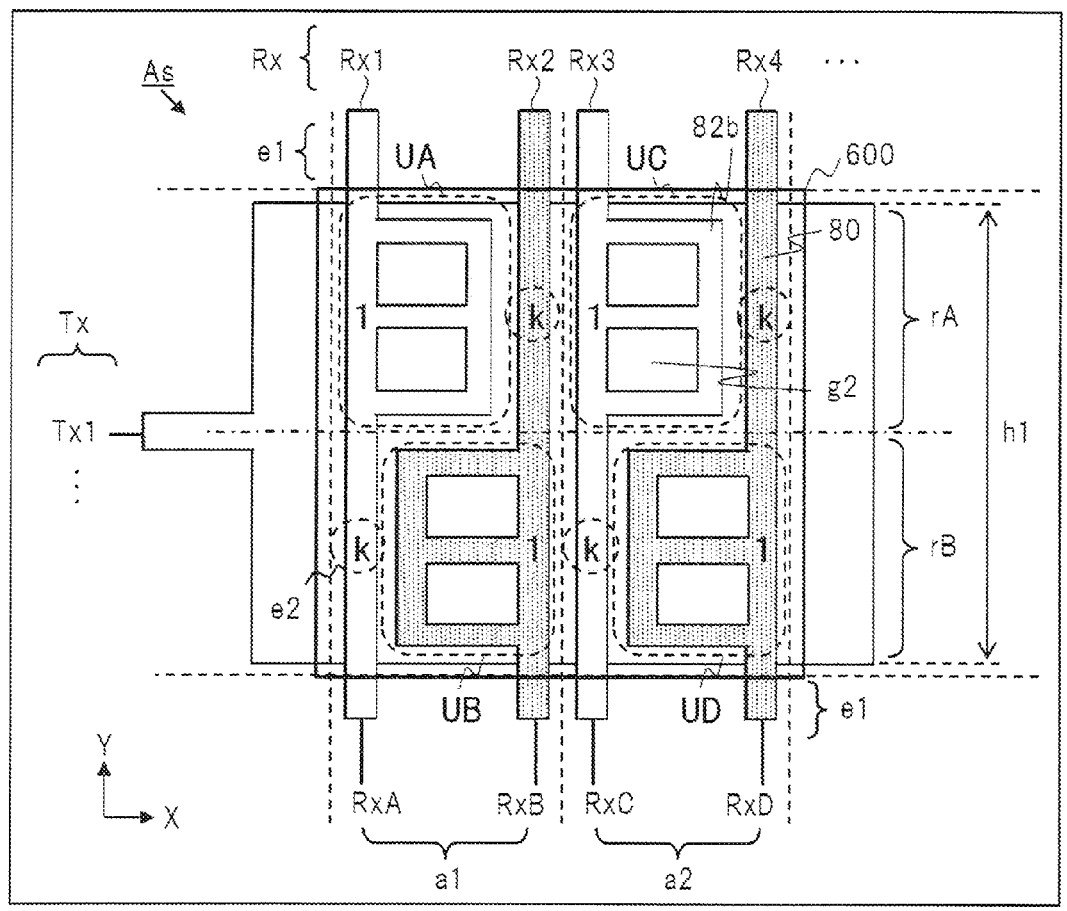
FIG. 14 is an enlarged view showing a configuration example of electrodes and the like of the touch detection area of the embodiment 1B.

As a configuration example of the electrodes in the touch detection area As in the embodiment 1B, FIG. 14 shows a configuration example of a more detailed electrode shape than the configuration of FIG. 13. The configuration example of FIG. 14 differs from the configuration of FIG. 13 in that the protruding electrode portion 82 of the detection electrode Rx corresponding to the portion of the detection unit U has a different shape. In the configuration example of FIG. 14, the presence or absence and the shape or the like of the protruding electrode portion 82b including an opening g2 of the detection electrode Rx are designed in the touch detection region 600 so that the predetermined ratio of touch detection sensitivities between the detection region e1 and the non-detection region e2, that is, 1:k is provided.

In the configuration example of FIG. 14, the protruding electrode portion 82b of the detection electrode Rx has openings g2 when seen on an XY plane. The protruding electrode portion 82b is an electrode portion that protrudes toward one side in the X-direction from the thin line portion 80 extending in the Y-direction of the detection electrode Rx so as to include the openings g2. The protruding electrode portion 82b has a peripheral portion of the rectangular shape closed by a thin line portion, and one or more openings g2 are formed inside the peripheral portion.

In the configuration example of FIG. 14, the protruding electrode portion 82b is provided with two rectangular openings g2 in the Y-direction inside the peripheral portion. Moreover, in this configuration example, the protruding electrode portion 82b including the openings g2 is constituted by thin line portions each having the same width as that of the thin line portion 80 of the detection electrode Rx. Each of the openings g2 has the same rectangular shape, and the peripheral portion of the rectangular shape is constituted by thin line portions. In the protruding electrode portion 82b on the lateral one side in the X-direction relative to the thin line portion 80 of the detection electrode Rx, the two openings g2 parallelly disposed in the Y-direction inside the peripheral portion of the rectangular shape are separated from one another by the thin line portion extending in the X-direction. The position of the thin line portion extending in the X-direction inside the protruding electrode portion 82b corresponds to the center position of the protruding electrode portion 82b in the Y-direction. Moreover, in this configuration example, the width of a gap between the protruding electrode portion 82b and the thin line portion 80 of the detection electrode Rx adjacent in the X-direction is made as small as possible so as to make the area of the protruding electrode portion 82b as large as possible.

In the same manner as the aforementioned configuration example of FIG. 7, the configuration example of FIG. 14 has the shape of the protruding electrode portion 82b including the openings g2. Thus, in the configuration example including the openings g2 of FIG. 14, the number of regions for generating an electric field between the drive electrode Tx and the detection electrode Rx is increased in comparison with the configuration of FIG. 13 including no openings g2, and the touch detection sensitivity in the detection unit U becomes higher.

[Electric Field]

Figure 15:
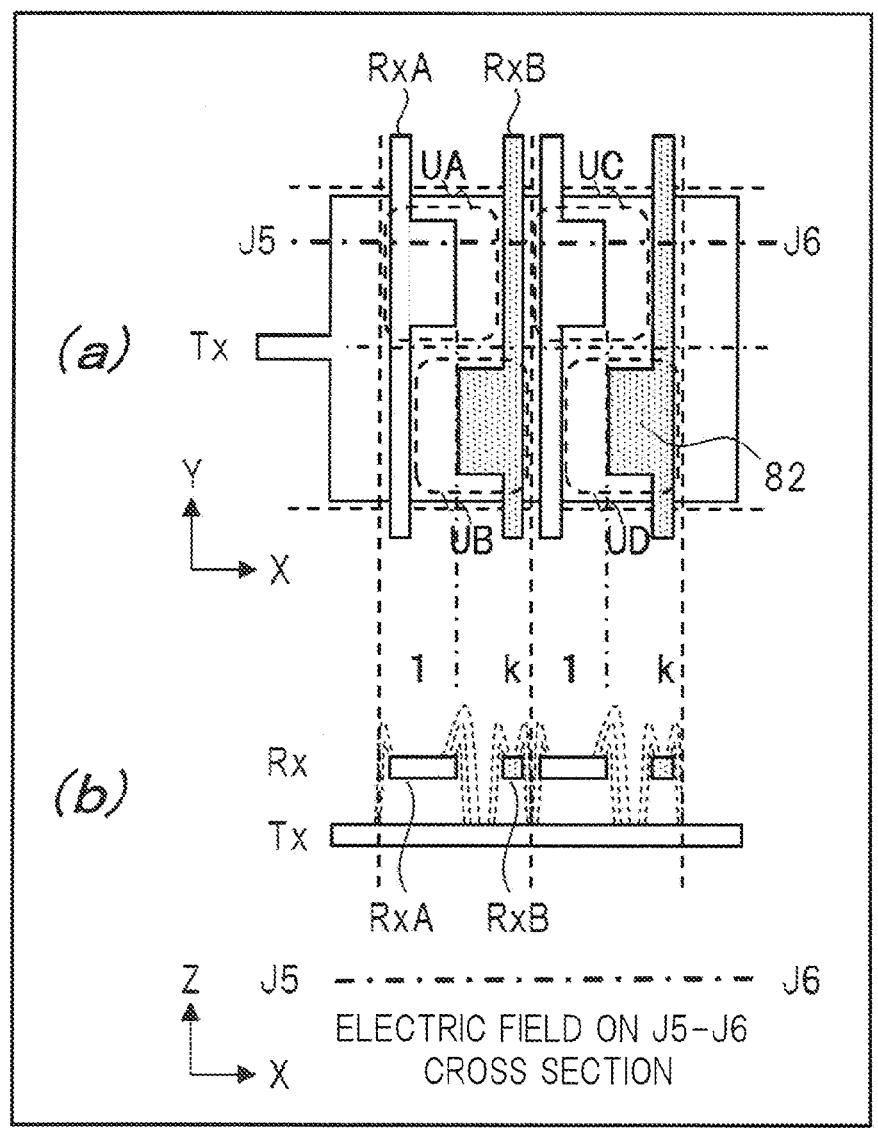
FIG. 15 includes diagrams (a) and (b) each showing a state of an electric field generated in the configuration of FIG. 13.

FIG. 15 shows a state of an electric field generated in the vicinity of the detection unit U, which corresponds to the configuration of FIG. 13 of the embodiment 1B. A diagram (a) of FIG. 15 shows an XY plane of the touch detection region 600 including the detection units UA to UD of FIG. 13. A diagram (b) of FIG. 15 schematically shows the state of the generation of an electric field on an XZ cross section corresponding to a J5-J6 line of the first region rA of the diagram (a) of FIG. 15. An electric field is generated between the upper surface of the drive electrode Tx and the upper surface of the protruding electrode portion 82 of the detection electrode RxA through a gap between the protruding electrode portion 82 of the detection electrode RxA and the thin line portion 80 of the detection electrode RxB. Moreover, an electric field is generated between the upper surface of the drive electrode Tx and the upper surface of the thin line portion 80 of the detection electrode RxB. Supposing that the touch detection sensitivity relative to the electric field generated between the upper surface of the drive electrode Tx and the upper surface of the protruding electrode portion 82 of the detection electrode RxA is 1, the touch detection sensitivity relative to the electric field generated between the upper surface of the drive electrode Tx and the upper surface of the thin line portion 80 of the detection electrode RxB is k.

Figure 16:
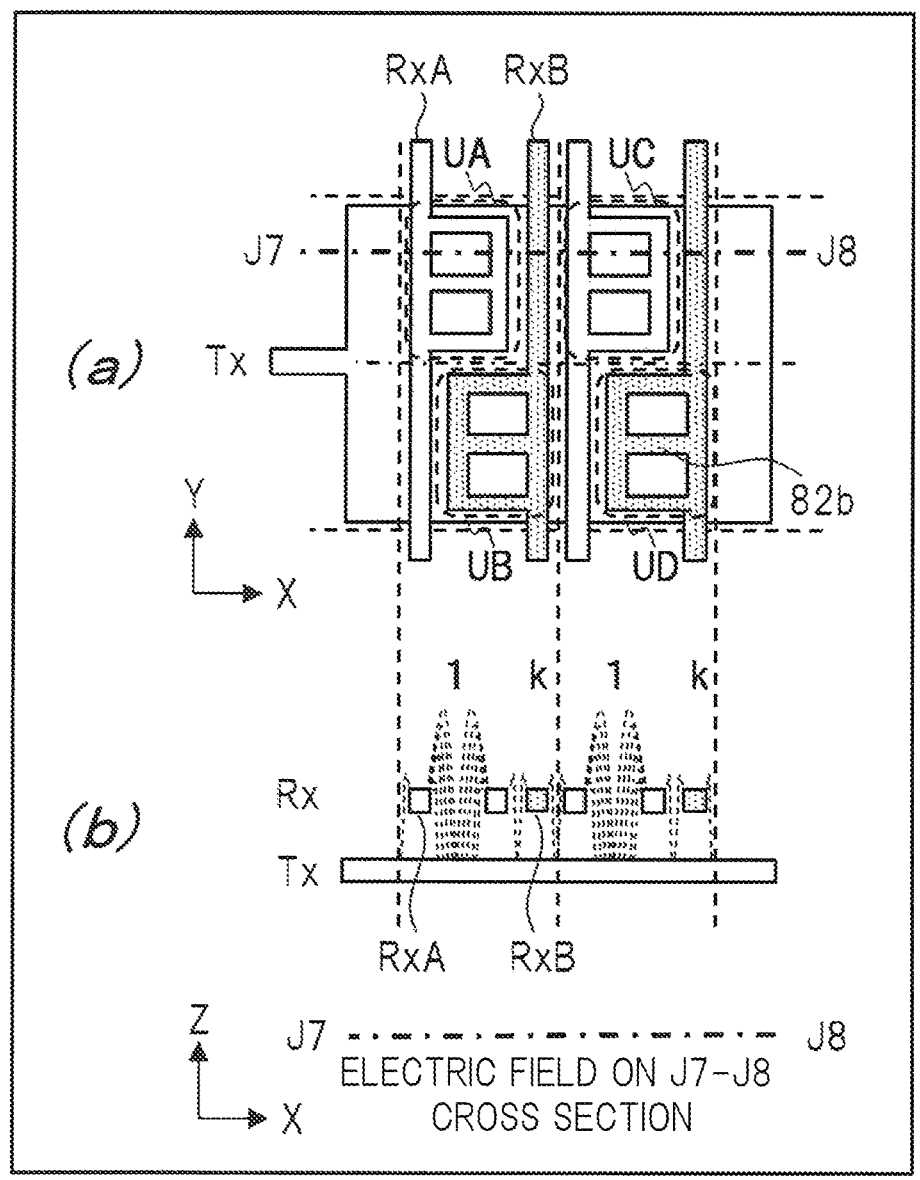
FIG. 16 includes diagrams (a) and (b) each showing a state of an electric field generated in the configuration of FIG. 14.

FIG. 16 shows a state of an electric field generated in the vicinity of the detection unit U, which corresponds to the configuration example of FIG. 14 of the embodiment 1B. A diagram (a) of FIG. 16 shows an XY plane of the touch detection region 600 including the detection units UA to UD of FIG. 14. A diagram (b) of FIG. 16 schematically shows the state of the generation of an electric field on an XZ cross section corresponding to a J7-J8 line of the first region rA of the diagram (a) of FIG. 16. An electric field is generated between the upper surface of the drive electrode Tx and the upper surface of the protruding electrode portion 82b of the detection electrode RxA through the openings g2. Moreover, an electric field is generated between the upper surface of the drive electrode Tx and the upper surface of the thin line portion 80 of the detection electrode RxB. Supposing that the touch detection sensitivity relative to the electric field generated between the upper surface of the drive electrode Tx and the upper surface of the protruding electrode portion 82b of the detection electrode RxA is 1, the touch detection sensitivity relative to the electric field generated between the upper surface of the drive electrode Tx and the upper surface of the thin line portion 80 of the detection electrode RxB is k.

As described above, in the configuration of the embodiment 1B, the same effects as those of the configuration of the embodiment 1A can be obtained.

Embodiment 2A

A touch sensor device of the embodiment 2A of the present invention will be described with reference to FIG. 17 to FIG. 21. As shown in FIG. 18 and the like, the configuration of the embodiment 2A is different from that of the embodiment 1A in that two adjacent drive electrodes Tx are simultaneously driven as one set without increasing the width of the drive electrode Tx in the Y-direction relative to the configuration of the comparative example. The shape of the detection electrode Rx in the embodiment 2A is the same as that of the embodiment 1A.

[Panel Unit Plane]

Figure 17:
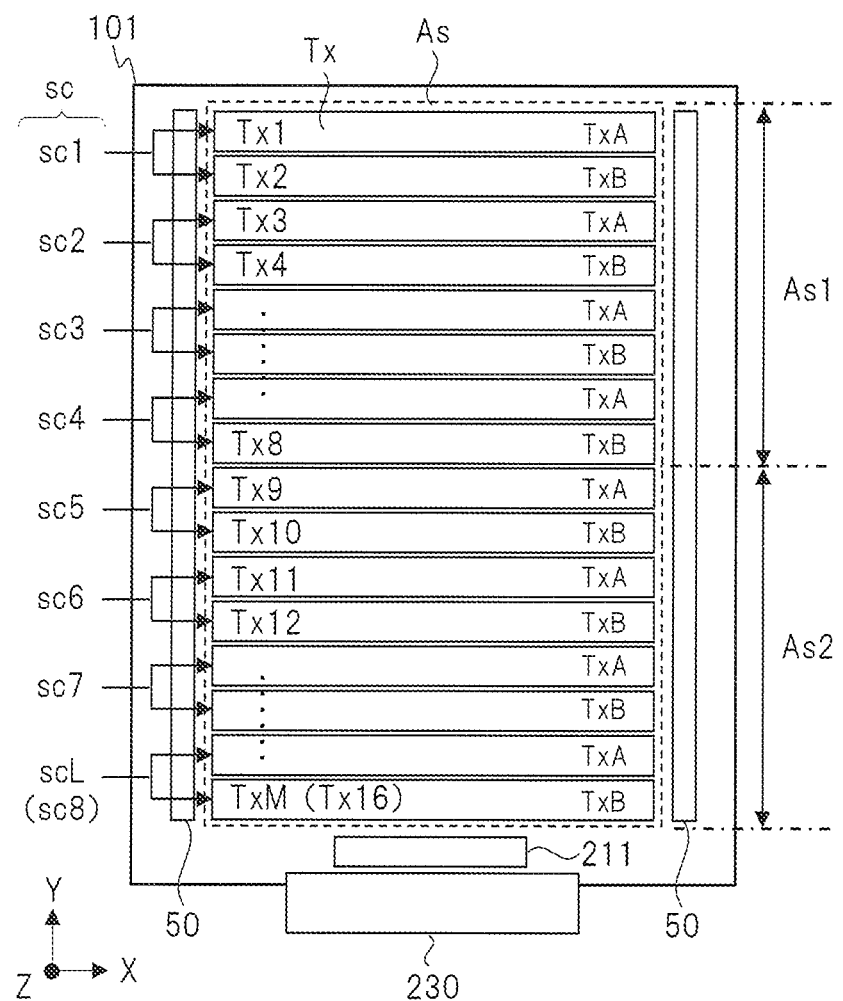
FIG. 17 is a diagram showing a configuration of an XY plane on a back substrate side in a panel unit of a touch sensor device of an embodiment 2A of the present invention.
Figure 18:
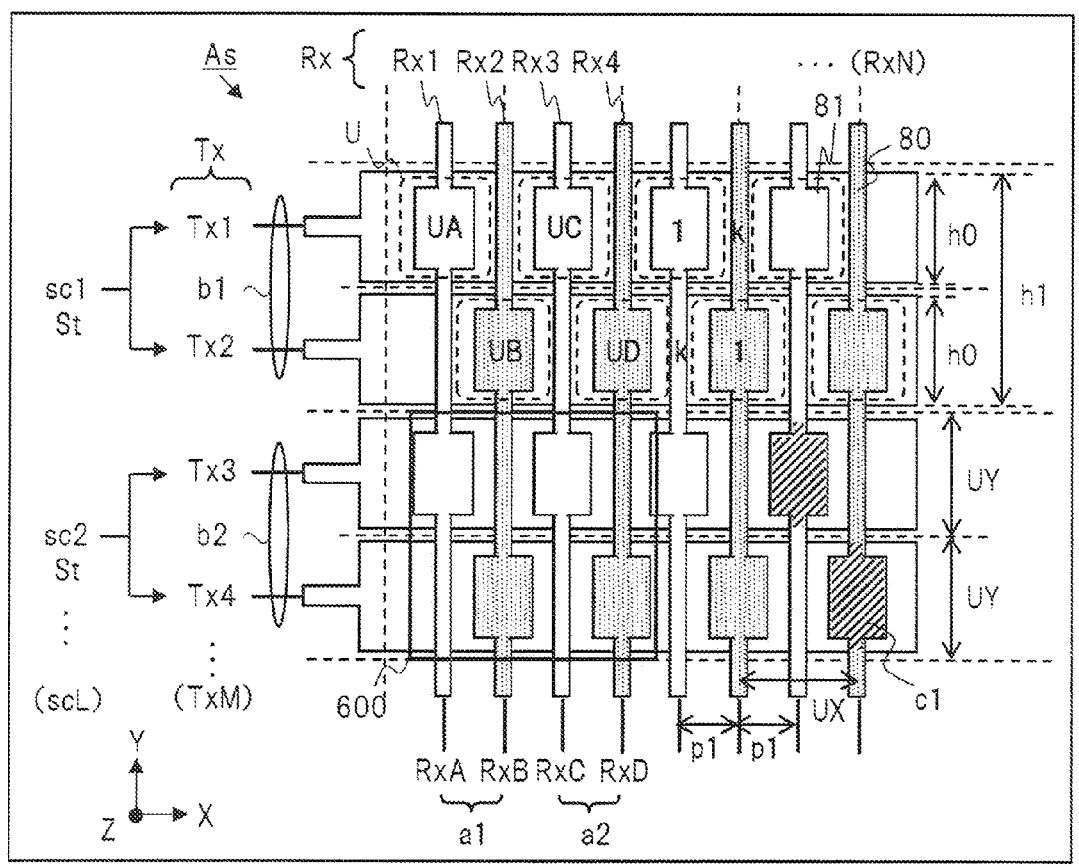
FIG. 18 is a diagram showing a configuration of an XY plane of electrodes and the like in a touch detection area as an outline of the touch sensor device of the embodiment 2A.

FIG. 17 shows a configuration on an XY plane including drive electrodes Tx on a back substrate 101 side in a panel unit of the touch sensor device of the embodiment 2A. Moreover, FIG. 17 shows also an example of the scan driving in the embodiment 2A. The width of the block of the drive electrode Tx in the Y-direction in the embodiment 2A is the same as the width h0 of the drive electrode Tx of the comparative example, and is ½ of the width h1 of the block of the drive electrode Tx in the embodiment 1A. In the embodiment 2A, the number M of the drive electrodes Tx is the same as the number m of the comparative example, and the number of scans (defined as L) is ½ of the number M of the electrodes. Note that the configuration example of FIG. 17 shows the case where the number M of electrodes is 16 and the number L of scans is 8. A reference symbol sc denotes each scan in the scan driving, and for example, a first scan sc1 simultaneously drives a drive electrode Tx1 and a drive electrode Tx2. Note that, from the upper side of the touch detection area As in the Y-direction, odd-numbered drive electrodes Tx are represented as drive electrodes TxA and even-numbered electrodes Tx are represented as drive electrodes TxB. In the embodiment 2A, the drive electrode TxA and the drive electrode TxB taken as one set are the object of the simultaneous driving.

[Touch Detection Area]

FIG. 18 shows a configuration on an XY plane of electrodes and the like in the touch detection area As as an outline of the touch sensor device of the embodiment 2A. In the embodiment 2A, as the design of the electrode shape, the width of the block of the drive electrode Tx in the Y-direction is set to the same as the width h0 of the comparative example. Then, in the embodiment 2A, as a touch driving method by the scan driving, one set of two drive electrodes Tx adjacent in the Y-direction is defined as a unit of scanning, and the two drive electrodes Tx of one set are simultaneously driven by the same input signal. For example, two drive electrodes Tx such as the drive electrode Tx1 and drive electrode Tx2 are taken as one set b1, and the touch driving unit 50 simultaneously applies input signals formed by the same touch driving signal St to the drive electrode Tx1 and drive electrode Tx2 of the set b1 at the time of the first scan sc1 of the touch detection area As.

Since the two drive electrodes Tx as one set are simultaneously driven by the same input signal as described above in the embodiment 2A, the same effects as the configuration of the embodiment 1A in which the drive electrode Tx obtained by integrally forming two electrodes into one electrode is scan-driven are obtained with respect to an output signal from the detection electrode Rx.

As the configuration of the detection units U, for example, in the touch detection region 600 having an approximately square shape, detection units UA to UD are formed by intersections between the set b1 of the drive electrodes Tx and the set a1 and set a2 of the detection electrodes Rx. At the time of one scan, through the touch detection region 600 including the detection units UA to UD, four output signals with predetermined touch detection sensitivities are obtained from the detection electrodes RxA to RxD. Note that the odd-numbered drive electrodes TxA correspond to the first region rA of the aforementioned embodiment 1A, and the detection unit UA and the detection unit UC are formed. The even-numbered drive electrodes TxB correspond to the second region rB of the aforementioned embodiment 1A, and the detection unit UB and the detection unit UD are formed. Since the detection units UA to UD are taken as a set in the embodiment 2A, the two drive electrodes Tx taken as a set to be simultaneously scanned are the drive electrode TxA and the drive electrode TxB. The two drive electrodes Tx taken as a set to be simultaneously scanned have the same shape.

Scan Driving Example (1)

In the touch driving method in the embodiment 2A, the drive electrodes Tx to be simultaneously driven at the time of scanning are not limited to one set of the two drive electrodes Tx adjacent in the Y-direction. More specifically, in the embodiment 2A, any two drive electrodes Tx can be taken as the objects for scanning as long as an odd-numbered drive electrode TxA and an even-numbered drive electrode TxB are taken as a set. At the time of the scan driving, the touch driving unit 50 selects a drive electrode TxA and a drive electrode TxB which serve as one set of two drive electrodes Tx taken as the objects for scanning from the drive electrodes Tx in the touch detection area As, and simultaneously applies the same touch driving signal St to the one set of two drive electrodes Tx. Next, the touch driving unit 50 selects a drive electrode TxA and a drive electrode TxB that have not been scanned from the drive electrodes Tx in the touch detection area As, and drives the corresponding one set of two drive electrodes Tx simultaneously. The touch driving unit 50 repeats the same operations until all the drive electrodes Tx in the touch detection area As have been scanned.

As an example of the above-mentioned scan driving in the embodiment 2A, a drive electrode TxA and a drive electrode TxB spaced apart from each other in the Y-direction can be selected as one set of the scanning objects and these can be simultaneously driven. In this example of the scan driving, a drive electrode Tx1 and a drive electrode Tx4 are taken as one set for a first scan sc1, and a drive electrode Tx3 and a drive electrode Tx6 are taken as one set for a second scan sc2. In another example, a drive electrode Tx1 and a drive electrode Tx10 are taken as one set for the first scan sc1, and a drive electrode Tx3 and a drive electrode Tx12 are taken as one set for the second scan sc2. In the embodiment 2A, for example, the touch detection area As may be virtually divided into two kinds of areas adjacent to each other vertically in the Y-direction, that is, an area As1 and an area As2 as shown in FIG. 17. At the time of the scan driving, during the first half of the period, the touch driving unit 50 selects a drive electrode TxA from the area As1 and selects a drive electrode TxB from the area As2 to form one set of the scanning objects, and during the next half period, the touch driving unit 50 selects a drive electrode TxB from the area As1 and selects a drive electrode TxA from the area As2 to form one set of the scanning objects.

Scan Driving Example (2)

Since the drive electrodes Tx remain in a separated state in the embodiment 2A like the configuration of the comparative example, not only the simultaneous driving of one set of two drive electrodes as described above, but also the driving of the one set of two drive electrodes at individual timings is possible as the touch driving method. This driving can be achieved as one of the scan-driving controls by the scanning circuit unit 52 of the touch driving unit 50. For example, in the touch sensor device of the embodiment 2A, a mode for simultaneously driving the one set of two drive electrodes Tx as a scanning unit and a mode for individually driving the drive electrodes Tx one by one may be provided, and these modes may be utilized for different purposes.

Scan Driving Example (3)

In the embodiment 2A, both of the method in which touch driving signals St having the pulses whose phases are the same phase are used as the input signals to one set of two drive electrode TxA and drive electrode TxB serving as driving objects to be simultaneously driven for each scan by the touch driving unit 50 and the method in which touch driving signals St having the pulses whose phases are the opposite phase are used as the input signals can be employed as the touch driving method.

Figure 19:
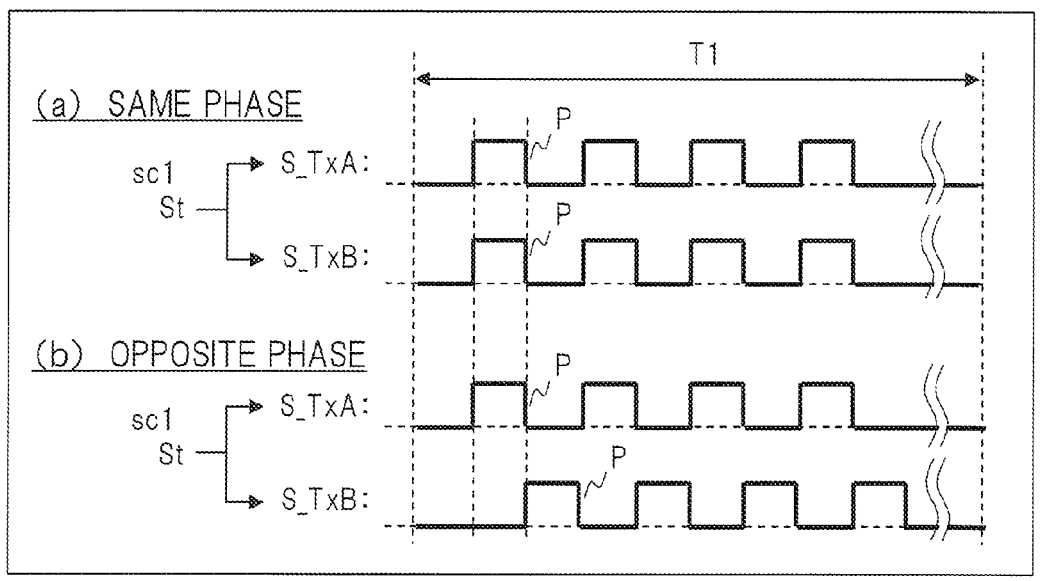
FIG. 19 includes examples (a) and (b) each showing a touch driving method of the embodiment 2A.

An example (a) of FIG. 19 shows the driving method using the pulses of the touch driving signal St having the same phase. An input signal to the drive electrode TxA in the one set of two electrodes in a first scan sc1 is represented by S_TxA and an input signal to the other drive electrode TxB is represented by S_TxB. A reference symbol P denotes one pulse in the touch driving signal St. Relative to the pulse P of the input signal S_TxA, the pulse P of the input signal S_TxB has the same phase. An example (b) of FIG. 19 shows a driving method using the pulse of the touch driving signal St having an opposite phase. In this method, relative to the pulse P of the input signal S_TxA to the one drive electrode TxA, the pulse P of the input signal S_TxB to the other drive electrode TxB has an opposite phase.

In the case where two drive electrodes Tx adjacent in the Y-direction taken as one set are simultaneously driven, in the embodiment 2A, the method using the opposite phase shown in the example (b) of FIG. 19 is adopted as an application example of the method described above. Thus, pulses having opposite phases are applied to the detection region e1 and the non-detection region e2 adjacent in the Y-direction in one drive electrode TxA and the other drive electrode TxB taken as one set. Therefore, in these portions, an effect of increasing 1/k which is a ratio of touch detection sensitivities can be expected. Moreover, in the case where two drive electrodes Tx spaced apart from each other in the Y-direction taken as one set are simultaneously driven, in the embodiment 2A, the method using the same phase shown in the example (a) of FIG. 19 is adopted as an application example of the method described above.

[Touch Driving Method and Signal]

Figure 20:
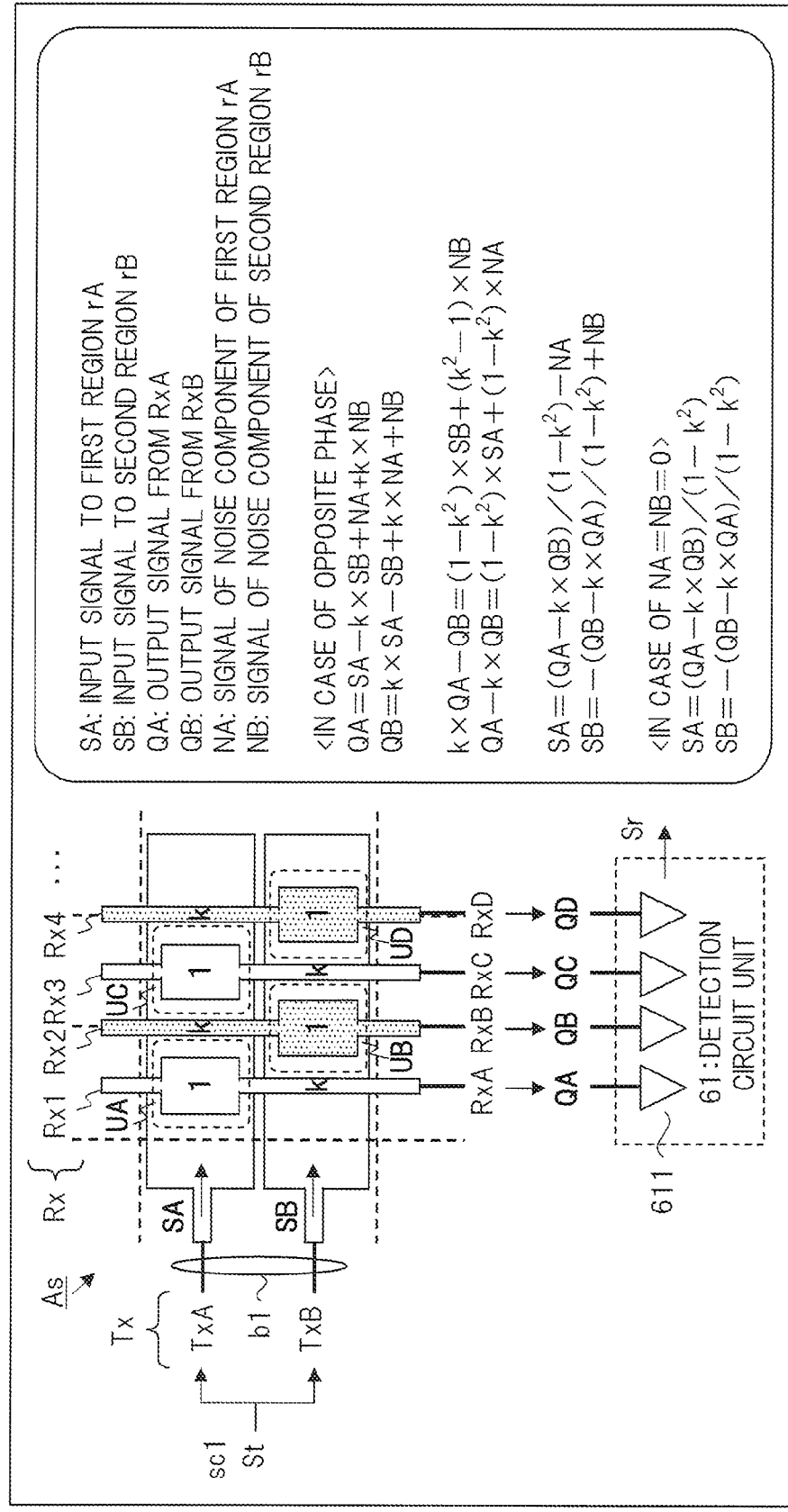
FIG. 20 is a diagram showing an input signal and an output signal in the embodiment 2A.

FIG. 20 shows the designing of an input signal, an output signal and ratios of touch detection sensitivities relative to the detection units U corresponding to the touch driving method using the opposite phase shown in the example (b) of FIG. 19 in the embodiment 2A. In the case where pulses having opposite phases are applied to one set of two drive electrodes Tx for each scan, the respective input signal S and output signal Q can be calculated in the following manner.

As a touch driving method, as described above, the scan driving is carried out for each two of M drive electrodes Tx in the touch detection area As by the touch driving signal St from the touch driving unit 50 of the circuit unit 6A. At the time of the one scan, the touch driving unit 50 applies the touch driving signal St serving as the input signal S to the drive electrode TxA and the drive electrode TxB corresponding to one set of two drive electrodes Tx described above. At this time, the touch driving unit 50 adjusts the phases of the input signals S applied to the drive electrode TxA and the drive electrode TxB so as to have opposite phases as shown in the example (b) of FIG. 19. Suppose that the input signal S corresponding to the drive electrode TxA is represented as SA and the input signal S corresponding to the drive electrode TxB is represented as SB. The input signal SA and the input signal SB have opposite pulse phases.

In the embodiment 2A, relationships among the input signal SA, input signal SB, output signal QA, output signal QB, and signal NA and signal NB of noise components are represented by the following equations. The output signal QA is represented by: $QA=SA \times k \times SB+NA+k \times NB$. The output signal QB is represented by: $QB=k \times SA \times SB+k \times NA+NB$. When these are transformed, $k \times QA \times QB=(1 \times k^2) \times SB+(k^{2 \times 1}) \times NB$ and $QA \times k \times QB=(1 \times k^2) \times SA+(1 \times k^2) \times NA$ are obtained. The input signal SA is represented by: $SA=(QA \times k \times QB)/(1 \times k^2) \times NA$. The input signal SB is represented by: $SB=\times(QB \times k \times QA)/(1 \times k^2)+NB$. Moreover, if NA=NB=0 holds, that is, if no noise is generated, the input signal SA is represented by: $SA=(QA\ k \times QB)/(1 \times k^2)$ and the input signal SB is represented by: $SB=\times(QB \times k \times QA)/(1 \times k^2)$.

When the input signal SA and the input signal SB are set to the same value, the relationships among the output signal QA, the output signal QB and 1:k which is the ratio of touch detection sensitivities are determined. From the relationships, it is possible to design the ratio 1:k which is a ratio of touch detection sensitivities from which desired output signal QA and output signal QB can be obtained in the same manner as that of the embodiment 1A.

[Touch Detection Period]

Figure 21:
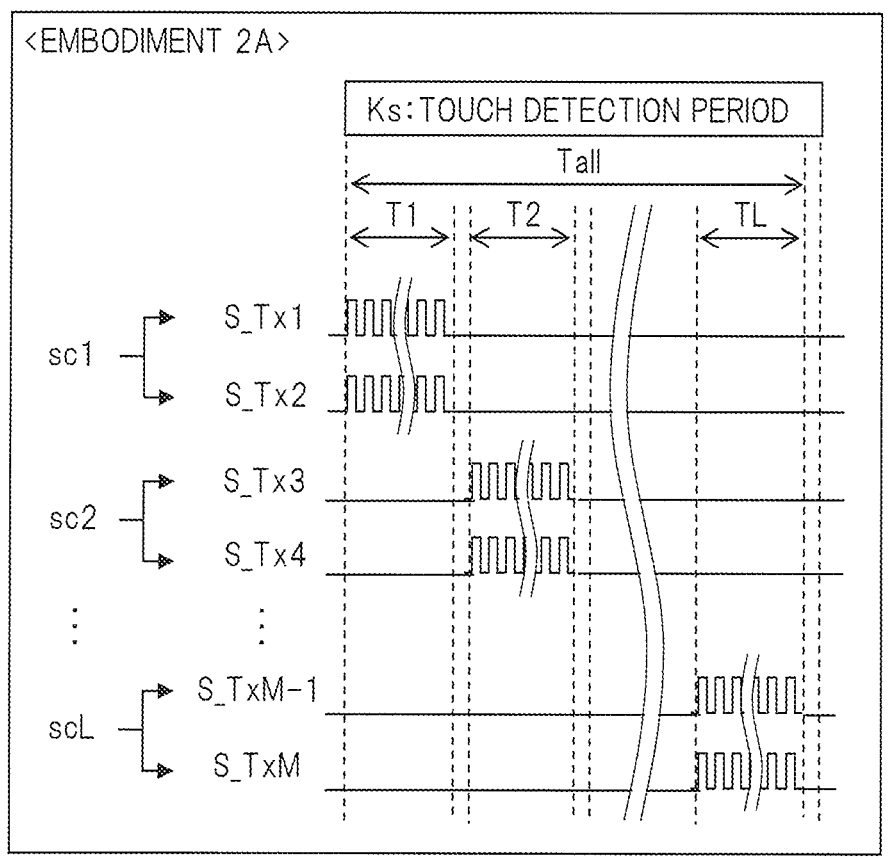
FIG. 21 is a diagram showing an example of a driving method and a touch driving sequence during a touch detection period of the embodiment 2A.

FIG. 21 shows an example of a driving method and a touch driving sequence carried out during the touch detection period Ks corresponding to the configuration of the embodiment 2A. During the touch detection period Ks, the touch driving unit 50 carries out the scan driving for M drive electrodes Tx in the touch detection area As so that a touch driving signal St is sequentially applied in units of two drive electrodes Tx taken as one set from the upper side in the Y-direction. The number of the drive electrodes Tx is represented by M and the number of scans is represented by L, and L=M/2=m/2 holds. The plurality of scans (L scans) are represented by the scans sc1 to scL. For example, in the first scan sc1, the same input signals S_Tx1 and S_Tx2 are simultaneously applied to a set b1 of the drive electrode Tx1 and the drive electrode Tx2. The touch driving time of the drive electrode Tx1 and the drive electrode Tx2 of the set b1 in the scan sc1 is set to the same time T1. Similarly, the touch driving time of the drive electrode Tx3 and the drive electrode Tx4 of the set b2 in the scan sc2 is set to the same time T2. The touch driving time of the drive electrode TxM−1 and the drive electrode TxM taken as a set in the L-th scan scL is set to the same TL. The touch driving times T1 to TL corresponding to the touch driving time T of each scan have the same length. The touch driving time Tall is obtained by a multiplication between the number of scans L of the drive electrodes Tx and the touch driving time T per one scan, and it is represented by Tall≈L×T=(½)×m×T. Since the number of scans L of the drive electrodes Tx is ½ of the comparative example, the touch driving time Tall and the touch detection period Ks can be shortened.

[Effects and Others]

As described above, in the embodiment 2A, the touch driving time and the touch detection period can be shortened in the same manner as the embodiment 1A, while maintaining the touch detection density in the touch detection area As relating to the touch sensor function. Moreover, in the embodiment 2A, without the necessity of altering the level of a plurality of input signals applied to the drive electrodes Tx at the time of the touch driving, a plurality of output signals with predetermined touch detection sensitivities can be automatically obtained from the plurality of detection units U by simultaneously driving the two drive electrodes Tx taken as one set by the same input signals.

In the embodiment 2A, the number of the drive electrodes Tx to be simultaneously driven at the time of scan is set to 2 which is twice as many as that in the comparative example, the pitch p1 of the detection electrodes Rx is set to ½ of the pitch p0 of the comparative example, and the number N of the detection electrodes Rx is set to twice as many as the number n in the comparative example. The number of the drive electrodes Tx to be simultaneously driven at the time of scan is not limited to 2, and may be set to a plural number larger than 2 such as 3, 4 and more.

Embodiment 2B

Figure 22:
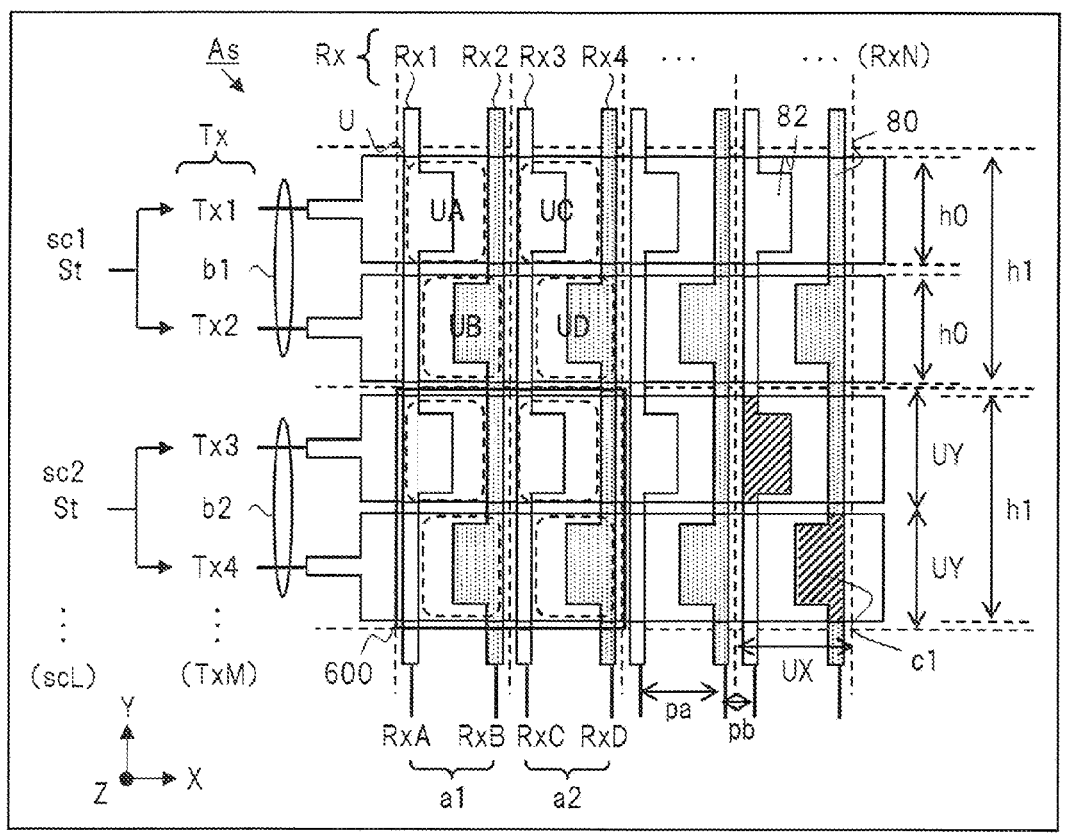
FIG. 22 is a diagram showing a configuration of an XY plane of electrodes and the like in a touch detection area as an outline of a touch sensor device of an embodiment 2B.

FIG. 22 shows a configuration of the drive electrodes Tx and the detection electrodes Rx in the touch detection area As in a touch sensor device of the embodiment 2B of the present invention. In the embodiment 2B, the characteristics of the embodiment 1B and the characteristics of the embodiment 2A are combined together. In the embodiment 2B, the shape of the detection electrodes Rx is the same as that of the embodiment 1B, and the two drive electrodes Tx taken as one set are simultaneously driven in the same manner as the embodiment 2A. In the configuration of the embodiment 2A, the same effects as those of the embodiment 2A can be obtained.

Embodiment 3A

The touch sensor device of the embodiment 3A of the present invention will be described with reference to FIG. 23 and FIG. 24. As means for forming the ratio of touch detection sensitivities described above, the shape or the like of the drive electrodes Tx is devised instead of the shape or the like of the detection electrodes Rx in the embodiment 3A. Moreover, as the electrode shape in the embodiment 3A, the drive electrodes Tx are separated from each other in the Y-direction. Therefore, as the touch driving method in the embodiment 3A, the two adjacent drive electrodes Tx taken as one set are simultaneously driven by the same input signals in the same manner as the embodiment 2A.

Figure 23:
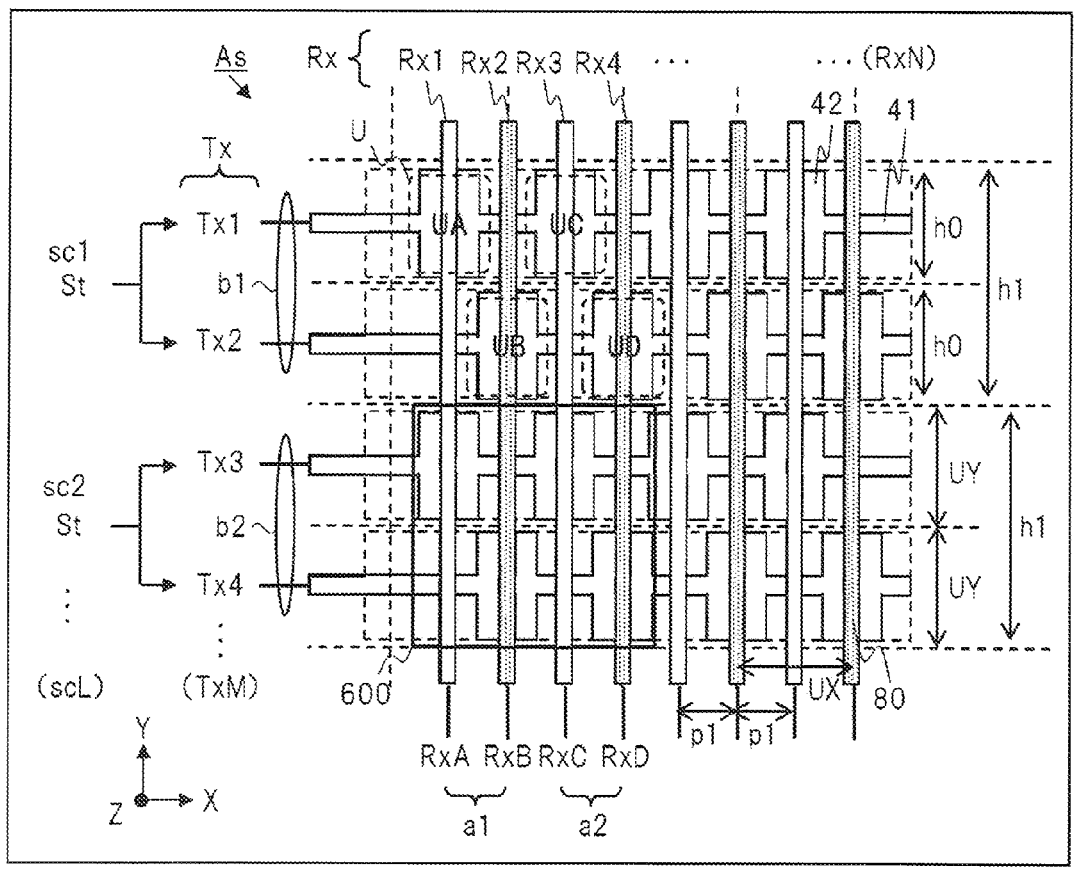
FIG. 23 is a diagram showing a configuration of an XY plane of electrodes and the like in a touch detection area as an outline of a touch sensor device of an embodiment 3A.

FIG. 23 shows the configuration of an XY plane of electrodes and the like in the touch detection area As as an outline of the touch sensor device of the embodiment 3A. First, the detection electrodes Rx have the same shape as that of the comparative example. More specifically, the detection electrodes Rx have a thin line shape extending in the Y-direction and having a constant width in the X-direction. Moreover, twice as many detection electrodes Rx are provided for each of the drive electrodes Tx at the constant pitch p1 described above. As the shape of each drive electrode Tx, a thin line portion 41 corresponding to the portion of a thin line extending in the X-direction and having a constant width in the Y-direction and a protruding electrode portion 42 corresponding to an electrode portion that protrudes from the thin line portion 41 toward two sides thereof longitudinally in the Y-direction are provided.

In the embodiment 3A, based on the electrode shape described above, the detection units UA to UD are constituted in the touch detection region 600 formed by the intersections between two drive electrodes Tx adjacent in the Y-direction and the four detection electrodes Rx adjacent in the X-direction. In the touch detection area As of this configuration, the triangular lattice shape is adopted as the arrangement of the plurality of detection units U like the case of FIG. 5 described above. The protruding electrode portions 42 of the drive electrodes Tx are formed so as to correspond to the portions of the detection units UA to UD.

Figure 24:
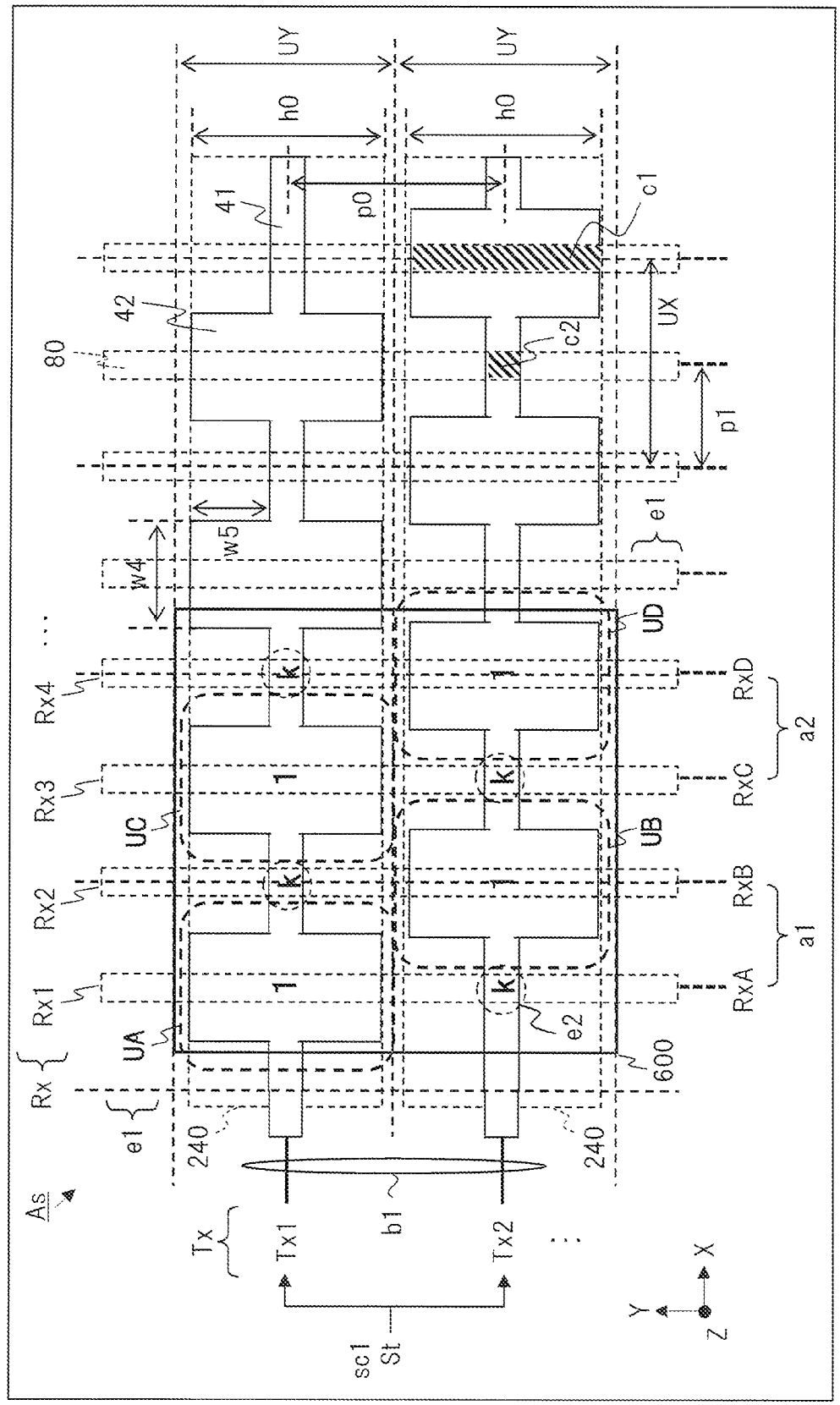
FIG. 24 is an enlarged view showing a configuration example of electrodes and the like of the touch detection area of the embodiment 3A.

FIG. 24 shows the touch detection region 600 including the detection units UA to UD as a partially enlarged view of the configuration of FIG. 23. In FIG. 24, in particular, the detection electrodes Rx are depicted by broken lines to show the shape of the drive electrode Tx on the lower side in the Z-direction. The detailed electrode shape and the configuration relating to the ratio of the touch detection sensitivities will be described with reference to FIG. 24. A region 240 shows a region corresponding to the block shape of the drive electrode Tx having the constant width h0 for comparison. In the embodiment 3A, the width of the protruding electrode portion 42 of the drive electrode Tx in the Y-direction is set to be the same as the width h0.

In the embodiment 3A, as means for forming 1:k corresponding to the ratio of touch detection sensitivities between the detection region e1 and the non-detection region e2, the presence or absence of the protruding electrode portion 42 of the drive electrode Tx and the width, the area and the like of the protruding portion are designed. The protruding electrode portion 42 of the drive electrode Tx is provided so as to correspond to each of the portions of the detection units UA to UD forming the detection region e1, and only the thin line portion 41 is formed on the portion of the non-detection region e2. The protruding electrode portion 42 has protruding portions extending laterally toward the two sides in the X-direction from the thin line portion 80 of the detection electrode Rx serving as the center line. In this configuration example, the width w4 of the protruding electrode portion 42 in the X-direction, the width w5 of the protruding portion thereof in the Y-direction and the like are adjusted.

With the above-mentioned configuration, an electric field to be generated in the vicinity of the intersecting portion c1 between the drive electrode Tx and the detection electrode Rx corresponding to the detection region e1 becomes stronger. In other words, the touch detection sensitivity becomes higher in the detection units UA to UD corresponding to the detection region e1. Meanwhile, the intersecting portion c2 between the drive electrode Tx and the detection electrode Rx corresponding to the non-detection region e2 has a small area because of the intersection between the thin line portion 80 and the thin line portion 41. Therefore, an electric field becomes weaker in the vicinity of the intersecting portion c2, so that the touch detection sensitivity becomes lower.

As described above, in the embodiment 3A, the same effects as those of the embodiment 1A and the embodiment 2A can be obtained. Note that the shape of the protruding electrode portion 42 of the drive electrode Tx is not limited to a simple rectangular shape on the XY plane, and various shapes may be used. Moreover, the shape of the protruding electrode portion 42 is not limited to the shape protruding toward the two sides longitudinally in the Y-direction, and the protruding electrode portion 42 may be formed into a shape protruding toward only one side longitudinally in the Y-direction.

Embodiment 3B

Figure 25:
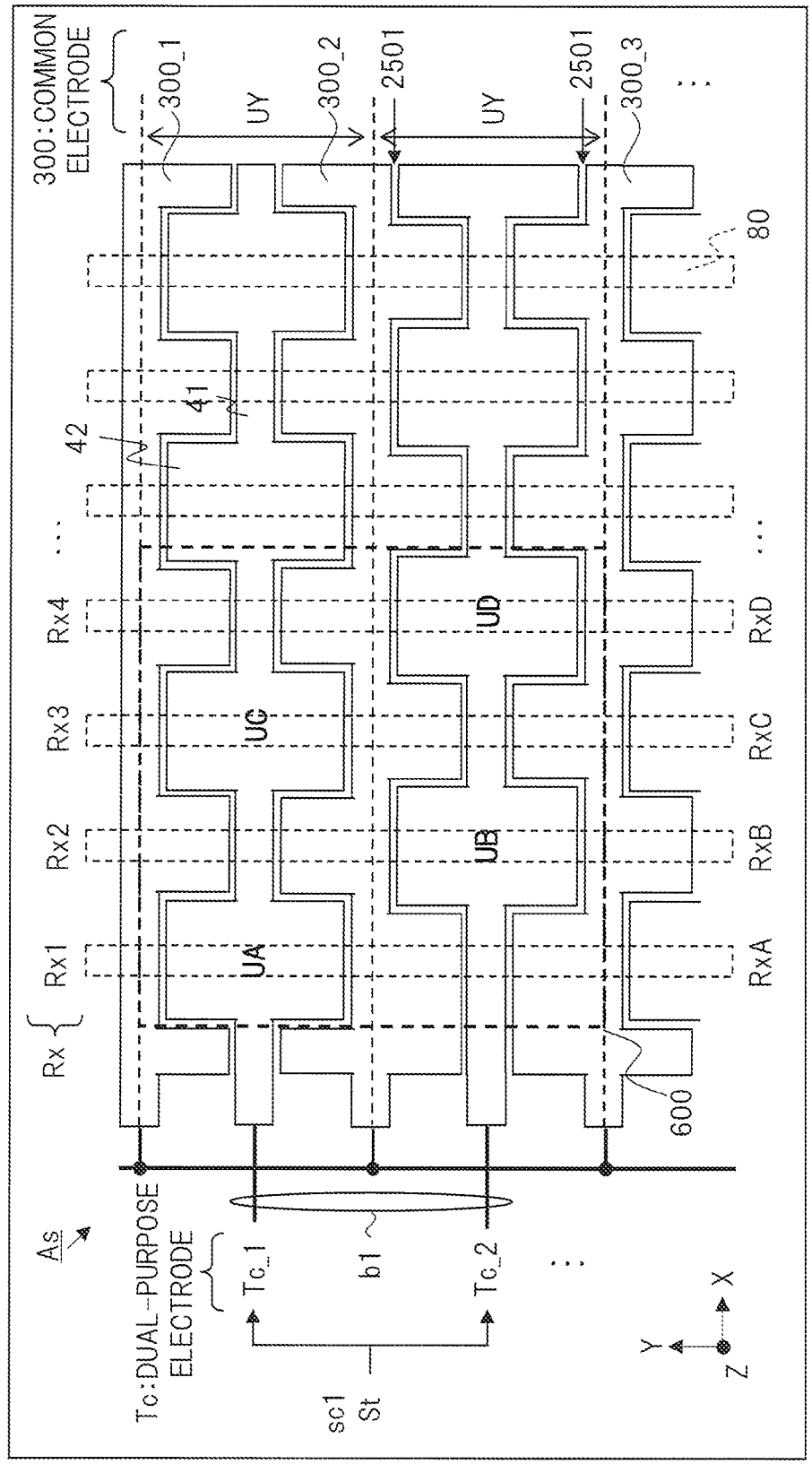
FIG. 25 is a diagram showing a configuration of an XY plane of electrodes and the like in a touch detection area as an outline of a display device with a touch sensor of an embodiment 3B.

FIG. 25 shows a configuration of the electrode shape or the like of the touch detection area As as an outline of the configuration of a display device with a touch sensor of the embodiment 3B. The embodiment 3B is a modified example of the embodiment 3A, and the same characteristics as those of the embodiment 3A are applied to a display device with an in-cell type touch sensor. The configuration of the display device with a touch sensor of the embodiment 3B differs from that of the embodiment 3A in the following points. The detailed configuration example of a panel unit or the like of the display device with an in-cell type touch sensor will be described later.

In the configuration of FIG. 25, the touch detection area As includes dual-purpose electrodes Tc which are drive electrodes having the same shape as that of the drive electrodes Tx of the embodiment 3A and common electrodes 300 each disposed between the plurality of dual-purpose electrodes Tc in the Y-direction. The common electrodes 300 include a common electrode 300_1, a common electrode 300_2 and the like serving as a plurality of electrode portions. The dual-purpose electrodes Tc and the common electrodes 300 are disposed on the same layer in the Z-direction. The aforementioned drive electrodes Tx are configured as the dual-purpose electrodes Tc of the display device with an in-cell type touch sensor in the embodiment 3B. The dual-purpose electrodes Tc are electrodes that are standardized so as to achieve both of the function as the drive electrode for a touch sensor function and the function as the common electrode for a display function. In the same manner as the configuration of FIG. 24, each dual-purpose electrode Tc has thin line portions 41 extending in the X-direction and protruding electrode portions 42 that protrude from the thin line portion 41 toward two sides longitudinally in the Y-direction.

As the driving method of the embodiment 3B, since the dual-purpose electrodes Tc function as the common electrodes during the display period Kd relating to the display function, the same voltage Vcom is applied to all the dual-purpose electrodes Tc from the circuit unit. Moreover, in the same manner as the aforementioned embodiment 2A, during the touch detection period Ks relating to the touch sensor function, two dual-purpose electrodes Tc in the touch detection area As are taken as one set and are simultaneously driven from the circuit unit.

The common electrodes 300 are provided as a plurality of divided electrode portions in all the regions except for regions where the dual-purpose electrodes Tc are disposed on the XY plane of the touch detection area As. The adjacent common electrode 300 and dual-purpose electrode Tc are disposed side by side at a short interval therebetween. A slit corresponding to the short interval is disposed at a portion indicated by a reference numeral 2501 between the common electrode 300 and dual-purpose electrode Tc adjacent in the Y-direction. Thus, the common electrode 300 and dual-purpose electrode Tc adjacent in the Y-direction are electrically separated from each other. At a portion adjacent to the thin line portion 41 of the dual-purpose electrode Tc, the common electrode 300 has a protruding electrode portion in the Y-direction, and at a portion adjacent to the protruding electrode portion 42 of the dual-purpose electrode Tc, it has a thin line portion. The ends of the plurality of common electrodes 300 in the X-direction are commonly connected in a peripheral area Af.

The above-mentioned slit includes a slit portion extending in the X-direction and a slit portion extending in the Y-direction in association with the shapes of the dual-purpose electrodes Tc and the common electrodes 300. The above-mentioned slit has a shape in which the slit portion extending in the X-direction and the slit portion extending in the Y-direction are alternately connected in association with the shape of the protruding electrode portion 42 of the dual-purpose electrode Tc.

As the driving method of the embodiment 3B, the same voltage Vcom is applied to the plurality of common electrodes 300 from the circuit unit during the display period Kd relating to the display function, so that they are driven in the common state. Moreover, during the touch detection period Ks relating to the touch sensor function, the common voltage Vcom or a predetermined same voltage is applied to the plurality of common electrodes 300 from the circuit unit.

As described above, in the embodiment 3B, the same effects as those of the embodiment 3A can be obtained in the display device with an in-cell type touch sensor. Note that it is also possible to apply the configuration of FIG. 25 of the embodiment 3B to a touch sensor device. In this case, the dual-purpose electrodes Tc serve as the drive electrodes Tx, and the common electrodes 300 are formed as dummy electrodes and are not used in the driving for the touch sensor function.

Embodiment 4

A touch sensor device in the embodiment 4 of the present invention will be described with reference to FIG. 26 to FIG. 28. In the embodiment 4, the shape of the detection electrodes Rx in the configuration of the embodiment 3A is further devised. More specifically, in the embodiment 4, as means for forming a predetermined ratio of touch detection sensitivities, the shapes of both of the detection electrodes Rx and the drive electrodes Tx are devised.

Figure 26:
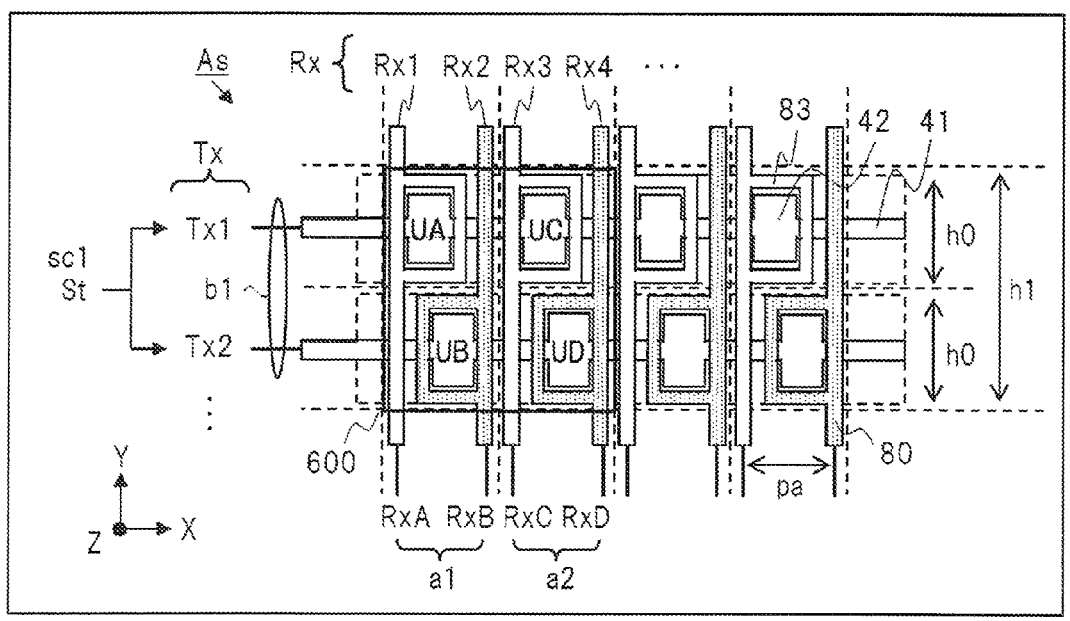
FIG. 26 is a diagram showing a configuration of an XY plane of electrodes and the like in a touch detection area as an outline of a touch sensor device of an embodiment 4.

FIG. 26 shows the configuration on the XY plane of drive electrodes and the like in the touch detection area As as an outline of a touch sensor device in the embodiment 4. The configuration of the drive electrodes Tx is the same as that of the embodiment 3A, and thin line portions 41 and protruding electrode portions 42 are provided. In the embodiment 4, with respect to the shape of each detection electrode Rx, the thin line portions 80 are disposed near the border lines extending laterally in the X-direction of each detection unit U at a pitch pa and a pitch pb in the same manner as the embodiment 2B. Moreover, the detection electrode Rx has a protruding electrode portion 83 including an opening so as to correspond to the portions of the detection units UA to UD forming the detection regions e1. The protruding electrode portion 83 of the detection electrode RxA protrudes from the thin line portion 80 rightward in the X-direction, and the protruding electrode portion 83 of the detection electrode RxB protrudes from the thin line portion 80 leftward in the X-direction.

Figure 27:
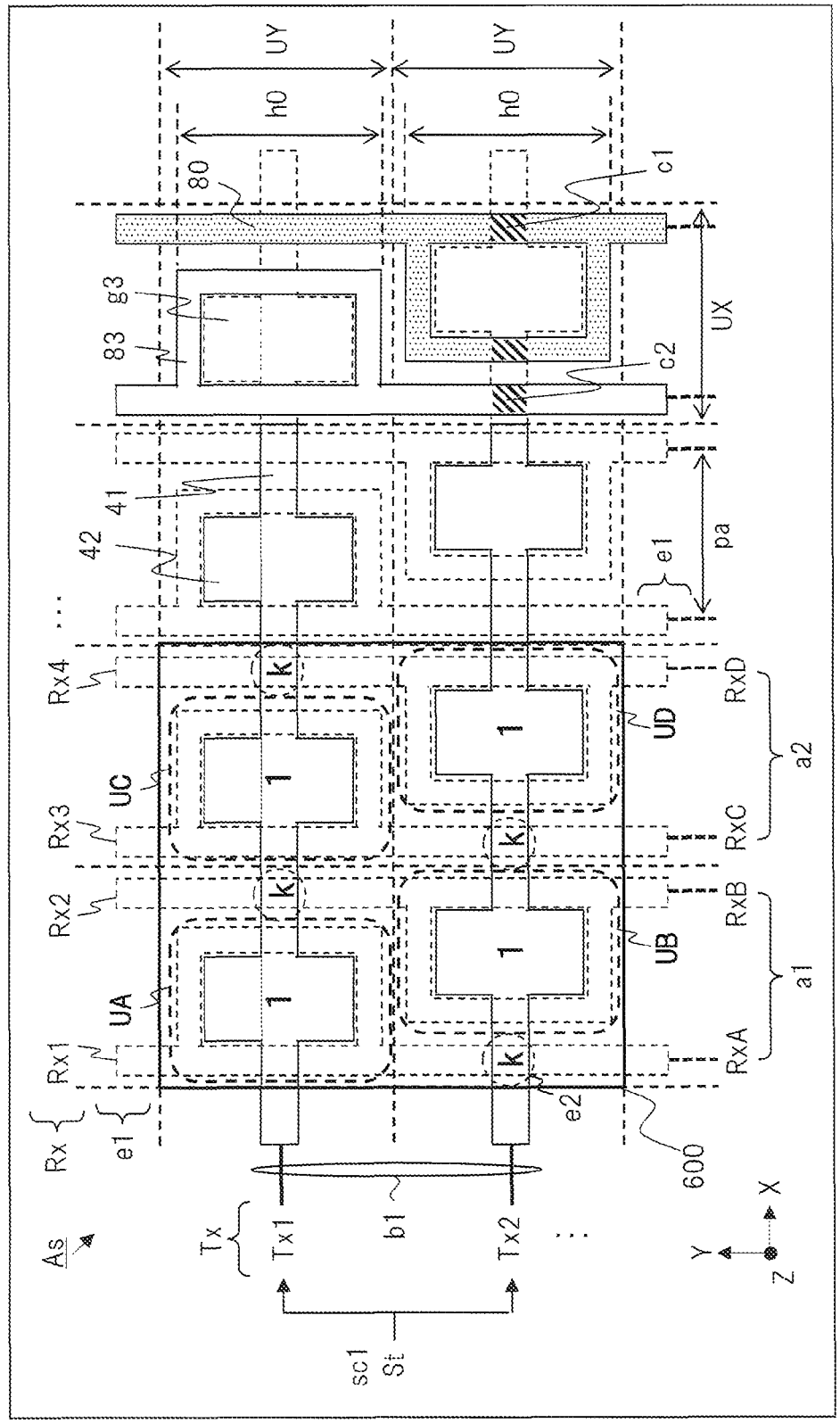
FIG. 27 is an enlarged view showing a configuration example of electrodes and the like of the touch detection area of the embodiment 4.

FIG. 27 is an enlarged view showing electrodes and the like of the touch detection area As of FIG. 26. On the XY plane, the protruding electrode portion 83 of the detection electrode Rx has a shape in which one rectangular shaped opening g3 is formed inside an area closed by a rectangular shaped peripheral portion. In other words, the protruding electrode portion 83 of the detection electrode Rx has a frame shape surrounded by a thin line portion having an approximately constant width. The opening g3 of the protruding electrode portion 83 has a shape superposed on a rectangular shape including the thin line portion 41 and the protruding electrode portion 42 of the drive electrode Tx disposed on the lower side in the Z-direction. That is, the rectangular shape of the opening g3 is the same as the rectangular shape including the thin line portion 41 and the protruding electrode portion 42 of the drive electrode Tx, and the profile lines of the respective rectangular shapes are coincident with each other when seen on an XY plane in the configuration example of FIG. 27.

With the configuration of the electrode shape described above, intersecting portions between the drive electrode Tx and the detection electrode Rx form an intersecting portion c1 and an intersecting portion c2. The intersecting portion c2 corresponding to the non-detection region e2 has a small area because of the intersection between the thin line portion 41 of the drive electrode Tx and the thin line portion 80 of the detection electrode Rx, so that the touch detection sensitivity becomes lower in the vicinity of the intersecting portion c2. The intersecting portion c1 corresponding to the detection region e1 has a small area because of the intersection between the thin line portion 41 of the drive electrode Tx and the thin line portion of the protruding electrode portion 83 of the detection electrode Rx. The regions in which an electric field is generated through the opening g3 between the rectangular electrode portion of the drive electrode Tx corresponding to the opening g3 and the protruding electrode portion 83 of the detection electrode Rx located on the upper side in the Z-direction are increased. Therefore, the touch detection sensitivity becomes higher in the detection units UA to UD corresponding to the detection regions e1.

Figure 28:
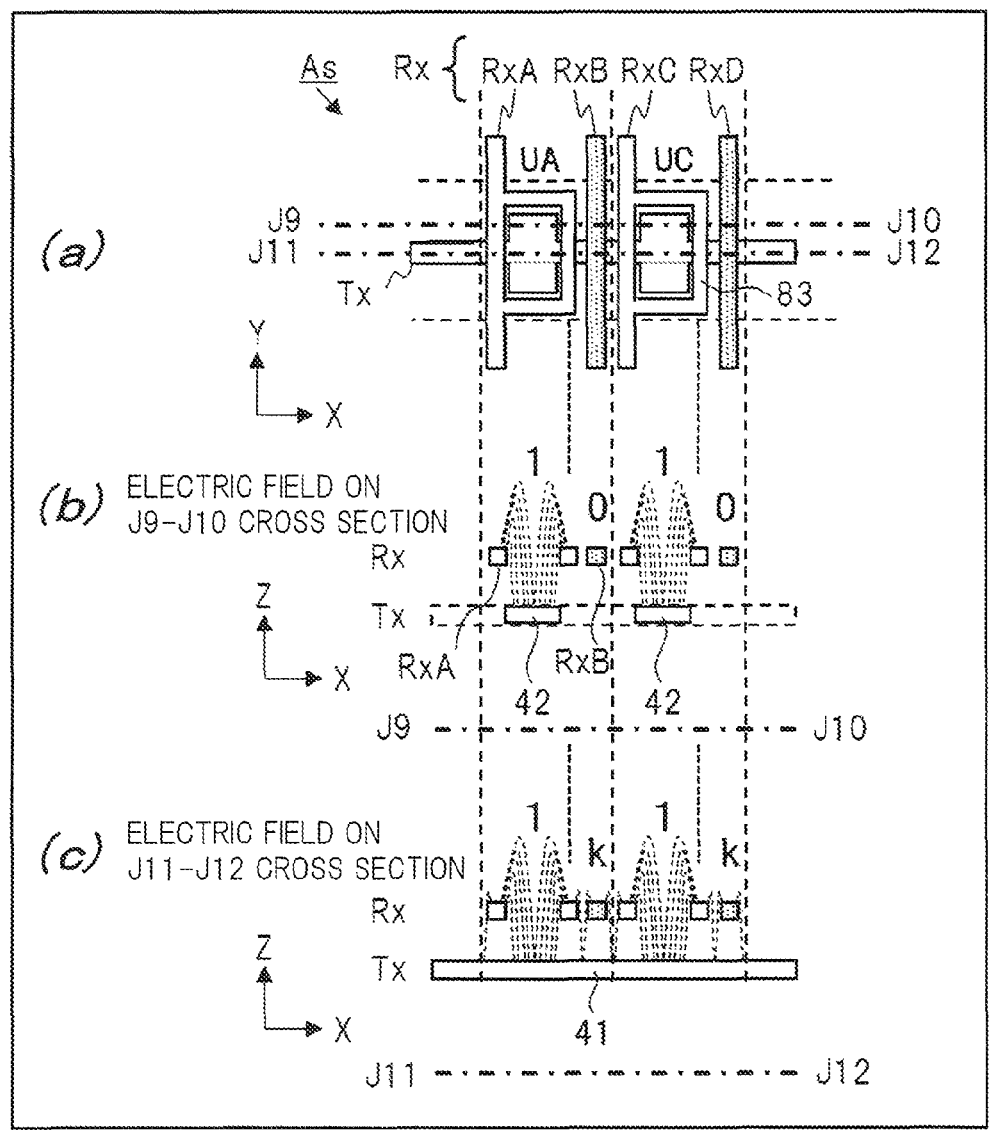
FIG. 28 includes diagrams (a) to (c) each showing a state of an electric field generated in the configuration of FIG. 27.

FIG. 28 shows a state of an electric field generated in the configuration of FIG. 27. A diagram (a) of FIG. 28 shows a region including the detection unit UA and the detection unit UC in the drive electrode Tx on the XY plane. A diagram (b) of FIG. 28 shows an electric field on a J9-J10 cross section of the diagram (a) of FIG. 28. With respect to a portion having the protruding electrode portion 83, the area in which an electric field is generated through the opening g3 on the upper side in the Z-direction of the protruding electrode portion 42 of the drive electrode Tx is increased. Therefore, the touch detection sensitivity becomes higher. Meanwhile, since no drive electrode Tx is provided in a portion between the protruding electrode portions 42 in the X-direction, almost no electric field is generated. Supposing that the touch detection sensitivity of the region corresponding to the opening g3 is 1, the touch detection sensitivity at the portion between the protruding electrode portions 42 becomes approximately 0. A diagram (c) of FIG. 28 shows an electric field on a J11-J12 cross section of the diagram (a) of FIG. 28. In a portion having the protruding electrode portion 42, the touch detection sensitivity becomes higher in the same manner as FIG. 28B. Meanwhile, at a position intersecting with the detection electrode RxB and the detection electrode RxD in the X-direction, since there is only the intersection between thin line portion 41 and the thin line portion 80 as described above, only a weak electric field is generated, so that the touch detection sensitivity becomes lower.

As described above, the same effects as those of the embodiment 3A and the like can be obtained in the embodiment 4, and a predetermined touch detection sensitivity can be obtained by the protruding electrode portion 83 having the opening g3.

As a modified example of the embodiment 4, the detection electrode Rx of FIG. 26 may have a shape of the thin line portion 80 that simply extends in the Y-direction by omitting the protruding electrode portion 83 with the opening. Also in this modified example, an electric field is generated between the rectangular region formed by the protruding electrode portion 42 of the drive electrode Tx and the thin line portion 80 of the detection electrode Rx closer to the region, and a predetermined touch detection sensitivity can be obtained.

Moreover, as a modified example of the aforementioned embodiment 3A, the thin line portion 80 of each of the detection electrodes Rx arranged at a constant pitch p1 of FIG. 23 may be formed to have a shape in which protruding electrode portions having openings similar to those of the embodiment 4 are formed on the detection electrode Rx side so as to correspond to the arrangement of the detection units U and the protruding electrode portions 42 of the drive electrode Tx.

Moreover, it is also possible to apply the configuration of the embodiment 4 to a display device with an in-cell type touch sensor in the same manner as the embodiment 3B. In this case, the drive electrodes Tx of FIG. 26 are formed as the dual-purpose electrodes Tc, and a region located between the dual-purpose electrodes Tc adjacent in the Y-direction is formed as the common electrode 300.

Embodiment 5

A display device with a touch sensor in the embodiment 5 of the present invention will be described with reference to FIG. 29 to FIG. 35. The embodiment 5 shows a case applied to the display device with a touch sensor which is a display device provided with a touch sensor device, and in particular shows a case applied to a display device with an in-cell type touch sensor which is a liquid crystal display device in which the touch sensor device is incorporated in a liquid crystal display panel unit. In the same manner as the configuration of FIG. 4 in the embodiment 1A, in comparison with the conventional display device with an in-cell type touch sensor, the display device with an in-cell type touch sensor of the embodiment 5 has the configuration in which the width of the dual-purpose electrode Tc in the Y-direction is widened, in other words, the configuration in which the two adjacent dual-purpose electrodes Tc are integrally formed into one electrode, the configuration in which the pitch of the arrangement of the detection electrodes Rx is narrowed so as to increase the number thereof, and the configuration in which the shape of the detection electrode Rx is devised so as to provide a predetermined touch detection sensitivity.

[Display Device with Touch Sensor and Panel Unit Plane]

Figure 29:
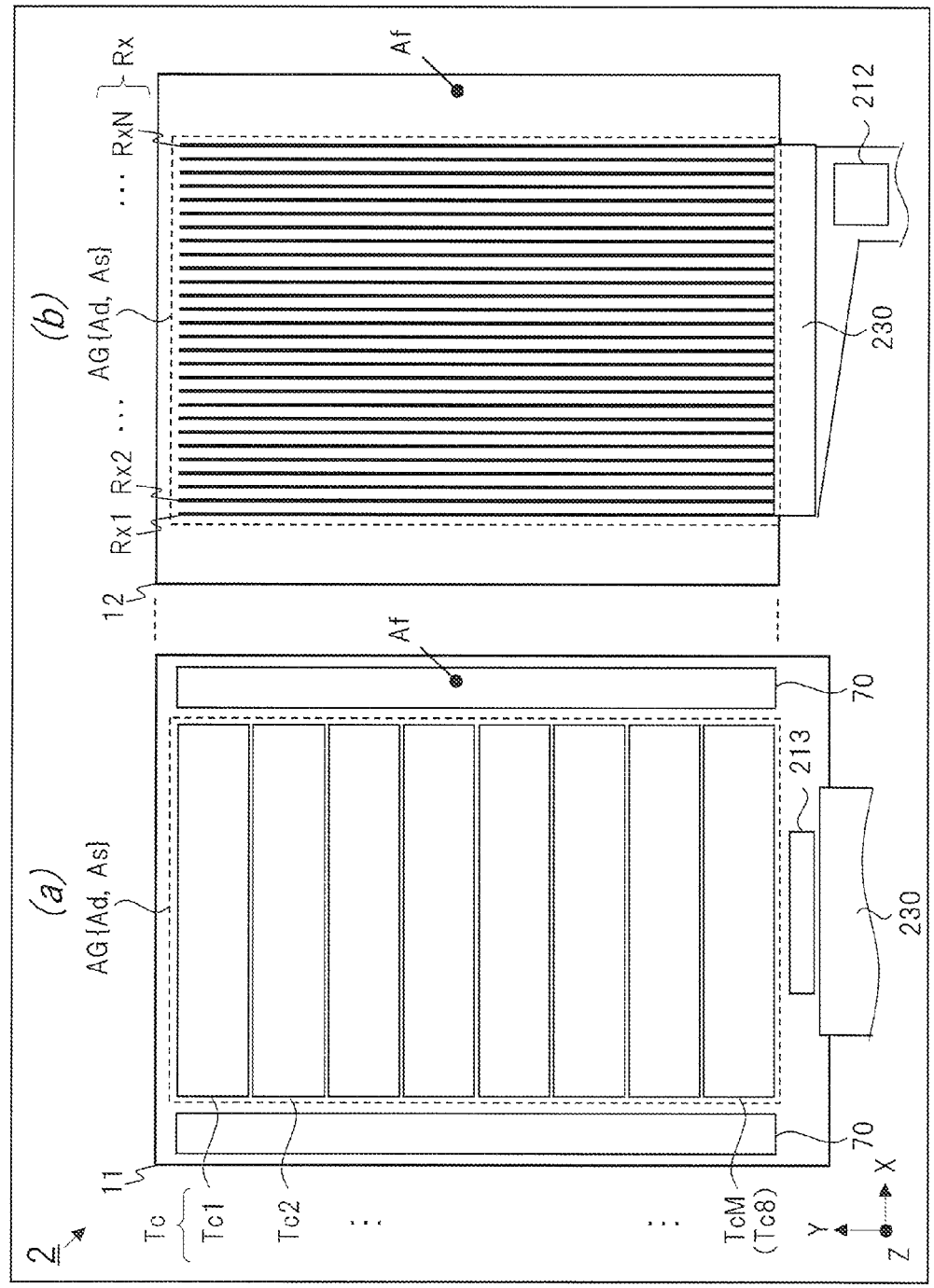
FIG. 29 includes diagrams (a) and (b) each showing a configuration of an XY plane of a panel unit in a display device with a touch sensor of an embodiment 5 of the present invention.

FIG. 29 shows a configuration on the XY plane of a panel unit in the display device 2 with a touch sensor of the embodiment 5. A diagram (a) of FIG. 29 shows a configuration including a dual-purpose electrode Tc on a TFT substrate 11 side which is a substrate structure on the lower side in the Z-direction constituting the panel unit of the display device 2 with a touch sensor. A diagram (b) of FIG. 29 shows a configuration including a detection electrode Rx on a color filter substrate 12 side which is a substrate structure on the upper side in the Z-direction constituting the panel unit of the display device 2 with a touch sensor. Note that the illustrations of the constituent elements of the liquid crystal display device are omitted in FIG. 29. The panel unit of the display device 2 with a touch sensor is schematically constituted by the TFT substrate 11 and the color filter substrate 12 which are the two substrate structures superposed on each other in the Z-direction.

The XY plane of the panel unit has a screen area AG and a peripheral area Af on the outside of the screen area AG. The screen area AG includes a display area Ad for the display function and a touch detection area As for the touch sensor function, and the display area Ad and the touch detection area As are superposed in the Z-direction. In the screen area AG, M dual-purpose electrodes Tc which are disposed in parallel with one another in the X-direction are formed on the TFT substrate 11 side, and N detection electrodes Rx which are disposed in parallel with one another in the Y-direction are formed on the color filter substrate 12 side.

In the TFT substrate 11, the dual-purpose electrodes Tc are formed in place of the aforementioned drive electrodes Tx. In the same manner as the drive electrodes Tx of the aforementioned embodiment 1A, the dual-purpose electrodes Tc are constituted by a plurality of rectangular-shaped blocks divided in the screen area AG. The dual-purpose electrode Tc is an electrode in which a common electrode forming a display function of the liquid crystal display device and a drive electrode forming a touch sensor function are combined as one drive electrode, and is an electrode to be used for the respective functions.

In the peripheral area Af, a circuit unit and the like connected to the dual-purpose electrodes Tc and the detection electrodes Rx are formed. In this configuration example, a dual-purpose electrode driving unit 70 which is a circuit unit mounted in the areas on two sides laterally in the X-direction of the peripheral area Af and a first IC chip 213 mounted in the area on the lower side in the Y-direction of the peripheral area Af are provided on the TFT substrate 11. The dual-purpose electrode driving unit 70 is connected to M dual-purpose electrodes Tc. The dual-purpose electrode driving unit 70 carries out a touch driving and a common driving of the M dual-purpose electrodes Tc.

In the first IC chip 213, a control unit of the display device 2 with a touch sensor, a circuit unit for liquid crystal display and the like are mounted. Alternatively, the dual-purpose electrode driving unit 70 may be mounted in the first IC chip 213. The first IC chip 213 is connected to the dual-purpose electrode driving unit 70 and a flexible printed board 230. The first IC chip 213 is mounted on a glass substrate constituting the TFT substrate 11. The flexible printed circuit 230 on the TFT substrate 11 side is integrally connected to the flexible printed board 230 on a front substrate 102 side. One end of the flexible printed board 230 (not shown) is connected to an external electronic equipment or the like.

On the color filter substrate 12, the flexible printed board 230 connected to the end of the detection electrode Rx is provided on the lower side of the peripheral area Af in the Y-direction. The flexible printed board 230 on the color filter substrate 12 has a second IC chip 212 mounted thereon. A touch detection unit 60 is mounted in the second IC chip 212. The first IC chip 213 and the second IC chip 212 are connected to each other via the flexible printed board 230. The display device 2 with a touch sensor synchronously controls the first IC chip 213 and the second IC chip 212.

[Panel Unit Cross Section]

Figure 30:
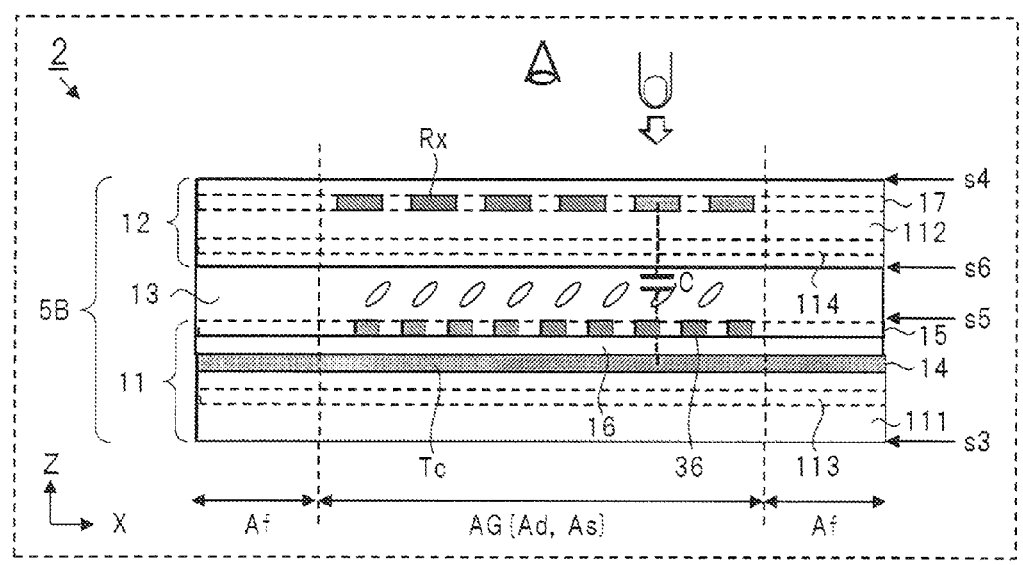
FIG. 30 is a diagram showing a schematic configuration of an XZ cross section of a panel unit constituting the display device with a touch sensor of the embodiment 5.

FIG. 30 shows a schematic configuration of an XZ cross section of a panel unit 5B constituting the display device 2 with a touch sensor of the embodiment 5. The panel unit 5B is a liquid crystal display panel unit having dual-purpose electrodes Tc incorporated therein as an in-cell type. The panel unit 5B has the TFT substrate 11 which is a first substrate structure on the back side in the Z-direction, the color filter substrate 12 which is a second substrate structure on the front side, and a liquid crystal layer 13 which is a display functional layer sealed therebetween. Note that a publicly known polarizing plate or the like is connected to a back surface s3 and a front surface s4 of the panel unit 5B, and a publicly known backlight or the like is connected to the back surface s3, but illustrations thereof are omitted.

The liquid crystal layer 13 is a layer in which liquid crystal is sealed, and the orientation thereof is controlled. A publicly known alignment film is formed on a lower surface s5 and an upper surface s6 of the liquid crystal layer 13 in the Z-direction, but illustrations thereof are omitted. Moreover, the liquid crystal layer 13 includes a sealing portion in an area corresponding to the peripheral area Af outside the screen area AG, but the illustration thereof is omitted. As a driving method of the liquid crystal layer 13, the case of applying a fringe field switching (FFS), which is one kind of a lateral electric field method, is shown in the present embodiment, but the method is not limited thereto, and various kinds of methods may be applied. In the case of FFS, dual-purpose electrodes Tc functioning as common electrodes and pixel electrodes 36 are formed via a dielectric layer 16 in the TFT substrate 11 so as to be superposed in the Z-direction perpendicular to the substrate surface. The orientation of the liquid crystal in the liquid crystal layer 13 is controlled based on a control of the voltage applied from the circuit unit to the dual-purpose electrodes Tc and the pixel electrodes 36. In the FFS, an electric field mainly exerted in a diagonal direction to the substrate surface or an electric field in a parabolic shape, that is, a so-called fringe electric field is generated.

Figure 31:
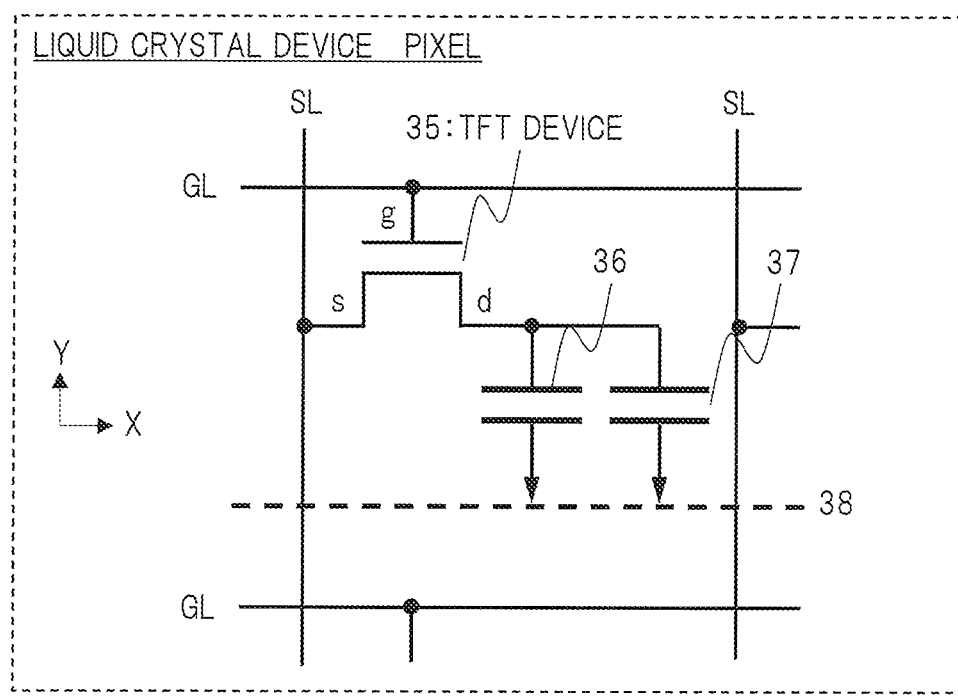
FIG. 31 is a diagram showing a configuration of an equivalent circuit of a pixel in a TFT liquid crystal display device corresponding to the configuration of FIG. 30.

In the TFT substrate 11, a TFT layer 113, a dual-purpose electrode layer 14, a dielectric layer 16, a pixel electrode layer 15 and the like are formed on a glass substrate 111. The TFT layer 113 is schematically shown as a layer in which TFT devices 35, gate lines GL, source lines SL and the like as shown in FIG. 31 are formed on the glass substrate 111. The dual-purpose electrode layer 14 corresponds to a layer in which the dual-purpose electrodes Tc are formed. The pixel electrode layer 15 corresponds to a layer in which the pixel electrodes 36 are formed. In the display area Ad included in the screen area AG, the dual-purpose electrodes Tc are driven to be brought into a common state regardless of the pixels when they are caused to function as common electrodes for liquid crystal display. In the display area Ad, the pixel electrodes 36 are constituted as individual electrode portions in accordance with the arrangement of the pixels, and are driven so as to be brought into states corresponding to the respective pixels. The position of the dual-purpose electrode layer 14 is the same as the position where the common electrodes are formed in a publicly known liquid crystal display device and display device with an on-cell type touch sensor. Note that the dual-purpose electrode layer 14 includes a portion where the ends of the dual-purpose electrodes Tc and wires for the dual-purpose electrodes are connected in the peripheral area Af.

In the color filter substrate 12, a color filter layer 114 and a detection electrode layer 17 are formed on the glass substrate 112. The color filter layer 114 is schematically shown as a layer in which color filters of respective colors, a light-shielding film, an over coat film and the like are formed. For example, the color filter layer 114 is formed on a side closer to the upper surface s6 of the liquid crystal layer 13 in the Z-direction. In the peripheral area Af, for example, a light-shielding film is formed. The light-shielding film is referred to also as a black matrix (BM). The detection electrode layer 17 is a layer in which the detection electrodes Rx are formed and it is formed on a side closer to the front surface s4 of the color filter substrate 12 in the Z-direction.

A capacitance C that is associated with each of detection units U is formed from a pair of the dual-purpose electrode Tc on the TFT substrate 11 side and the detection electrode Rx on the color filter substrate 12 side. The cross-sectional views of FIG. 30 and others are schematic views, and in an actual mounting, for example, the thickness of the liquid crystal layer 13 in the Z-direction is smaller than that of the TFT substrate 11 or the like, and the other dimensions and ratios are also determined in accordance with the actual mounting.

The structure of the display device with a touch sensor is not limited to the structure of the display device 2 with an in-cell type touch sensor of the embodiment 5 shown in FIG. 30, and another structure may be adopted. As another embodiment, a display device with an on-cell type touch sensor may be used. In the display device with an on-cell type touch sensor in this embodiment, the touch sensor device of the aforementioned embodiment 1A or the like is externally connected as a touch sensor layer to the front surface side corresponding to the display surface side of a liquid crystal display panel unit of a publicly known liquid crystal display device. In this case, the connection between the liquid crystal display panel unit and the touch sensor layer can be achieved by bonding, mechanical retention or the like. Alternatively, in the display device with an on-cell type touch sensor of the present embodiment, the function of the touch sensor device of the aforementioned embodiment 1A or the like is incorporated as a touch sensor layer in the cover on the front surface side provided in a publicly known liquid crystal display panel unit.

[Pixels of Liquid Crystal Display Device]

FIG. 31 shows a configuration of an equivalent circuit of a pixel in a thin-film transistor (TFT) liquid crystal display device corresponding to the configuration of FIG. 30. In the liquid crystal display panel unit, pixels are configured so as to correspond to intersections between gate lines GL arranged in parallel with one another in the X-direction and source lines SL arranged in parallel with one another in the Y-direction. Each pixel is provided with a TFT device 35 serving as a switching device, a pixel electrode 36 and a holding capacitor 37. A gate electrode g of the TFT device 35 is connected to the gate line GL, a source electrode s is connected to the source line SL, and a drain electrode d is connected to one terminals of the pixel electrode 36 and the holding capacitor 37. The gate line GL is a scanning line for selecting the pixels in the display area Ad, and the source line SL is a data line for applying display data to the pixels in the display area Ad. Moreover, in this specification, the data line is referred to also as a signal line. The counter electrode of the pixel electrode 36 and the other terminal of the holding capacitor 37 are commonly connected between pixels as a common electrode 38. The common electrode 38 is constituted by the dual-purpose electrode Tc in the embodiment 5.

[Display Device with Touch Sensor and Electronic Equipment]

Figure 32:
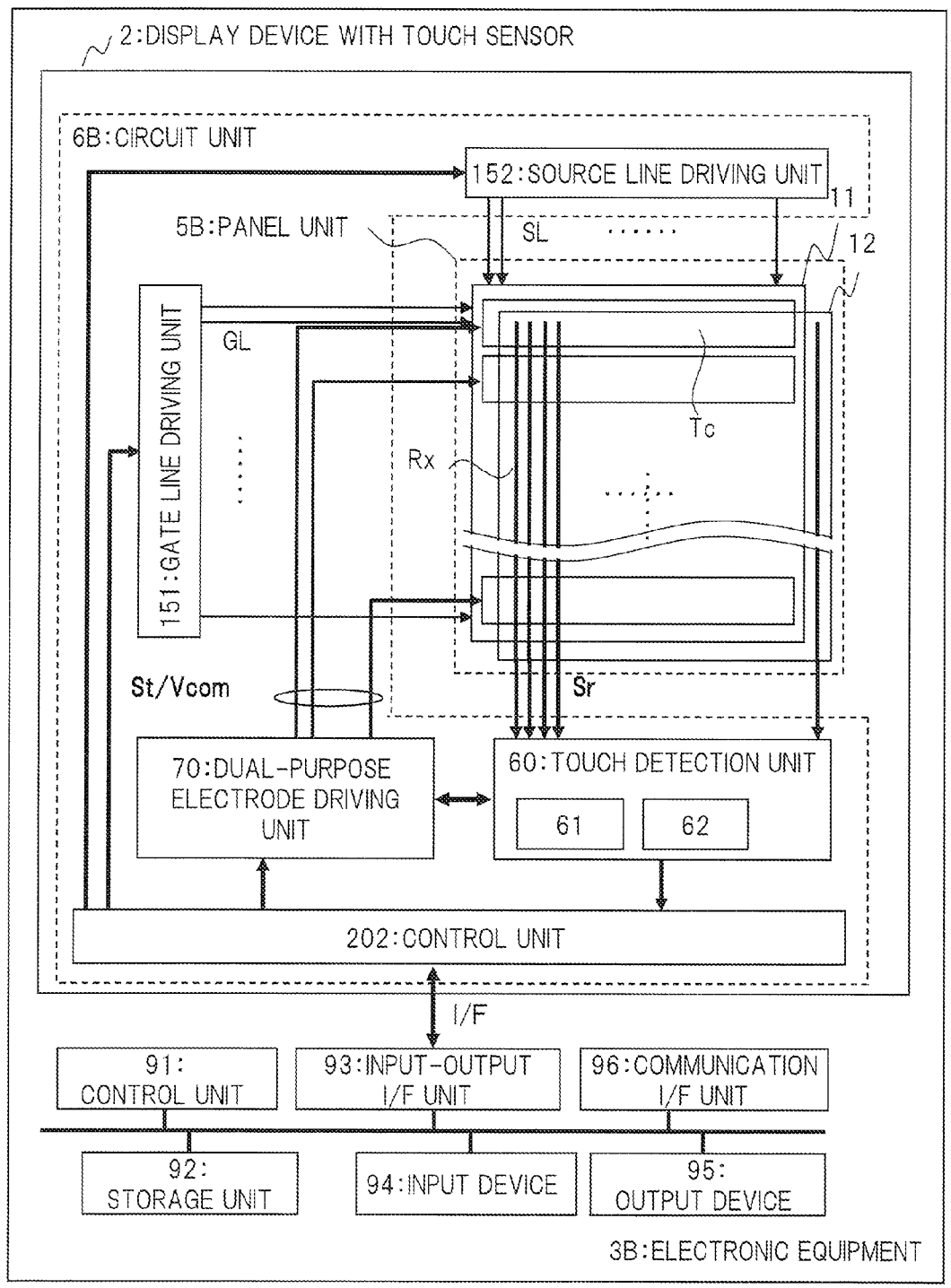
FIG. 32 is a diagram showing a functional block configuration of the display device with a touch sensor of the embodiment 5 and a configuration of an electronic equipment provided with the display device with a touch sensor of the embodiment 5.

FIG. 32 shows a functional block configuration of the display device 2 with a touch sensor of the embodiment 5 and a configuration of an electronic equipment 3B provided with the display device 2 with a touch sensor of the embodiment 5. The display device 2 with a touch sensor has a panel unit 5B and a circuit unit 6B. The panel unit 5B includes the aforementioned TFT substrate 11 and color filter substrate 12. The circuit unit 6B includes a control unit 202, a dual-purpose electrode driving unit 70, a touch detection unit 60, a gate line driving unit 151, a source line driving unit 152 and others. In this figure, the panel unit 5B and the circuit unit 6B are separated, but the circuit unit 6B may be mounted in the panel unit 5B. Moreover, the respective portions of the circuit unit 6B may be integrated or separated as appropriate.

The control unit 202 is a control unit of the display device 2 with a touch sensor, and the control unit for the touch sensor function and the control unit for the display function of a liquid crystal display device are integrally combined in this configuration example. The control unit 202 synchronously controls the touch sensor function and the display function. Note that the display device 2 with a touch sensor may be configured to synchronously control the circuit unit for the display function and the circuit unit for the touch sensor function by omitting the control unit 202. The control unit 202 cooperates with the control unit 91 of the electronic equipment 3B through the input-output I/F unit 93, and controls the touch sensor function and the display function based on an instruction from the control unit 91. The control unit 202 gives a control signal for the common driving relating to the dual-purpose electrodes Tc and a control signal for the touch driving to the dual-purpose electrode driving unit 70, and receives touch detection information from the touch detection unit 60. Moreover, the control unit 202 gives a driving control signal to the gate line driving unit 151 and the source line driving unit 152, which are the circuit units relating to display function. The control unit 202 transmits touch detection information to the control unit 91 as a report.

The gate line driving unit 151 carries out the scan driving of a group of gate lines GL of the TFT substrate 11 by using a scanning signal. The source line driving unit 152 gives a data signal to the group of source lines SL of the TFT substrate 11 in synchronization with the scanning of the gate lines GL. Since the in-cell type is adopted in the present embodiment, the driving unit of the common electrodes for liquid crystal display is integrated with the dual-purpose electrode driving unit 70. In the case of the display device with an on-cell type touch sensor, a driving unit exclusively-used for the common electrodes is provided in the present embodiment.

Based on the control instruction from the control unit 202, the dual-purpose electrode driving unit 70 carries out the common driving of applying a voltage Vcom for the common driving to the plurality of dual-purpose electrodes Tc of the TFT substrate 11 of the panel unit 5B at the time of the display period Kd, and it carries out the touch driving of applying a touch driving signal St thereto at the time of the touch detection period Ks. In conjunction with the touch driving by the dual-purpose electrode driving unit 70, the touch detection unit 60 detects an output signal from the plurality of detection electrodes Rx of the panel unit 5B as a touch detection signal Sr by the detection circuit unit 61, and calculates the presence or absence and the position or the like of a touch by using the position calculating unit 62, thereby obtaining the touch detection information.

The electronic equipment 3B includes the display device 2 with a touch sensor, the control unit 91, the storage unit 92, the input-output I/F unit 93, the input device 94, the output device 95, the communication I/F unit 96, a bus and other devices such as a power supply unit (not shown). The control unit 91 carries out control processes of the electronic equipment 3B. The input-output I/F unit 93 to which the display device 2 with a touch sensor is connected carries out interface processes thereof. The control unit 91 receives an image signal from outside or generates an image signal therein and stores it in the storage unit 92. From the control unit 91, an image signal and control instruction information are given to the control unit 202 of the display device 2 with a touch sensor through the input-output I/F unit 93. In conjunction with this, the control unit 202 gives image data, a timing signal and the like to the gate line driving unit 151 and the source line driving unit 152.

[Dual-purpose electrode Driving Unit]

Figure 33:
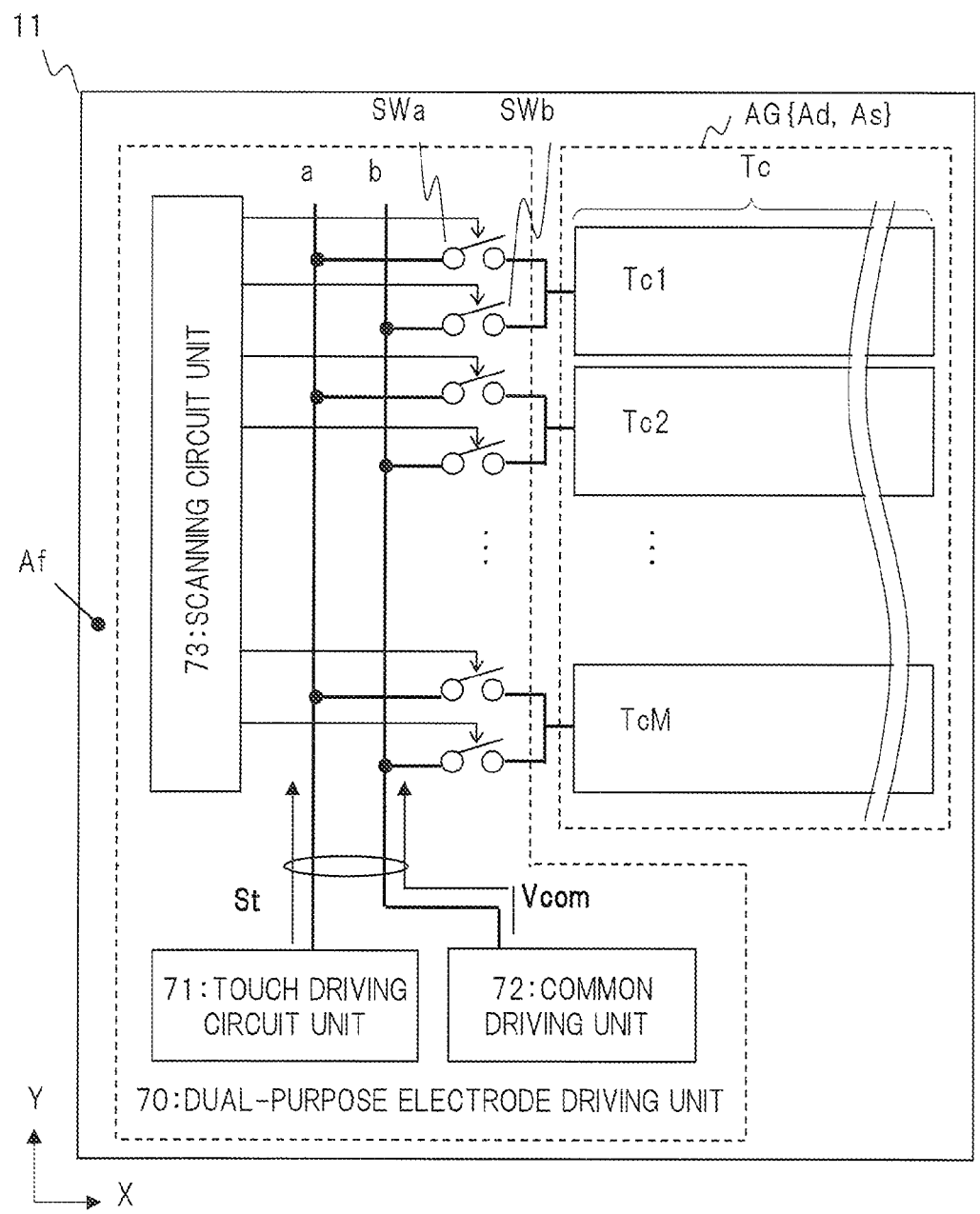
FIG. 33 is a diagram showing a configuration example of a dual-purpose electrode driving unit in the panel unit of the embodiment 5.

FIG. 33 shows a configuration example of the dual-purpose electrode driving unit 70 in the panel unit 5B of the embodiment 5. In this configuration example, the dual-purpose electrode driving unit 70 is mounted in a left side area or a lower side area of the peripheral area Af of the TFT substrate 11. In FIG. 33, illustrations of other circuit units for the liquid crystal display to be mounted therein are omitted. The dual-purpose electrode driving unit 70 includes the touch driving circuit unit 71, the common driving unit 72 and the scanning circuit unit 73. Based on a control instruction from the control unit 202, the dual-purpose electrode driving unit 70 drives the dual-purpose electrodes Tc, while synchronizing the touch driving circuit unit 71 and the common driving unit 72 with each other in a time sharing manner.

The touch driving circuit unit 71 includes a pulse generation circuit and the like, and carries out a touch driving in which the dual-purpose electrodes Tc are caused to function as the drive electrodes at the time of the touch detection period Ks for touch sensor function. At the time of the touch driving, the touch driving circuit unit 71 generates a touch driving signal St, and applies the signal to the respective drive electrodes Tx of the touch detection area As of the TFT substrate 11 through a wire a.

The common driving unit 72 carries out a common driving in which the dual-purpose electrodes Tc are caused to function as the common electrodes for liquid crystal display at the time of the display period Kd for display function. At the time of the common driving, the common driving unit 72 generates a voltage Vcom for common driving, and applies the voltage to all the dual-purpose electrodes Tc in the display area Ad of the TFT substrate 11 through a wire b.

The wires connected to the dual-purpose electrodes Tc include the wire a through which the touch driving signal St is transmitted and the wire b through which the common voltage Vcom is applied. The wire a is connected to the ends of the plurality of dual-purpose electrodes Tc in the touch detection area As through a switch SWa. The wire b is connected to the ends of the plurality of dual-purpose electrodes Tc in the display area Ad through a switch SWb.

The scanning circuit unit 73 has a configuration including a shift register or the like, and carries out control at the time of the scan driving of the dual-purpose electrodes Tc in the screen area AG. The scanning circuit unit 73 outputs a control signal corresponding to the driving of a predetermined dual-purpose electrode TC during the display period Kd and the touch detection period Ks so as to switch the on/off of the switch SWa of the wire a and the switch SWb of the wire b. At the time of the common driving in the display period Kd, the scanning circuit unit 73 turns off the switch SWa on the wire a side and turns on the switch SWb on the wire b side, so that the common voltage Vcom is applied to all the dual-purpose electrodes 71 in the screen area AG. At the time of the touch driving in the touch detection period Ks, the scanning circuit unit 73 turns on only the switch SWa corresponding to the dual-purpose electrode Tc to be scanned among the switches SWa on the wire a side, and turns off the switch SWb on the wire b side. In this manner, the pulse of the touch driving signal St is applied to the dual-purpose electrodes Tc to be scanned.

[Driving method and Driving Period]

Figure 34:
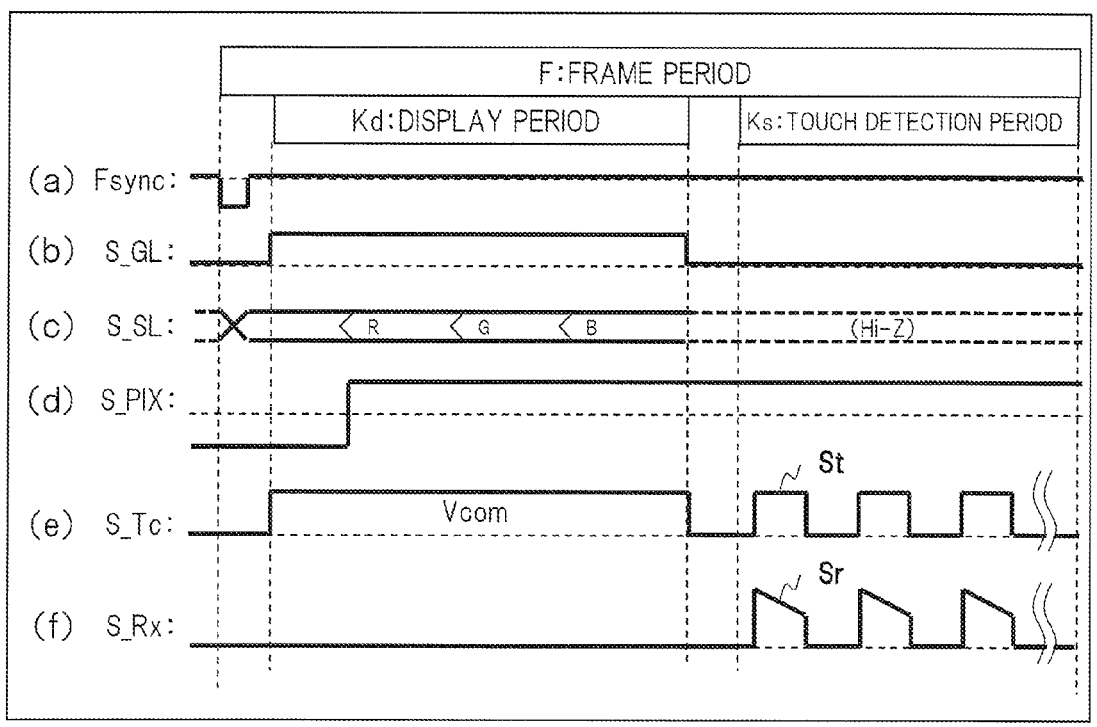
FIG. 34 is a diagram showing a driving method and configuration examples of a driving period in the display device with a touch sensor of the embodiment 5.

FIG. 34 shows a timing chart of various signals and voltages as a configuration example of the driving method and driving period in the display device 2 with a touch sensor of the embodiment 5. This configuration example corresponds to the method in which the display period Kd for display function and the touch detection period Ks for touch sensor function in a frame period F which is a period for displaying a frame image relating to liquid crystal display are driven in a time sharing manner. In this driving method, the display period Kd and the touch detection period Ks are synchronized with each other for each frame period F. In this driving method, respective periods of time are adjusted so that the display period Kd having a predetermined length and the touch detection period Ks having a predetermined length are included within the frame period F having a fixed length. The display period Kd includes a pixel writing period for displaying a frame image for liquid crystal display in the display area Ad. The touch detection period Kd includes a touch driving time which is a time for the touch driving by the scan driving of the plurality of dual-purpose electrodes Tc in the touch detection area As.

Fsync in (a) of FIG. 34 represents a signal that specifies a 1 frame period F having a fixed length. S_GL of (b) of FIG. 34 represents a scanning signal transmitted from the gate line driving unit 151 to the gate line GL. S_SL of (c) of FIG. 34 represents a data signal transmitted from the source line driving unit 152 to the source line SL. S_PIX of (d) of FIG. 34 represents an example of a pixel voltage applied to the pixel electrode 36 in accordance with transmittance of each pixel. S_Tc of (e) of FIG. 34 represents an example of a signal and a voltage to be applied to the dual-purpose electrode Tc from the dual-purpose electrode driving unit 70. S_Rx of (f) of FIG. 34 represents a signal which is output as an output signal from the detection electrode Rx during the touch detection period Ks, is input to the touch detection unit 60, and then is detected as the touch detection signal Sr.

In the S_Tc of (e) of FIG. 34, during the display period Kd, the dual-purpose electrode driving unit 70 generates a voltage Vcom for common driving by the common driving unit 72 and the scanning circuit unit 73, and applies the voltage to all the dual-purpose electrodes Tc in the screen area AG. The voltage Vcom is a voltage in accordance with the driving method of liquid crystal display. During the touch detection period Ks, the dual-purpose electrode driving unit 70 generates a touch driving signal St by the touch driving circuit unit 71 and the scanning circuit unit 73, and carries out the scan driving for sequentially applying the signal to the dual-purpose electrodes Tc to be scanned in the screen area AG. For example, the touch driving signal St is a signal having an AC pulse with a predetermined frequency.

[Touch Detection Area]

Figure 35:
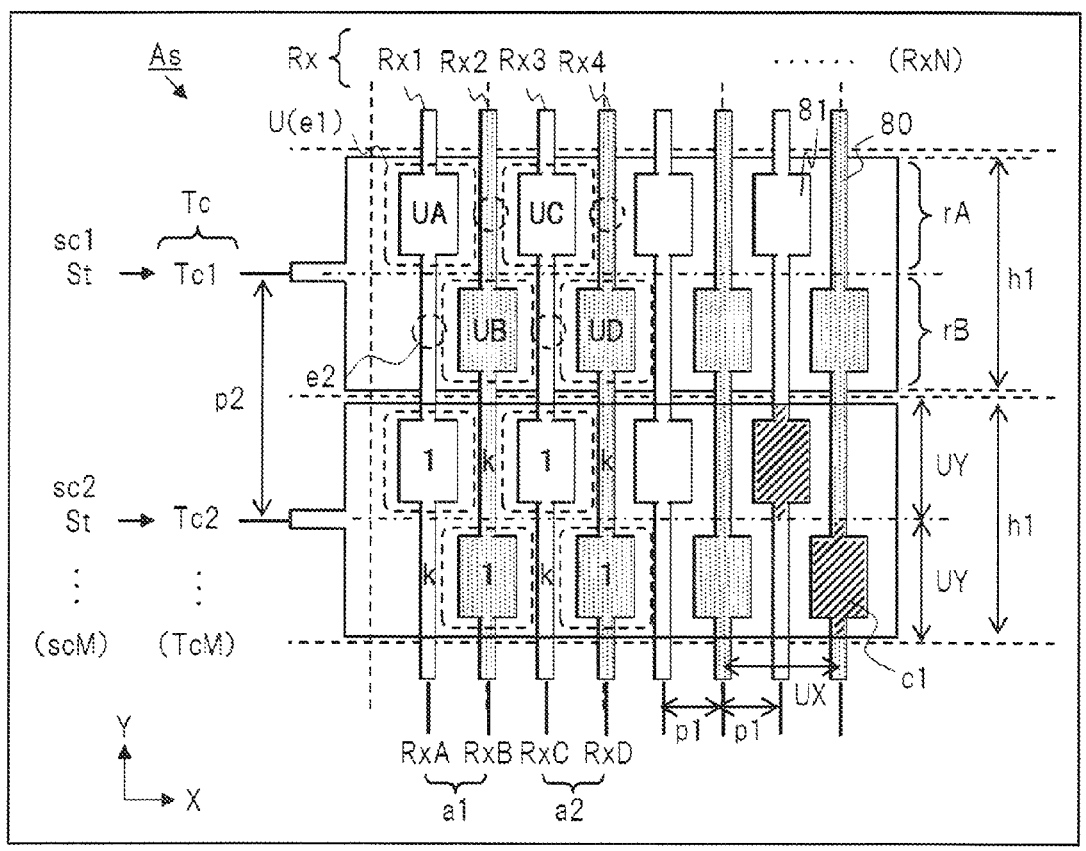
FIG. 35 is a diagram showing a configuration of dual-purpose electrodes, detection electrodes and the like of the touch detection area in the embodiment 5.
Figure 36A:
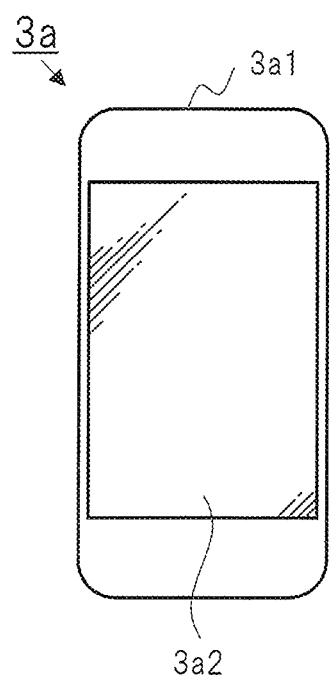
FIG. 36A is a diagram showing an outside appearance of a smartphone as the electronic equipment of one embodiment.
Figure 36B:
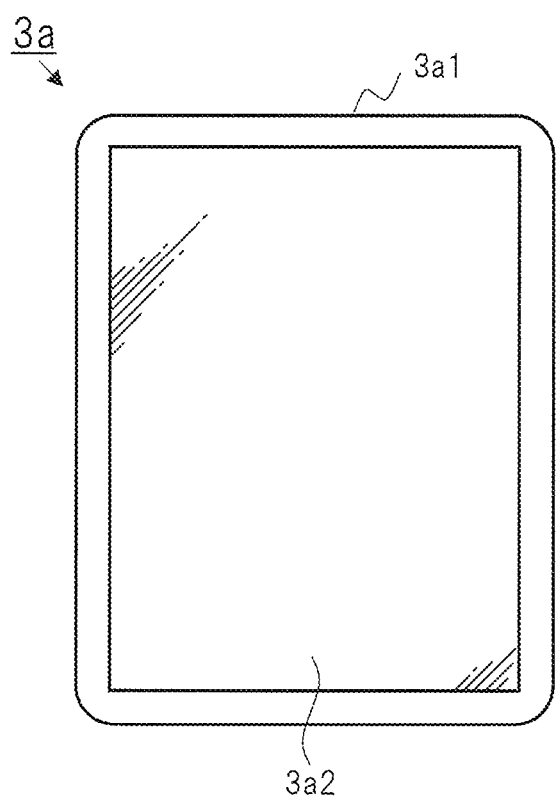
FIG. 36B is a diagram showing an outside appearance of a smartphone as the electronic equipment of one embodiment.

FIG. 35 shows a configuration of the dual-purpose electrodes Tc, the detection electrodes Rx and the like in the touch detection area As within the screen area AG in the embodiment 5. The configuration of FIG. 35 is different from the configuration of FIG. 4 described in the embodiment 1A in that the dual-purpose electrodes Tc are provided in place of the aforementioned drive electrodes Tx.

The matrix configuration of the detection units U in the touch detection area As is designed to have a ratio of one detection unit U to plural pixels with respect to the pixel matrix in the display area Ad for display function. Moreover, with respect to the superposition between the pixels and the detection units U in the z-direction, for example, the edges of electrodes constituting the pixels and the edges of the dual-purpose electrodes Tc and the detection electrodes Rx constituting the detection units U are disposed so as to be aligned with each other as much as possible.

In the embodiment 5, the sequence of scan driving of the dual-purpose electrodes Tc in the touch detection area As during the touch detection period Ks is the same as that of FIG. 11 described above. Thus, in the embodiment 5, the touch driving time Tall and the touch detection period Ks can be shortened, while maintaining the touch detection density in the touch detection area As relating to the touch sensor function in the same manner as the embodiment 1A. Moreover, the configuration of electrodes and others in the touch detection area As of the display device 2 with a touch sensor is not limited to the configuration of the embodiment 1A, and the configurations of the aforementioned embodiment 1B to embodiment 4 can be applied in the same manner.

<Electronic Equipment>

FIGS. 36 to 41 show application examples of the electronic equipment 3A and electronic equipment 3B of the aforementioned embodiments. An electronic equipment 3a of FIG. 36A shows an example of a schematic outside appearance in the case of a smartphone. FIG. 36B shows an example of a schematic outside appearance in the case of a tablet terminal. A chassis 3a1 of the electronic equipment 3a of FIG. 36A or FIG. 36B has a region 3a2 corresponding to the aforementioned screen area AG.

Figures 37A, 37B:
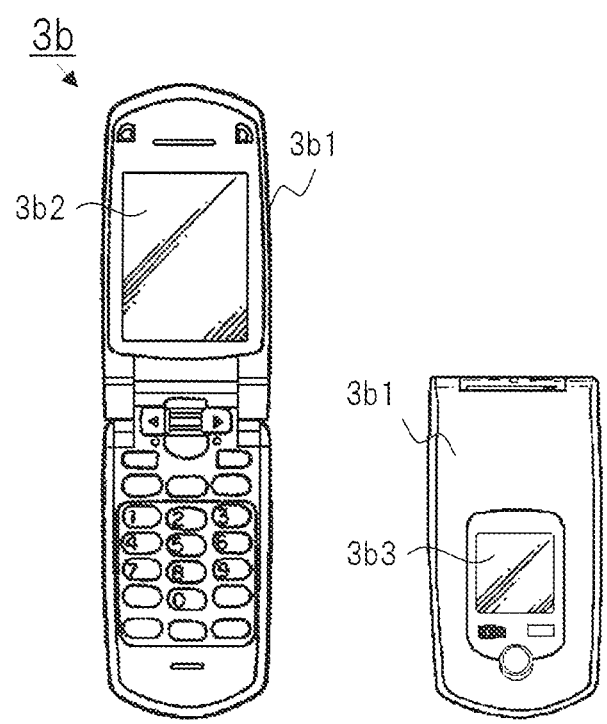
FIG. 37A is a diagram showing an outside appearance of a mobile phone serving as the electronic equipment of one embodiment.
FIG. 37B is a diagram showing an outside appearance of a mobile phone serving as the electronic equipment of one embodiment.

An electronic equipment 3b of FIG. 37 shows an example of an outside appearance in the case of a mobile phone. FIG. 37A and FIG. 37B show states before and after a chassis 3b1 of the electronic equipment 3b is folded. The chassis 3b1 of the electronic equipment 3b of FIG. 37A has a region 3b2 corresponding to the aforementioned screen area AG on its inner surface side. Moreover, the chassis 3b1 in a folded state shown in FIG. 37B has a region 3b3 corresponding to the aforementioned screen area AG on its outer surface side.

Figure 38:
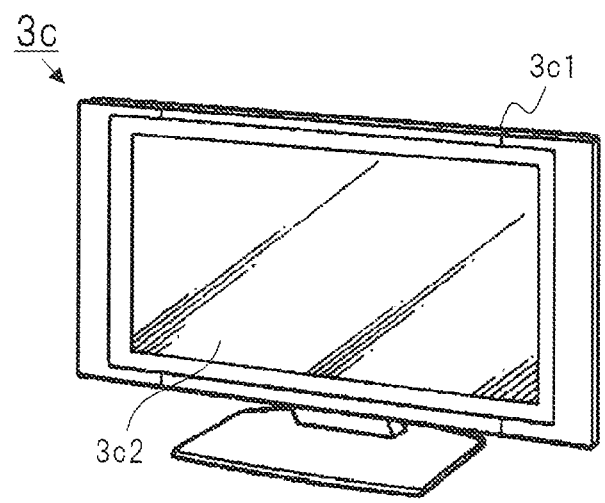
FIG. 38 is a diagram showing an outside appearance of a television set serving as the electronic equipment of one embodiment.
Figure 39:
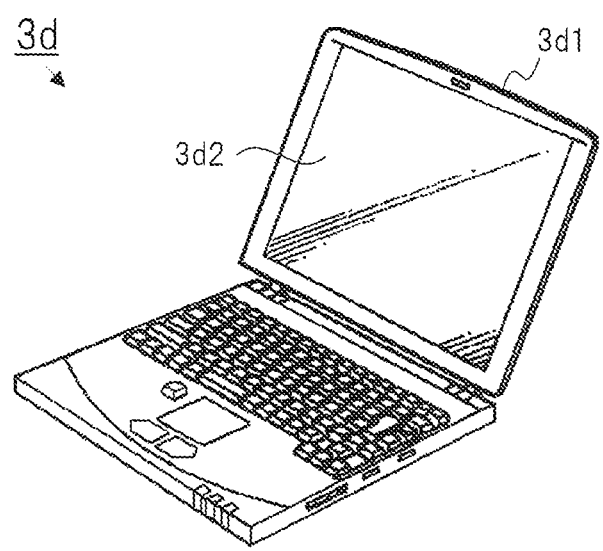
FIG. 39 is a diagram showing an outside appearance of a note PC serving as the electronic equipment of one embodiment.

An electronic equipment 3c of FIG. 38 shows an example of an outside appearance in the case of a television device. A chassis 3c1 of the electronic equipment 3c has a region 3c2 corresponding to the aforementioned screen area AG on its front surface side. An electronic equipment 3d of FIG. 39 shows an example of an outside appearance in the case of a note PC. A chassis 3d1 capable of being folded of the electronic equipment 3d has a region 3d2 corresponding to the aforementioned screen area AG on its display surface.

Figure 40:
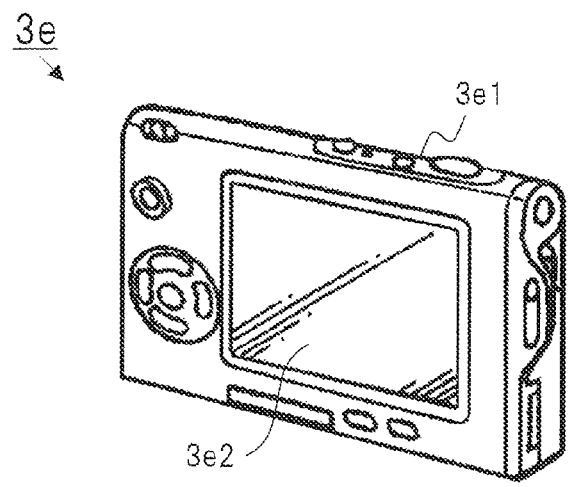
FIG. 40 is a diagram showing an outside appearance of a digital camera serving as the electronic equipment of one embodiment.
Figure 41:
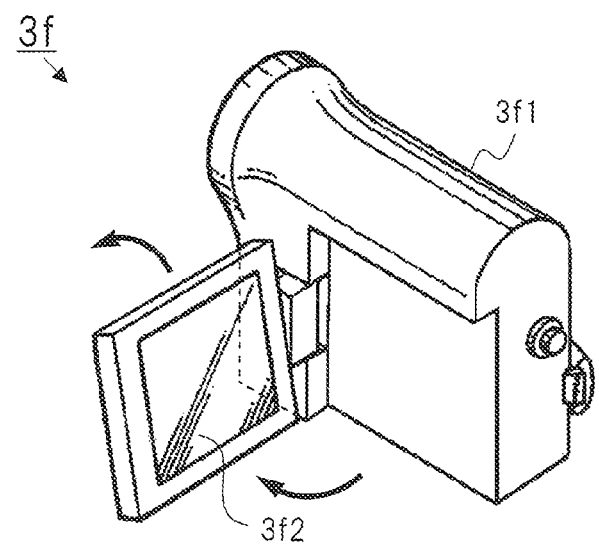
FIG. 41 is a diagram showing an outside appearance of a digital video camera serving as the electronic equipment of one embodiment.
Figure 42:
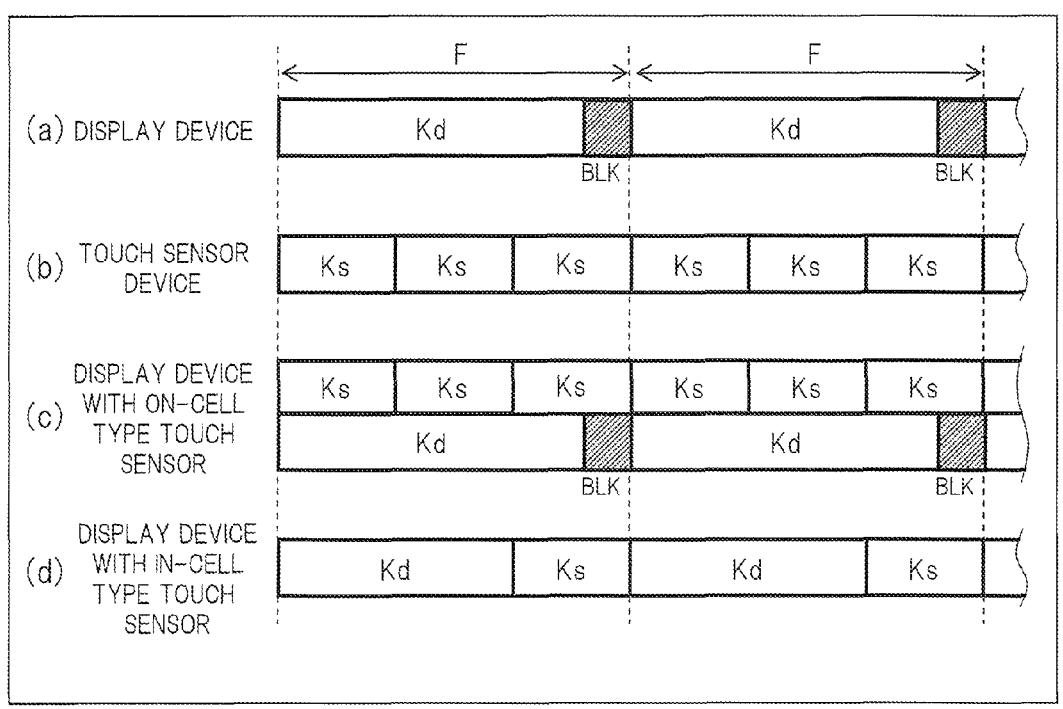
FIG. 42 is a diagram showing driving methods and configuration examples of driving periods in various devices as the premise of the present embodiment.

An electronic equipment 3e of FIG. 40 shows an example of an outside appearance in the case of a digital camera. A chassis 3e1 of the electronic equipment 3e has a region 3e2 corresponding to the aforementioned screen area AG on its monitor surface. An electronic equipment 3f of FIG. 41 shows an example of an outside appearance in the case of a digital video camera. A chassis 3f1 of the electronic equipment 3f has a region 3f2 corresponding to the aforementioned screen area AG on a surface of its openable portion to be a monitor when it is opened outward.

<Effects and Others>

As described above, in the respective embodiments, the design of the electrode shape including the drive electrodes and detection electrodes in a panel unit is devised. More specifically, the width and pitch of the arrangement of the drive electrodes and detection electrodes, the presence or absence of a protruding electrode portion and others are devised. As a result, in the respective embodiments, a plurality of output signals with predetermined touch detection sensitivities can be obtained as touch detection signals by a small number of scans. Consequently, in the respective embodiments, a touch driving time and a touch detection period can be shortened, while maintaining a touch detection density in a touch detection region relating to a touch sensor function. Note that, in the respective embodiments, alternation and adjustment to a different amplitude or the like of an input signal to electrodes to be simultaneously driven at the time of the touch driving are not required, and a plurality of output signals with desired touch detection sensitivities can be automatically obtained by driving the electrodes with the same input signal.

In the foregoing, the invention made by the inventors of the present invention has been concretely described based on the embodiments. However, it is needless to say that the present invention is not limited to the foregoing embodiments and various modifications and alterations can be made within the scope of the present invention.

As another embodiment, the shapes of the drive electrodes Tx of the embodiment 1A and the dual-purpose electrodes Tc of the embodiment 5 are not limited to the rectangular block shape described above, and the electrodes may have the shape in which one electrode is composed of branches to a plurality of thin lines extending in the X-direction. Moreover, the shape of the protruding electrode portion of the detection electrode Rx is not limited to the rectangular shape with an opening, and the electrode portion may have a comb shape. For example, the protruding electrode portion of the detection electrode Rx may have a shape in which a plurality of thin line portions protrude in the X-direction so as to form the comb shape from a thin line portion 80 extending in the Y-direction.

As another embodiment, the display device to be applied to a display device with a touch sensor is not limited to a liquid crystal display device, and various display devices such as an organic EL display device, a plasma display device and the like may be applied. In the embodiments described above, the cases of applying the liquid crystal display device having the liquid crystal layer 13 as a display functional layer have been described, but a display device with another display functional layer can also be applied. For example, by applying the same configuration of the drive electrodes and the detection electrodes and the same configuration of the circuit unit as those of the aforementioned embodiments to an organic EL display device with an organic EL layer as a display functional layer, an EL display device with a touch sensor can be provided. Moreover, materials of a glass substrate or the like constituting the panel unit are not limited to those materials having high rigidity, and the configurations of the above-described embodiments can be applied to an electronic paper or the like when a material having low rigidity is used.

The present invention can be applied to various display devices and electronic equipments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a display panel unit including:
a touch detection area having:
a plurality of drive electrodes used for both of display driving and touch driving and extending in a first direction,
a plurality of detection electrodes extending in a second direction, and
a plurality of detection units each composed of a pair of the drive electrode and the detection electrode, the plurality of detection units being formed in a matrix pattern,
a display area in which pixels are formed in a matrix pattern, and
a display functional layer which is controlled by the pixels and used for displaying an image on the display area;
a first circuit unit which generates a signal for the display driving and an input signal for the touch driving and applies the signals to the plurality of drive electrodes;
a second circuit unit which detects an output signal from the plurality of detection electrodes based on the input signal for the touch driving;
a third circuit unit which applies the signal for the display driving to the pixels in the display area;
the plurality of drive electrodes each having a width forming two detection units in the second direction;
first to fourth detection electrodes of the plurality of detection electrodes;
a plurality of touch detection regions which are provided in the touch detection area, formed by respective intersections between the plurality of drive electrodes and the first to fourth detection electrodes, and repeatedly disposed in the first direction and the second direction;
first detection regions with a first sensitivity, which are provided in each of the plurality of touch detection regions and have first to fourth detection units; and
second detection regions with a second sensitivity lower than the first sensitivity, which are provided in each of the plurality of touch detection regions,
wherein at least either the plurality of drive electrodes or the plurality of detection electrodes have different shapes between the first detection region and the second detection region,
the first detection regions and the second detection regions are alternately disposed in the first direction and the second direction, and
when a first input signal is applied to each of the plurality of drive electrodes, four output signals are obtained from the first to fourth detection electrodes through the first to fourth detection units in each of the plurality of touch detection regions.

2. The display device according to claim 1,
wherein each of the plurality of drive electrodes has a first region and a second region in the second direction, the first region and the second region having a width forming one detection unit,
the first detection unit is formed by an intersection between the first region of the drive electrode and the first detection electrode,
the second detection unit is formed by an intersection between the second region of the drive electrode and the second detection electrode,
the third detection unit is formed by an intersection between the first region of the drive electrode and the third detection electrode, and
the fourth detection unit is formed by an intersection between the second region of the drive electrode and the fourth detection electrode.

3. The display device according to claim 1,
wherein the plurality of detection electrodes are disposed in the first direction at a constant pitch, and
each of the plurality of detection electrodes has a thin line portion extending in the second direction and protruding electrode portions which protrude from the thin line portion toward two sides thereof in the first direction so as to correspond to a position of the first detection region.

4. The display device according to claim 3,
wherein the protruding electrode portion of each of the plurality of detection electrodes has an opening in a plane formed by the first direction and the second direction.

5. The display device according to claim 3,
wherein the protruding electrode portion of each of the plurality of detection electrodes has an opening, which is superposed on a plane of the protruding electrode portion of the drive electrode, in a plane formed by the first direction and the second direction.

6. The display device according to claim 1,
wherein the plurality of detection electrodes are alternately disposed at a first pitch and a second pitch in the first direction, and
each of the plurality of detection electrodes has a thin line portion extending in the second direction and a protruding electrode portion which protrudes from the thin line portion toward one side thereof in the first direction so as to correspond to a position of the first detection region.

7. The display device according to claim 1,
wherein each of the plurality of drive electrodes has a thin line portion extending in the first direction and a protruding electrode portion which protrudes from the thin line portion toward at least one side thereof in the second direction so as to correspond to a position of the first detection region.

8. The display device according to claim 1,
wherein the touch detection area has a plurality of common electrodes which are disposed between the plurality of drive electrodes in the second direction, and to which a common voltage is applied.

9. The display device according to claim 1,
wherein the first circuit unit sequentially applies the first input signal to each of the plurality of drive electrodes in the touch detection area.

10. The display device according to claim 1,
wherein the display functional layer is a liquid crystal layer.

11. A display device comprising:
a display panel unit including:
  a touch detection area having:
    a plurality of drive electrodes used for both of display driving and touch driving and extending in a first direction,
    a plurality of detection electrodes extending in a second direction, and
    a plurality of detection units each composed of a pair of the drive electrode and the detection electrode, each of plurality of detection units being formed in a matrix pattern,
  a display area in which pixels are formed in a matrix pattern, and
  a display functional layer which is controlled by the pixels and used for displaying an image on the display area;
a first circuit unit which generates a signal for the display driving and an input signal for the touch driving and applies the signals to the plurality of drive electrodes;
a second circuit unit which detects an output signal from the plurality of detection electrodes based on the input signal for the touch driving;
a third circuit unit which applies a signal for the display driving to the pixels in the display area;
a first drive electrode and a second drive electrode of the plurality of drive electrodes, each having a width forming one detection unit in the second direction;
first to fourth detection electrodes of the plurality of detection electrodes;
a plurality of touch detection regions which are provided in the touch detection area, formed by respective intersections among the first and second drive electrodes and the first to fourth detection electrodes, and repeatedly disposed in the first direction and the second direction;
first detection regions with a first sensitivity, which are provided in each of the plurality of touch detection regions and have first to fourth detection units; and
second detection regions with a second sensitivity lower than the first sensitivity,
wherein at least either the plurality of drive electrodes or the plurality of detection electrodes have different shapes among the first detection regions and the second detection regions,
the first detection regions and the second detection regions are alternately disposed in the first direction and the second direction, and
when the first drive electrode and the second drive electrode are taken as one set and a first input signal is simultaneously applied to the one set, four output signals are obtained from the first to fourth detection electrodes through the first to fourth detection units in each of the plurality of touch detection regions.

12. The display device according to claim 11,
wherein the first detection unit is formed by an intersection between the first drive electrode and the first detection electrode,
the second detection unit is formed by an intersection between the second drive electrode and the second detection electrode,
the third detection unit is formed by an intersection between the first drive electrode and the third detection electrode, and
the fourth detection unit is formed by an intersection between the second drive electrode and the fourth detection electrode.

13. The display device according to claim 11,
wherein the first circuit unit sequentially applies the first input signal to each of the sets of the plurality of drive electrodes in the touch detection area.

14. The display device according to claim 13,
wherein the first circuit unit selects drive electrodes adjacent in the second direction as the one set of the first drive electrode and the second drive electrode.

15. The display device according to claim 13,
wherein the first circuit unit selects drive electrodes apart from each other with at least one drive electrode interposed therebetween in the second direction, as the one set of the first drive electrode and the second drive electrode.

16. The display device according to claim 13,
wherein the first circuit unit applies pulses with the same phase as the first input signal which is simultaneously applied to the one set of the first drive electrode and the second drive electrode.

17. The display device according to claim 13,
wherein the first circuit unit applies pulses with opposite phase as the first input signal which is simultaneously applied to the one set of the first drive electrode and the second drive electrode.

* * * * *